US012496356B2

(12) United States Patent
Hu

(10) Patent No.: US 12,496,356 B2
(45) Date of Patent: Dec. 16, 2025

(54) NEUROPROTECTION OF NEURONAL SOMA AND AXON BY MODULATING ER STRESS/UPR MOLECULES

(71) Applicant: The Board of Trustees of the Leland Stanford Junior University, Stanford, CA (US)

(72) Inventor: Yang Hu, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 1118 days.

(21) Appl. No.: 17/432,794

(22) PCT Filed: Feb. 28, 2020

(86) PCT No.: PCT/US2020/020418
§ 371 (c)(1),
(2) Date: Aug. 20, 2021

(87) PCT Pub. No.: WO2020/176862
PCT Pub. Date: Sep. 3, 2020

(65) Prior Publication Data
US 2022/0133910 A1  May 5, 2022

Related U.S. Application Data

(60) Provisional application No. 62/812,038, filed on Feb. 28, 2019.

(51) Int. Cl.
*A61K 48/00* (2006.01)
*A61K 9/00* (2006.01)
(Continued)

(52) U.S. Cl.
CPC ........ *A61K 48/0058* (2013.01); *A61K 9/0048* (2013.01); *A61K 31/7105* (2013.01);
(Continued)

(58) Field of Classification Search
CPC .............................................. C12N 2830/008
See application file for complete search history.

(56) References Cited

U.S. PATENT DOCUMENTS

2017/0029850 A1   2/2017   Maeder et al.

FOREIGN PATENT DOCUMENTS

| WO | WO2012099940 | 7/2012 |
| WO | WO2018013568 | 1/2018 |

OTHER PUBLICATIONS

Hu et al., Neuron. Feb. 9, 2012;73(3):445-52. doi: 10.1016/j.neuron. 2011.11.026 (Year: 2012).*

(Continued)

*Primary Examiner* — Ram R Shukla
*Assistant Examiner* — Shabana S Meyering
(74) *Attorney, Agent, or Firm* — Pamela J. Sherwood; Bozicevic, Field & Francis LLP

(57) ABSTRACT

Compositions and methods for treating a mammalian subject for an optic nerve (ON) neuropathy and/or reducing or ameliorating degeneration of axons and/or soma of RGCs are provided. Aspects of the composition include a mammalian viral vector, comprising a murine γ-synuclein promoter, or functional fragment thereof, that promotes expression of a transgene specifically in retinal ganglion cells (RGCs), the promoter in operable linkage with an expression cassette encoding the transgene, wherein the expressed transgene inhibits activity of an expression product of an endogenous pro-neurodegenerative gene involved in an ER stress and/or UPR pathway that leads to axon or soma degeneration in the RGCs. Aspects of the methods include intravitreally administering the composition to treat the subject for the ON neuropathy. A variety of ON neuropathies may be treated by practicing the methods, including retinal (Continued)

ganglion cell degeneration, glaucoma, optic neuritis, ON traumatic injury and other ON-related diseases.

4 Claims, 11 Drawing Sheets

Specification includes a Sequence Listing.

(51) Int. Cl.
    *A61K 31/7105*    (2006.01)
    *A61K 35/76*      (2015.01)
    *A61K 38/46*      (2006.01)
    *A61P 27/02*      (2006.01)

(52) U.S. Cl.
    CPC ............ *A61K 35/76* (2013.01); *A61K 38/465* (2013.01); *A61P 27/02* (2018.01)

(56) References Cited

OTHER PUBLICATIONS

Genscript ([retrieved from the internet on Mar. 21, 2025] <URL: gRNA design tool>, 4 pages (Year: 2015).*
GenBank JN945346.1 "Mus musculus targeted non-conditional, lacZ-tagged mutant allele 5 Sncg:tm1e(EUCOMM) Hmgu; transgenic" Nov. 5, 2011 (Nov. 5, 2011) [retrieved Jul. 6, 2020; https://www.ncbi.nlm.nih.gov/nuccore/JN945346.11] whole doc.

* cited by examiner

FIG. 6A
FIG. 6B
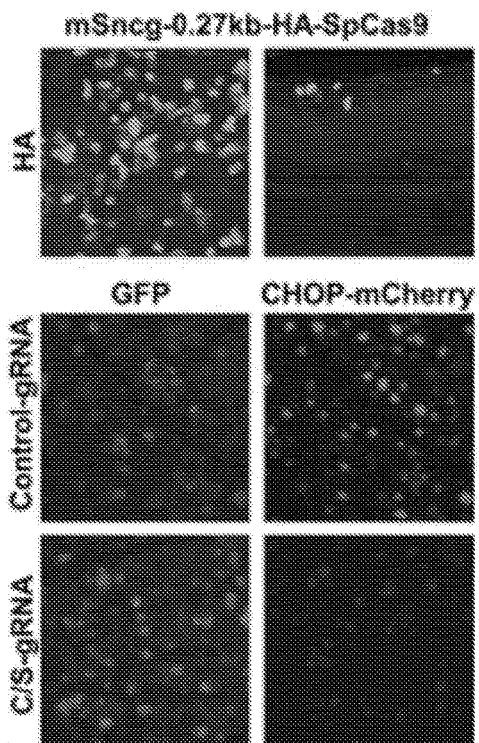
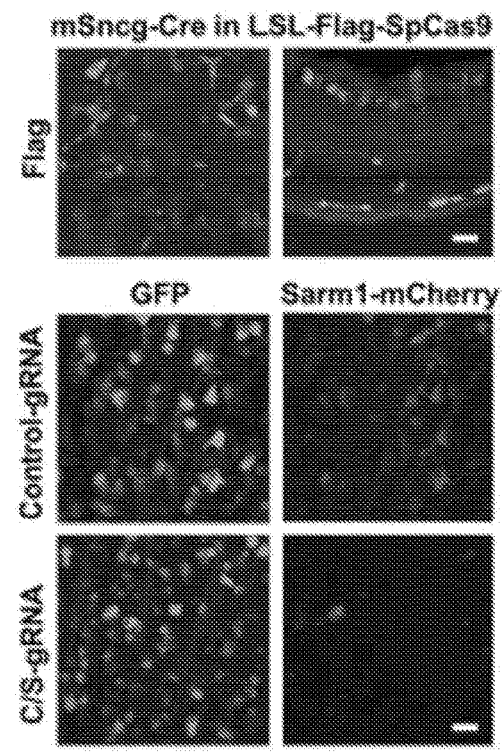
FIG. 6C
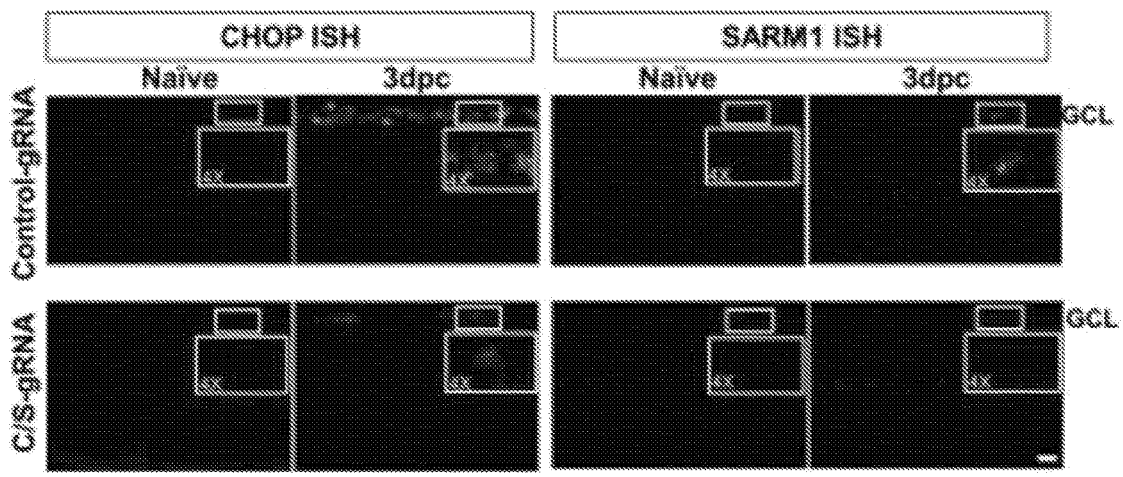

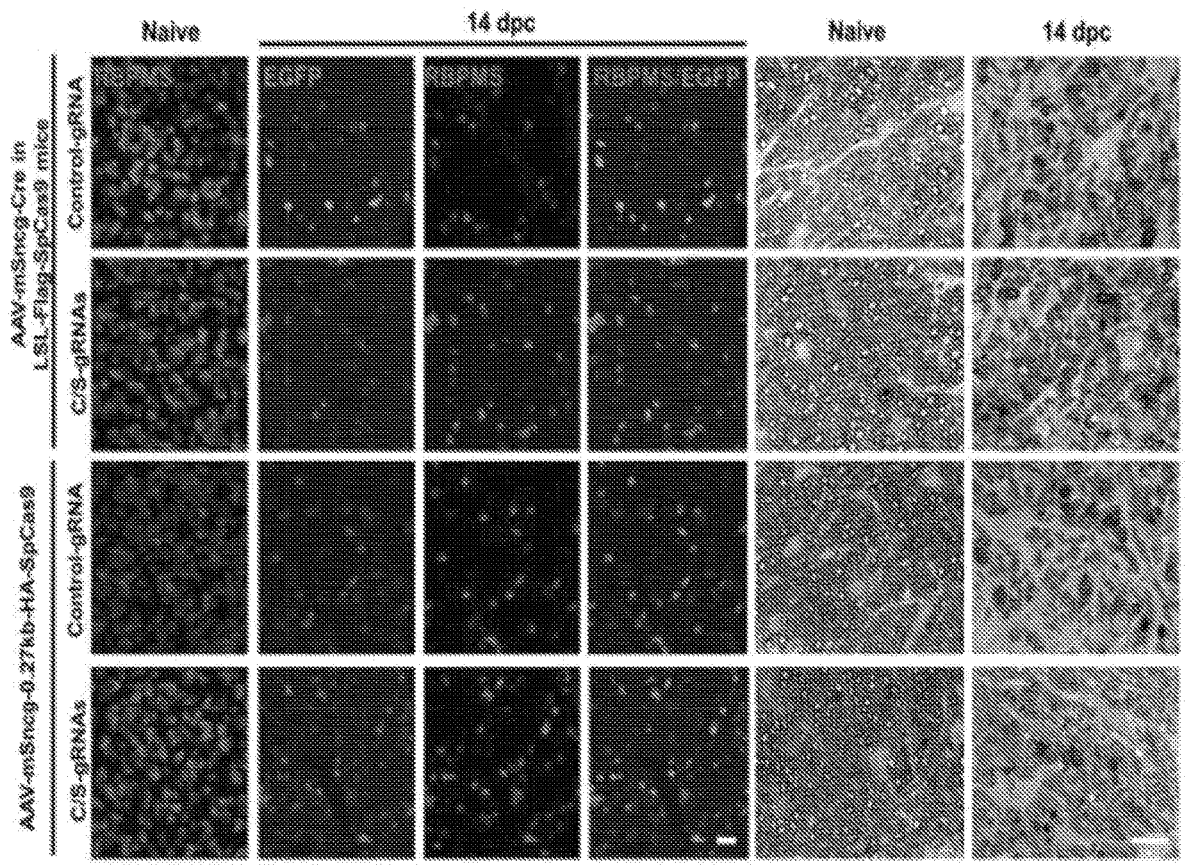
FIG. 8A
FIG. 8C
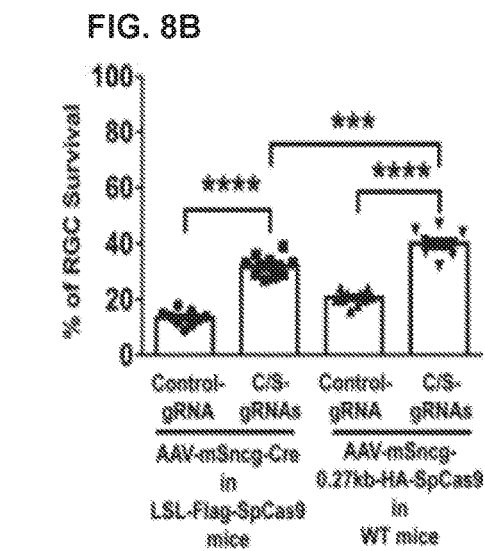
FIG. 8B
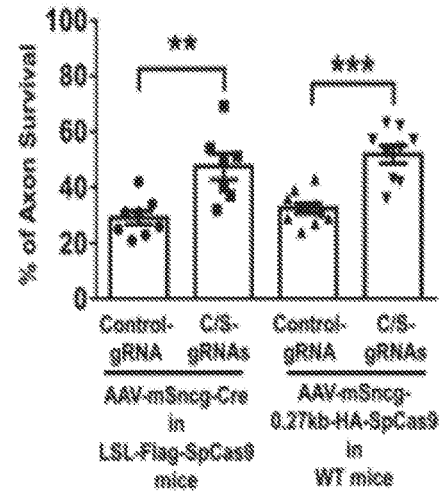
FIG. 8D

FIG. 10A
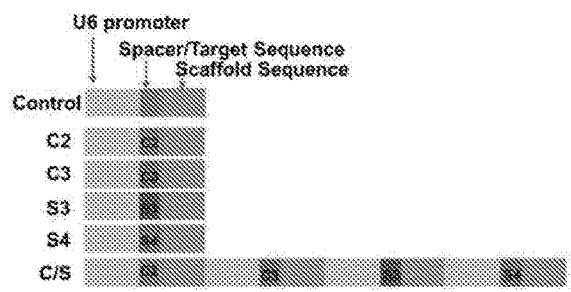
FIG. 10B
| | Spacer/Target Sequence | SEQ ID NO: |
|---|---|---|
| Control | GGAAGAGCGAGCTCTTCT | 5 |
| C1 | GGTGCCCCCAATTTCATCTG | 6 |
| C2 | GTCCCTAGCTTGGCTGACAG | 7 |
| C3 | GCTCATCCCCAGGAAACGAAG | 8 |
| C4 | GTCAGAGTTCTATGGCCCAGG | 9 |
| S1 | CTAGACCGATGCGCGCCACG | 10 |
| S2 | CATTCGTAGAGTAAGAAACC | 11 |
| S3 | GGTGTTGGCTACCAACAAGG | 12 |
| S4 | GACCAGTACAGCACCGCGTCG | 13 |
FIG. 10C
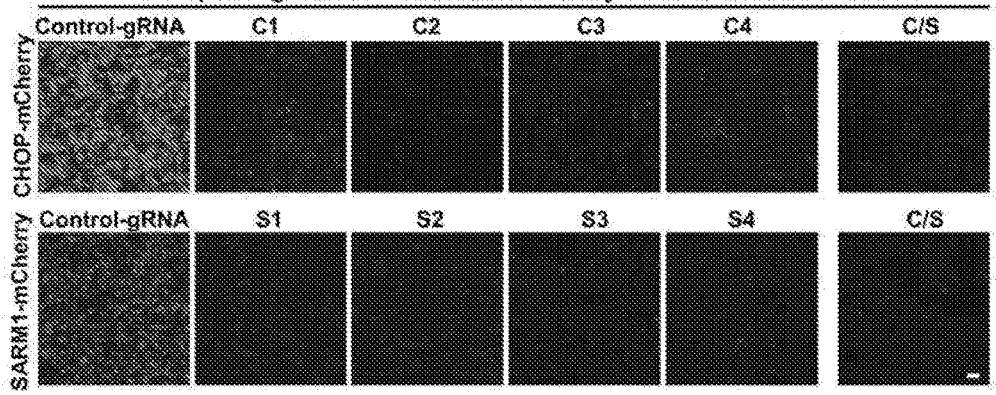

SEQUENCE LISTING

<160> NUMBER OF SEQ ID NOS: 63

<210> SEQ ID NO 1
<211> LENGTH: 60
<212> TYPE: DNA
<213> ORGANISM: Artificial sequence
<220> FEATURE:
<223> OTHER INFORMATION: synthetic sequence

<400> SEQUENCE: 1
gcaaacacca tggacgtctt caaggaattc gccaccatgc ccaagaagaa gaggaaggtg    60

<210> SEQ ID NO 2
<211> LENGTH: 57
<212> TYPE: DNA
<213> ORGANISM: Artificial sequence
<220> FEATURE:
<223> OTHER INFORMATION: synthetic sequence

<400> SEQUENCE: 2
ccgggtcgac tctagaggta ccacgcgtag atctctaatc gccatcttcc agcaggc    57

<210> SEQ ID NO 3
<211> LENGTH: 54
<212> TYPE: DNA
<213> ORGANISM: Artificial sequence
<220> FEATURE:
<223> OTHER INFORMATION: synthetic sequence

<400> SEQUENCE: 3
catcactagg ggttcctgcg gcctctagaa agagtcagca gggcagaata gagc    54

<210> SEQ ID NO 4
<211> LENGTH: 54
<212> TYPE: DNA
<213> ORGANISM: Artificial sequence
<220> FEATURE:
<223> OTHER INFORMATION: synthetic sequence

<400> SEQUENCE: 4
acatcgtatg ggtacatggt ggcgaccggt cttgaagacg tccatggtgt ttgc    54

<210> SEQ ID NO 5
<211> LENGTH: 18
<212> TYPE: DNA
<213> ORGANISM: Artificial sequence
<220> FEATURE:
<223> OTHER INFORMATION: synthetic sequence

<400> SEQUENCE: 5
ggaagagcga gctcttct    18

<210> SEQ ID NO 6
<211> LENGTH: 20
<212> TYPE: DNA
<213> ORGANISM: Artificial sequence
<220> FEATURE:
<223> OTHER INFORMATION: synthetic sequence

<400> SEQUENCE: 6
ggtgccccca atttcatctg    20

<210> SEQ ID NO 7
<211> LENGTH: 20
<212> TYPE: DNA
<213> ORGANISM: Artificial sequence

```
<220> FEATURE:
<223> OTHER INFORMATION: synthetic sequence

<400> SEQUENCE: 7
gtccctagct tggctgacag                                                    20

<210> SEQ ID NO 8
<211> LENGTH: 21
<212> TYPE: DNA
<213> ORGANISM: Artificial sequence
<220> FEATURE:
<223> OTHER INFORMATION: synthetic sequence

<400> SEQUENCE: 8
gctcatcccc aggaaacgaa g                                                  21

<210> SEQ ID NO 9
<211> LENGTH: 21
<212> TYPE: DNA
<213> ORGANISM: Artificial sequence
<220> FEATURE:
<223> OTHER INFORMATION: synthetic sequence

<400> SEQUENCE: 9
gtcagagttc tatggcccag g                                                  21

<210> SEQ ID NO 10
<211> LENGTH: 20
<212> TYPE: DNA
<213> ORGANISM: Artificial sequence
<220> FEATURE:
<223> OTHER INFORMATION: synthetic sequence

<400> SEQUENCE: 10
ctagaccgat gcgcgccacg                                                    20

<210> SEQ ID NO 11
<211> LENGTH: 20
<212> TYPE: DNA
<213> ORGANISM: Artificial sequence
<220> FEATURE:
<223> OTHER INFORMATION: synthetic sequence

<400> SEQUENCE: 11
cattcgtaga gtaagaaacc                                                    20

<210> SEQ ID NO 12
<211> LENGTH: 20
<212> TYPE: DNA
<213> ORGANISM: Artificial sequence
<220> FEATURE:
<223> OTHER INFORMATION: synthetic sequence

<400> SEQUENCE: 12
ggtgttggct accaacaagg                                                    20

<210> SEQ ID NO 13
<211> LENGTH: 21
<212> TYPE: DNA
<213> ORGANISM: Artificial sequence
<220> FEATURE:
<223> OTHER INFORMATION: synthetic sequence

<400> SEQUENCE: 13
gaccagtaca gcaccgcgtc g                                                  21
```

<210> SEQ ID NO 14
<211> LENGTH: 35
<212> TYPE: DNA
<213> ORGANISM: Artificial sequence
<220> FEATURE:
<223> OTHER INFORMATION: synthetic sequence

<400> SEQUENCE: 14
ggaattccat atggtcccat gccactagtg ggagc                              35

<210> SEQ ID NO 15
<211> LENGTH: 37
<212> TYPE: DNA
<213> ORGANISM: Artificial sequence
<220> FEATURE:
<223> OTHER INFORMATION: synthetic sequence

<400> SEQUENCE: 15
catgaattcc ttgaagacgt ccatggtgtt tgcaagg                            37

<210> SEQ ID NO 16
<211> LENGTH: 42
<212> TYPE: DNA
<213> ORGANISM: Artificial sequence
<220> FEATURE:
<223> OTHER INFORMATION: synthetic sequence

<400> SEQUENCE: 16
ggaattccat atgccattat ggccttaggt cacttcatct cc                      42

<210> SEQ ID NO 17
<211> LENGTH: 29
<212> TYPE: DNA
<213> ORGANISM: Artificial sequence
<220> FEATURE:
<223> OTHER INFORMATION: synthetic sequence

<400> SEQUENCE: 17
ccggaattct gctgccccca gaactaggg                                     29

<210> SEQ ID NO 18
<211> LENGTH: 35
<212> TYPE: DNA
<213> ORGANISM: Artificial sequence
<220> FEATURE:
<223> OTHER INFORMATION: synthetic sequence

<400> SEQUENCE: 18
ggaattccat atggtcccat gccactagtg ggagc                              35

<210> SEQ ID NO 19
<211> LENGTH: 32
<212> TYPE: DNA
<213> ORGANISM: Artificial sequence
<220> FEATURE:
<223> OTHER INFORMATION: synthetic sequence

<400> SEQUENCE: 19
catgaattca ggtgccaaga gttccgactt gg                                 32

<210> SEQ ID NO 20
<211> LENGTH: 45
<212> TYPE: DNA
<213> ORGANISM: Artificial sequence
<220> FEATURE:
<223> OTHER INFORMATION: synthetic sequence

<400> SEQUENCE: 20
ggaattccat atgctggaac cacagaaagc cacatcatgg acaca          45

<210> SEQ ID NO 21
<211> LENGTH: 30
<212> TYPE: DNA
<213> ORGANISM: Artificial sequence
<220> FEATURE:
<223> OTHER INFORMATION: synthetic sequence

<400> SEQUENCE: 21
catgaattcg gacggctcag cctcaccttg          30

<210> SEQ ID NO 22
<211> LENGTH: 36
<212> TYPE: DNA
<213> ORGANISM: Artificial sequence
<220> FEATURE:
<223> OTHER INFORMATION: synthetic sequence

<400> SEQUENCE: 22
ggaattccat atgtgagcct tcttattcag accacc          36

<210> SEQ ID NO 23
<211> LENGTH: 27
<212> TYPE: DNA
<213> ORGANISM: Artificial sequence
<220> FEATURE:
<223> OTHER INFORMATION: synthetic sequence

<400> SEQUENCE: 23
ccggaattcc cgcagagcgt atggtcg          27

<210> SEQ ID NO 24
<211> LENGTH: 34
<212> TYPE: DNA
<213> ORGANISM: Artificial sequence
<220> FEATURE:
<223> OTHER INFORMATION: synthetic sequence

<400> SEQUENCE: 24
ggaattccat atgaggggag gcgcttttcc caag          34

<210> SEQ ID NO 25
<211> LENGTH: 32
<212> TYPE: DNA
<213> ORGANISM: Artificial sequence
<220> FEATURE:
<223> OTHER INFORMATION: synthetic sequence

<400> SEQUENCE: 25
ccggaattct gaggtcgaaa ggcccggaga tc          32

<210> SEQ ID NO 26
<211> LENGTH: 35
<212> TYPE: DNA
<213> ORGANISM: Artificial sequence
<220> FEATURE:
<223> OTHER INFORMATION: synthetic sequence

<400> SEQUENCE: 26
ggaattccat atgccaaggt ccaggccctc ttacc          35

<210> SEQ ID NO 27

```
<211> LENGTH: 31
<212> TYPE: DNA
<213> ORGANISM: Artificial sequence
<220> FEATURE:
<223> OTHER INFORMATION: synthetic sequence

<400> SEQUENCE: 27
catgaattca catccatggt gggtgtgcag g                              31

<210> SEQ ID NO 28
<211> LENGTH: 35
<212> TYPE: DNA
<213> ORGANISM: Artificial sequence
<220> FEATURE:
<223> OTHER INFORMATION: synthetic sequence

<400> SEQUENCE: 28
ggaattccat atgcaggcgc acaccaagtt cttgg                          35

<210> SEQ ID NO 29
<211> LENGTH: 33
<212> TYPE: DNA
<213> ORGANISM: Artificial sequence
<220> FEATURE:
<223> OTHER INFORMATION: synthetic sequence

<400> SEQUENCE: 29
catgaattca agagatgtgc gcaaagtgtg cgg                            33

<210> SEQ ID NO 30
<211> LENGTH: 43
<212> TYPE: DNA
<213> ORGANISM: Artificial sequence
<220> FEATURE:
<223> OTHER INFORMATION: synthetic sequence

<400> SEQUENCE: 30
ggaattccat atgactcagt cctttttgtg ctgtctcctc ctc                 43

<210> SEQ ID NO 31
<211> LENGTH: 37
<212> TYPE: DNA
<213> ORGANISM: Artificial sequence
<220> FEATURE:
<223> OTHER INFORMATION: synthetic sequence

<400> SEQUENCE: 31
catgaattcc attcacgttg ctatgcagcc catctcc                        37

<210> SEQ ID NO 32
<211> LENGTH: 39
<212> TYPE: DNA
<213> ORGANISM: Artificial sequence
<220> FEATURE:
<223> OTHER INFORMATION: synthetic sequence

<400> SEQUENCE: 32
ggaattccat atggcctgtg tggatgtggg agactaatc                      39

<210> SEQ ID NO 33
<211> LENGTH: 30
<212> TYPE: DNA
<213> ORGANISM: Artificial sequence
<220> FEATURE:
<223> OTHER INFORMATION: synthetic sequence

<400> SEQUENCE: 33
```
ccggaattct cgccgcagcg cagatggtcg         30

<210> SEQ ID NO 34
<211> LENGTH: 33
<212> TYPE: DNA
<213> ORGANISM: Artificial sequence
<220> FEATURE:
<223> OTHER INFORMATION: synthetic sequence

<400> SEQUENCE: 34
ggaattccat atgcgttgtc tgcccgttgt ctg         33

<210> SEQ ID NO 35
<211> LENGTH: 29
<212> TYPE: DNA
<213> ORGANISM: Artificial sequence
<220> FEATURE:
<223> OTHER INFORMATION: synthetic sequence

<400> SEQUENCE: 35
ccggaattct ctcgcgctag cgcgctctc         29

<210> SEQ ID NO 36
<211> LENGTH: 39
<212> TYPE: DNA
<213> ORGANISM: Artificial sequence
<220> FEATURE:
<223> OTHER INFORMATION: synthetic sequence

<400> SEQUENCE: 36
ggaattccat atggaaccag gattcagcga ctatgttgc         39

<210> SEQ ID NO 37
<211> LENGTH: 33
<212> TYPE: DNA
<213> ORGANISM: Artificial sequence
<220> FEATURE:
<223> OTHER INFORMATION: synthetic sequence

<400> SEQUENCE: 37
ccggaattca agctttagcc cttgttactc tac         33

<210> SEQ ID NO 38
<211> LENGTH: 42
<212> TYPE: DNA
<213> ORGANISM: Artificial sequence
<220> FEATURE:
<223> OTHER INFORMATION: synthetic sequence

<400> SEQUENCE: 38
ggaattccat atgtcagcct tacaagtgac tctcaaattt gc         42

<210> SEQ ID NO 39
<211> LENGTH: 36
<212> TYPE: DNA
<213> ORGANISM: Artificial sequence
<220> FEATURE:
<223> OTHER INFORMATION: synthetic sequence

<400> SEQUENCE: 39
catgaattcc ttgaagacgt ccatggtgtt gcaagg         36

<210> SEQ ID NO 40
<211> LENGTH: 36
<212> TYPE: DNA

```
<213> ORGANISM: Artificial sequence
<220> FEATURE:
<223> OTHER INFORMATION: synthetic sequence

<400> SEQUENCE: 40
ggaattccat atgctatggg aactagcagg tgggtg                                36

<210> SEQ ID NO 41
<211> LENGTH: 37
<212> TYPE: DNA
<213> ORGANISM: Artificial sequence
<220> FEATURE:
<223> OTHER INFORMATION: synthetic sequence

<400> SEQUENCE: 41
catgaattcc ttgaagacgt ccatggtgtt tgcaagg                               37

<210> SEQ ID NO 42
<211> LENGTH: 37
<212> TYPE: DNA
<213> ORGANISM: Artificial sequence
<220> FEATURE:
<223> OTHER INFORMATION: synthetic sequence

<400> SEQUENCE: 42
ggaattccat atgaagagtc agcagggcag aatagag                               37

<210> SEQ ID NO 43
<211> LENGTH: 37
<212> TYPE: DNA
<213> ORGANISM: Artificial sequence
<220> FEATURE:
<223> OTHER INFORMATION: synthetic sequence

<400> SEQUENCE: 43
catgaattcc ttgaagacgt ccatggtgtt tgcaagg                               37

<210> SEQ ID NO 44
<211> LENGTH: 985
<212> TYPE: DNA
<213> ORGANISM: Artificial sequence
<220> FEATURE:
<223> OTHER INFORMATION: synthetic sequence
<220> FEATURE:
<221> NAME/KEY: promoter
<222> LOCATION: (246)..(985)
<223> OTHER INFORMATION: CAG promoter

<400> SEQUENCE: 44
ccattgacgt caataatgac gtatgttccc atagtaacgc caatagggac tttccattga      60
cgtcaatggg tggagtattt acggtaaact gcccacttgg cagtacatca agtgtatcat     120
atgccaagta cgccccctat tgacgtcaat gacggtaaat ggcccgcctg gcattatgcc     180
cagtacatga ccttatggga ctttcctact tggcagtaca tctacgtatt agtcatcgct     240
attaccatgt cgaggccacg ttctgcttca ctctccccat ctcccccccc tccccacccc     300
caatttgtta tttatttatt ttttaattat tttgtgcagc gatggggggg gggggggggg     360
gcgcgcgcca ggcggggcgg ggcggggcga gggcggggc gggcgaggc ggagaggtgc       420 ggcggcagcc aatcagagcg cgcgctccg aaagtttcct tttatggcga ggcggcggcg     480
gcggcggccc tataaaaagc gaagcgcgcg gcggcggga gcaagctcta gccgcgcggc     540
gggcgggagt cgctgcgcgc tgccttcgcc ccgtgccccg ctccgccgcc gcctcgcgcc     600
gcccgccccg gctctgactg accgcgttac tcccacaggt gagcgggcgg gacggccctt     660
```

```
ctcctccggg ctgtaattag cgcttggttt aatgacggct tgtttcttt ctgtggctgc      720 gtgaaagcct tgaggggctc cgggagggcc ctttgtgcgg ggggagcggc tcggggctgt      780
ccgcgggggg acggctgcct tcggggggga cggggcaggg cggggttcgg cttctggcgt      840
gtgaccggcg gctctagagc ctctgctaac catgttcatg ccttcttctt tttcctacag      900
ctcctgggca acgtgctggt tattgtgctg tctcatcatt ttggcaaaga attggatcca      960
ccggtgcggc cgcacgcgtc tcgag                                            985
```

<210> SEQ ID NO 45
<211> LENGTH: 1569
<212> TYPE: DNA
<213> ORGANISM: Artificial sequence
<220> FEATURE:
<223> OTHER INFORMATION: synthetic sequence
<220> FEATURE:
<221> NAME/KEY: misc_feature
<222> LOCATION: (124)..(1569)
<223> OTHER INFORMATION: mSncg-1.45kb promoter

<400> SEQUENCE: 45

```
ccattgacgt caataatgac gtatgttccc atagtaacgc caatagggac tttccattga       60
cgtcaatggg tggagtattt acggtaaact gcccacttgg cagtacatca agtgtatcat      120
atgggtccca tgccactagt gggagctgtg ttacctgttg cagccccacc caaagcccct      180
gctataggtc aagcaggaat caccctgcca tccccagcct ggggcctgga gtaccagatc      240
caggaaacta gcatcccttta gctatagaga tagccacaca tcagcccatt cctcagatgt      300
gtatctgggg ctcagacatc atctcccgat ctccgacaag gcaggatttt ccttaccgtc      360
tgatggggtc tctgctggta tcctcagccc ctagtctcca gccttcaggc atgccgggcc      420
tattgagatg ggagaacttg gtaccggggt cctgtgccca ggaccctagc agtccccagc      480
tcaggtacac cccaaagccc agcagcagtg tcgggatcat ggtgagggc tcctgtgctg      540 atgctcagcc ttacaagtga ctctcaaatt tgctggtgat gtggtcttca agcgaaatgt      600
cagaaagaaa agaaaacacg aggacaacaa agggaggaag tggcctggtc cggcccaccc      660
ggcaagtctc atccgccccc gccccgccc cttccagcct ggcccccttg gaggcctcca      720
accactcagg tcaattcctg tgtcctgagg gcacttgaat cagggacacg ggatttggta      780
gacacataaa ggtggcccca ttaaacttat ttctccagga ctctgtcgtg ggcctggagg      840
agatctggtg ccacccatac tgttggccag gaagtgggga acgggcacat cacacctgct      900
cggcaccttg ggctatggga actagcaggt gggtgggaac tcagagaagg aaagggacta      960
tgctagaatc acacagcggg cagcccagtc tagggcatgg ggagcagctt tgggtgtttc     1020
tggcctcagc cttccaacag gttggctag agctccaggc tcaagagcat ccaggataca     1080
gtggggaact ggataacagg gcagcctgca ggttggccat tcattggatt ggccctgacc     1140
ccggcccagc ctgggacact gaggcatcat cagtcaaggc actttcttc tgcatataag     1200 agccagggca cgagaccacc agggcttttcc aaggatgaat gaggtgtaat gatagattag     1260
gatatgtcca gcctccaaca cgctctccct cccccagggc caacaagagt cagcagggca     1320
gaatagagcc agtaggggcc cgggccctgc tcgctggtat ccccgtgagg catgccttct     1380
ctctggcccg ccctccctgc ccccaccctg gcccgggctg gctgggctcc agccagcagc     1440
cacagcatca atatttcatc tgcgtcaata agaggcagta gcagcagaga cagcggctgc     1500
ggcagcactc cagtccatag cttgcagcag ccaggttcca tccttgcaaa caccatggac     1560
```

```
gtcttcaag                                                              1569

<210> SEQ ID NO 46
<211> LENGTH: 1148
<212> TYPE: DNA
<213> ORGANISM: Artificial sequence
<220> FEATURE:
<223> OTHER INFORMATION: synthetic sequence
<220> FEATURE:
<221> NAME/KEY: misc_feature
<222> LOCATION: (124)..(1148)
<223> OTHER INFORMATION: mSncg-1.03b promoter

<400> SEQUENCE: 46
ccattgacgt caataatgac gtatgttccc atagtaacgc caatagggac tttccattga        60
cgtcaatggg tggagtattt acggtaaact gcccacttgg cagtacatca agtgtatcat       120
atgtcagcct tacaagtgac tctcaaattt gctggtgatg tggtcttcaa gcgaaatgtc       180
agaaagaaaa gaaaacacga ggacaacaaa gggaggaagt ggcctggtcc ggcccacccg       240
gcaagtctca tccgcccccg cccccgcccc ttccagcctg gccccttgg aggcctccaa        300 ccactcaggt caattcctgt gtcctgaggg cacttgaatc agggacacgg gatttggtag       360
acacataaag gtgccccat  taaacttatt tctccaggac tctgtcgtgg gcctggagga       420
gatctggtgc cacccatact gttggccagg aagtggggaa cgggcacatc acacctgctc       480
ggcaccttgg gctatgggaa ctagcaggtg ggtgggaact cagagaagga aagggactat       540
gctagaatca cacagcgggc agcccagtct agggcatggg gagcagcttt gggtgtttct       600
ggcctcagcc ttccaacagg tttgctaga  gctccaggct caagagcatc caggatacag       660
tggggaactg gataacaggg cagcctgcag gttggccatt cattggattg ccctgaccc        720 cggcccagcc tgggacactg aggcatcatc agtcaaggca cttttcttct gcatataaga       780
gccagggcac gagaccacca gggctttcca aggatgaatg aggtgtaatg atagattagg       840
atatgtccag cctccaacac gctctccctc ccccagggcc aacaagagtc agcagggcag       900
aatagagcca gtaggggccc gggccctgct cgctggtatc cccgtgaggc atgccttctc       960
tctggcccgc cctccctgcc cccacccctgg cccgggctgg ctgggctcca gccagcagcc      1020
acagcatcaa tatttcatct gcgtcaataa gaggcagtag cagcagagac agcggctgcg      1080
gcagcactcc agtccatagc ttgcagcagc caggttccat ccttgcaaac accatggacg      1140
tcttcaag                                                              1148

<210> SEQ ID NO 47
<211> LENGTH: 780
<212> TYPE: DNA
<213> ORGANISM: Artificial sequence
<220> FEATURE:
<223> OTHER INFORMATION: synthetic sequence
<220> FEATURE:
<221> NAME/KEY: misc_feature
<222> LOCATION: (124)..(780)
<223> OTHER INFORMATION: mSncg-0.66kb promoter

<400> SEQUENCE: 47
ccattgacgt caataatgac gtatgttccc atagtaacgc caatagggac tttccattga        60
cgtcaatggg tggagtattt acggtaaact gcccacttgg cagtacatca agtgtatcat       120
atgctatggg aactagcagg tgggtgggaa ctcagagaag gaaagggact atgctagaat       180
cacacagcgg gcagcccagt ctagggcatg ggagcagct  ttgggtgttt ctggcctcag       240
ccttccaaca ggtttggcta gagctccagg ctcaagagca tccaggatac agtggggaac       300
```

```
tggataacag ggcagcctgc aggttggcca ttcattggat tggccctgac cccggcccag    360
cctgggacac tgaggcatca tcagtcaagg cacttttctt ctgcatataa gagccagggc    420
acgagaccac cagggctttc caaggatgaa tgaggtgtaa tgatagatta ggatatgtcc    480
agcctccaac acgctctccc tccccaggg ccaacaagag tcagcagggc agaatagagc     540
cagtaggggc ccgggccctg ctcgctggta tccccgtgag gcatgccttc tctctggccc    600
gccctccctg cccccaccct ggcccgggct ggctgggctc cagccagcag ccacagcatc    660
aatatttcat ctgcgtcaat aagaggcagt agcagcagag acagcggctg cggcagcact    720
ccagtccata gcttgcagca gccaggttcc atccttgcaa acaccatgga cgtcttcaag    780
```

<210> SEQ ID NO 48
<211> LENGTH: 388
<212> TYPE: DNA
<213> ORGANISM: Artificial sequence
<220> FEATURE:
<223> OTHER INFORMATION: synthetic sequence
<220> FEATURE:
<221> NAME/KEY: misc_feature
<222> LOCATION: (124)..(388)
<223> OTHER INFORMATION: mSncg-0.27kb promoter

<400> SEQUENCE: 48

```
ccattgacgt caataatgac gtatgttccc atagtaacgc caatagggac tttccattga     60
cgtcaatggg tggagtattt acggtaaact gcccacttgg cagtacatca agtgtatcat    120
atgaagagtc agcagggcag aatagagcca gtagggggccc gggccctgct cgctggtatc    180
cccgtgaggc atgccttctc tctggcccgc cctccctgcc cccacctgg cccgggctgg     240 ctgggctcca gccagcagcc acagcatcaa tatttcatct gcgtcaataa gaggcagtag    300
cagcagagac agcggctgcg gcagcactcc agtccatagc ttgcagcagc caggttccat    360
ccttgcaaac accatggacg tcttcaag                                       388
```

<210> SEQ ID NO 49
<211> LENGTH: 3077
<212> TYPE: DNA
<213> ORGANISM: Artificial sequence
<220> FEATURE:
<223> OTHER INFORMATION: synthetic sequence
<220> FEATURE:
<221> NAME/KEY: promoter
<222> LOCATION: (124)..(3077)
<223> OTHER INFORMATION: mThy1 promoter

<400> SEQUENCE: 49

```
ccattgacgt caataatgac gtatgttccc atagtaacgc caatagggac tttccattga     60
cgtcaatggg tggagtattt acggtaaact gcccacttgg cagtacatca agtgtatcat    120
atggagcaga tctccagcca agaggcaaag gaatggggga agctggaggg cctccctctg    180
gttatccagg cttctgaagg ttcaagcaaa gaaaggggtta caaccttaaa aggagagcgt    240 cccgggtat gggtagaaga ctgctccacc ccgaccccca gggtccctaa ccgtcttttc     300
cctgggcgag tcagcccaat cacaggactg agagtgcctc tttagtagca gcaagccact    360
tcggacaccc aaatggaaca cctccagtca gccctcgccg accaccccac cccctccatc    420
cttttccctc agcctccgat tggctgaatc tagagtccct ccctgctccc ccctctctcc    480
ccacccctgg tgaaaactgc gggcttcagc gctgggtgca gcaactggag gcgttggcgc    540
accaggagga ggctgcagct aggggagtcc aggtgagagc aggccgacgg gagggacccg    600
```

```
cacatgcaag gaccgccgca gggcgaggat gcaagccttc cccagctaca gttttgggaa    660
aggataccag ggcgctccta tatggggcg cgggaactgg ggaaagaagg tgctcccagg    720
tcgaggtggg agaggaaggc agtgcgggt cacgggcttt ctccctgcta acggacgctt    780
tcgaagagtg ggtgccggag gagaaccatg aggaaggaca tcaaggacag cctttggtcc    840
ccaagctcaa atcgctttag tggtgcgaat agagggagga ggtgggtggc aaactggagg    900
gagtccccag cgggtgacct cgtggctggc tgggtgcggg gcaccgcagg taagaaaacc    960
gcaatgttgc gggaggggac tgggtggcag gcgcggggga ggggaaagct agaaaggatg   1020
cgagggagcg gaggggggag ggagcgggag aatctcaact ggtagaggaa gattaaaatg   1080
aggaaatagc atcagggtgg ggttagccaa gccgggcctc agggaaaggg cgcaaagttt   1140
gtctgggtgt gggcttaggt gggctgggta tgagattcgg ggcgccgaaa acactgctgc   1200
gcctctgcca aatcacgcta cccctgtatc tagttctgcc aggcttctcc agccccagcc   1260
ccaattcttt tctctagtgt tccccttcc ctcccctgaa tcaagccc acactccctc   1320 ctccataacc cactgttatc aaatccaagt catttgccac ccaacaacca tcaggaggcg   1380
gaagcagacg ggaggagttt gagatcaact tgggctacat cacgagttcc aggctcacca   1440
aggcttctta aggagacctt gtctctaaaa ttaattaatt aattaattaa tagtccccctt   1500 tctctgccac agaaccttgg gatctggctc ctggtcgcag ctcccccac cccaggctga   1560 cattcactgc catagcccat ccggaaatcc tagtctattt ccccatggat cttgaactgc   1620
agagagaatg gcagagtggc ccgccctgtg caaaggatgt tcctagccta ggtggagctc   1680
gcgaactcgc agactgtgcc tctcttgggc aaggacaggc tagacagcct gccggtgtgt   1740
tgagctaggg cactgtgggg aaggcagaga acctgtgcag ggcagcaatg aacacaggac   1800
cagaaaactg cagccctagg aacactcaag agctggccat ttgcaagcat ctctggcctc   1860
cgtgcttctc actcatgtcc catgtcttat acaggcctct gtggcacctc gcttgcctga   1920
tctcatccct agccgttaag cttttctgcat gacttatcac ttggggcata atgctggata   1980
cctaccattt tcttagaccc catcaaaatc ctatttgagt gtacggttcg gagaacctca   2040
tttatccggt aaatgtcttt tactctgctc tcagggagct gaggcaggac atcctgagat   2100
acattgggag aggagataca gtttcaataa aataataggt tgggtggagg tacatgccta   2160
taatgccacc actcaggaaa tggtggcagc ttcgtgagtt tgaggccaac ccaagaaaca   2220
tagtgaaacc ctgtcagtaa ataagtaagc aagtatttga gtatctacta tatgctaggg   2280
ctgacctgga cattaggggt catcttctga acaaactagt gcttgaggga ggtatttggg   2340 gttttttgttt gtttaatgga tctgaatgag ttccagagac tggctacaca gcgatatgac   2400
tgagcttaac accctaaag catacagtca gaccaattag acaataaaag gtatgtatag   2460
cttaccaaat aaaaaaattg tattttcaag agagtgtctg tctgtgtagc cctggctgtt   2520
cttgaactca ctctgtagac caggctggcc tggaaatcca tctgcctgcc tctgcctctc   2580
tgcctctctg cctctctgcc tctctctctg cctctctctg cctctctctg cccctctctg   2640 ccctctctg ccctctctg ccctctctg ccgccctctg ccttctgccc tctgccctct   2700
ggcctctggc ctctgccctc tgccctctgg cctctgcct ctgcctctgc tcttgagtg   2760 ctggaatcaa aggtgtgagc tctgtaggtc ttaagttcca gaagaaagta atgaagtcac   2820
ccagcaggga ggtgctcagg gacagcacag acacacaccc aggacatagg ctcccacttc   2880
cttggctttc tctgagtggc aaaggacctt aggcagtgtc actccctaag agaagggat   2940 aaagagaggg gctgaggtat tcatcatgtg ctccgtggat ctcaagccct caaggtaaat   3000
```

```
ggggacccac ctgtcctacc agctggctga cctgtagctt tccccaccac agaatccaag    3060
tcggaactct tggcacc                                                   3077

<210> SEQ ID NO 50
<211> LENGTH: 1518
<212> TYPE: DNA
<213> ORGANISM: Artificial sequence
<220> FEATURE:
<223> OTHER INFORMATION: synthetic sequence
<220> FEATURE:
<221> NAME/KEY: promoter
<222> LOCATION: (124)..(1518)
<223> OTHER INFORMATION: mIsl2 promoter

<400> SEQUENCE: 50
ccattgacgt caataatgac gtatgttccc atagtaacgc caatagggac tttccattga      60
cgtcaatggg tggagtattt acggtaaact gcccacttgg cagtacatca agtgtatcat     120
atggactgca accatttccc agcccagcag cttcggctct tagcagttgg accgccgcgc     180
ctgaattaga tagatctcgg gcagcgaggc ctgcgggatc caagtccgga catagctttt     240
ggtcgagata ctttatccca gaagcccacc cgcgccccac ttagagaggt atcaagtttt     300
tggtgtcctt tcagaatggg agtgagggac caacagacca ccgttggata aacactgttt     360
gtacctcatc gatttgtctt tcaacccttt gaaacaaaat tcacaacgat ttttgtttaa     420
aaaaatcccg agtcttagaa atcgcagatt tttctaggat taaaaagcca ccgggaagac     480
ggtaaattac cccgtgtccc acatttgttt ctgattagtt gtgttgtaat tggtttgtgt     540
aacccaaaat cagagagttc gtaaaaatct tttactgtat gagtgacaca tcacagcact     600 gttttaggc tctatgcagc tgagaggaga aggagaggg tgggagtcag catcaatta      660 accaaaagag caaaagtag gagggaggaa aagtgcctag gccagggtgg gtgggaggac     720
tgtggctcta agtctctgga ttccttttgg cttacccacc tgcaacatcg agttttctac     780
aggcggcgcg ggtgggaaag tccgcataga gtttatccaa acccaggtgc tcatttccta     840
cccgttctcc ctaacttgga ccccgccgaa caaaggctca ggcccaccag ggagaaaggt     900
ggccggctgg accagtgatg gtcccgaaac agcgaatcct cttttctccc tcaaggtctg     960
tcgtccccag gaggaatttt taatttaaaa attataaaag aaaaacactt ttaagggga    1020 gacgactctc atctattccc agaagactat tgccttgcta ggcaaacgcc ctacaagtcc    1080
gaagaaagcg cggcgctgcg gcagagcccg cggggtggag atgcggcttc caagggattg    1140
cgggacccgg ggctgcagag aggatctagg aaggtttcgg ggagggggc tgcgctccat    1200 tgttcactcc gaaccaatca gagctttccc acttcctccc agccaatctc cctgcgcctc    1260
cgtgtctacc ccagcccacc ctccgggtcc ccatcatctc ccgagcaagc cccagggcgg    1320
tgggagagct gggtgacgct acaggtcccg cctccagctc gggcccggg cgagtgcgtg    1380 ctgacgtcat gctgcgtgcg ggccggtgcg gaatcgctcc ttcaactccg ggggcagga    1440 gttagttagc aaagagcaga ggctgggcgc tcgaccctgg tccttctgtc cccggccgca    1500
agctttgctc acatctct                                                 1518

<210> SEQ ID NO 51
<211> LENGTH: 1243
<212> TYPE: DNA
<213> ORGANISM: Artificial sequence
<220> FEATURE:
<223> OTHER INFORMATION: synthetic sequence
<220> FEATURE:
```

<221> NAME/KEY: promoter
<222> LOCATION: (124)..(1243)
<223> OTHER INFORMATION: mSynI

<400> SEQUENCE: 51

| | | | | | |
|---|---|---|---|---|---|
| ccattgacgt | caataatgac | gtatgttccc | atagtaacgc | caatagggac | tttccattga | 60 |
| cgtcaatggg | tggagtattt | acggtaaact | gcccacttgg | cagtacatca | agtgtatcat | 120 |
| atgtgagcct | tcttattcag | accaccaaaa | ttactttatt | tttccacatg | aaagtattat | 180 |
| gtggcttcct | gtctgcaaag | aggaagacat | ccatgaacac | taatgacact | gggtttgggc | 240 |
| tatgtccgga | gcagaggaat | gaggccatgt | agactaaata | tgtgcatgtg | gaggaggctg | 300 |
| aaaacacatc | agagctagcg | ctgcaggaaa | tgcttctgca | ttgcataccc | agagtttcct | 360 |
| tgctcatctg | ggagtctgtg | tttttcctag | atgtgtgcac | ttgtgtgaga | ttctctgggt | 420 |
| gtgagtcaaa | gtgttatctg | aatgtgtaat | gtgtgctcaa | tatgctcatg | tgtgttaccc | 480 |
| tgagcttctg | tgtctacata | tatacctgga | tgcctgtgtg | ttctgtgatg | tacatatata | 540 |
| ttctgtctt | ccttccttt | ctatttgtgt | tattccatgt | gttctttcag | attctcacca | 600 |
| ccaagggcaa | ggatatgtta | actacccaag | tgtccacctc | cgcctgtctg | gtgatgttta | 660 |
| cgccaccccc | gtgctctttt | ctttgcccga | cagagttgtt | ataggagatg | tctccccggg | 720 |
| aacactgcag | gaaggagaat | ttctacattt | atgttcccct | ctgagtgtgc | ttctatcccc | 780 |
| aaaatgcctt | caaaggtgaa | aatcaacact | ggaaacccaa | gtatctggga | agggcaagag | 840 |
| tgtgtaagtg | caagttagcc | taaggaatag | gaagaggttg | gtaaacaggg | taggatcgtg | 900 |
| ggagggagtt | tcgttactac | aggtccggac | cctcaggaca | agaaccccac | cccactccc | 960 |
| caaattgcgc | atccccgcc | cccatcagag | ggggaggga | agaggttgcg | gcgcggcgca | 1020 |
| tgcgcactgt | cggattcagc | accgcggtca | gagccttcgc | ctccgctgcc | ggcgcgcacc | 1080 |
| accacctccc | cagcaccaaa | ggctgactga | cgtcactcac | tagccctccc | caaactcccc | 1140 |
| ttcctcgccg | ccttggtcgc | gtccatgctg | ccgtgagtcc | agtcggaccg | caccacgaga | 1200 |
| ggtgcaagat | agggaggtgc | gggcgcgacc | atacgctctg | cgg | | 1243 |

<210> SEQ ID NO 52
<211> LENGTH: 1413
<212> TYPE: DNA
<213> ORGANISM: Artificial sequence
<220> FEATURE:
<223> OTHER INFORMATION: synthetic sequence
<220> FEATURE:
<221> NAME/KEY: promoter
<222> LOCATION: (124)..(1413)
<223> OTHER INFORMATION: mCamKIIa promoter

<400> SEQUENCE: 52

| | | | | | |
|---|---|---|---|---|---|
| ccattgacgt | caataatgac | gtatgttccc | atagtaacgc | caatagggac | tttccattga | 60 |
| cgtcaatggg | tggagtattt | acggtaaact | gcccacttgg | cagtacatca | agtgtatcat | 120 |
| atgccattat | ggccttaggt | cacttcatct | ccatggggtt | cttcttctga | ttttctagaa | 180 |
| aatgagatgg | gggtgcagag | agcttcctca | gtgacctgcc | cagggtcaca | tcagaaatgt | 240 |
| cagagctaga | acttgaactc | agattactaa | tcttaaattc | catgccttgg | gggcatgcaa | 300 |
| gtacgatata | cagaaggagt | gaactcatta | gggcagatga | ccaatgagtt | taggaaagaa | 360 |
| gagtccaggg | cagggtacat | ctacaccacc | cgcccagccc | tgggtgagtc | cagccacgtt | 420 |
| cacctcatta | tagttgcctc | tctccagtcc | taccttgacg | ggaagcacaa | gcagaaactg | 480 |
| ggacaggagc | cccaggagac | caaatcttca | tggtccctct | ggaggatgg | gtggggagag | 540 |

```
ctgtggcaga ggcctcagga gggcccctgc tgctcagtgg tgacagatag gggtgagaaa      600
gcagacagag tcattccgtc agcattctgg gtctgtttgg tacttcttct cacgataagg      660
tggcggtgtg atatgcacaa tggctaaaaa gcagggagag ctggaaagaa acaaggacag      720
agacagaggc caagtcaacc agaccaattc cagaggaag caaagaaacc attacagaga       780
ctacaagggg gaagggaagg agagatgaat tagcttcccc tgtaaaccttt agaacccagc     840 tgttgccagg gcaacggggc aatacctgtc tcttcagagg agatgaagtt gccagggtaa      900
ctacatcctg tctttctcaa ggaccatccc agaatgtggc acccactagc cgttaccata      960
gcaactgcct ctttgcccca cttaatccca tcccgtctgt taaagggcc ctatagttgg      1020 aggtggggga ggtaggaaga gcgatgatca cttgtggact aagtttgttc gcatcccctt     1080
ctccaacccc ctcagtacat caccctgggg gaacagggtc cacttgctcc tgggcccaca    1140
cagtcctgca gtattgtgta tataaggcca gggcaaagag gagcaggttt taaagtgaaa    1200
ggcaggcagg tgtggggag gcagttaccg gggcaacggg aacagggcgt ttcggaggtg    1260
gttgccatgg ggacctggat gctgacgaag gctcgcgagg ctgtgagcag ccacagtgcc    1320
ctgctcagaa gccccaagct cgtcagtcaa gccggttctc cgtttgcact caggagcacg   1380
ggcaggcgag tggcccctag ttctgggggc agc                                 1413
```

<210> SEQ ID NO 53
<211> LENGTH: 1406
<212> TYPE: DNA
<213> ORGANISM: Artificial sequence
<220> FEATURE:
<223> OTHER INFORMATION: synthetic sequence
<220> FEATURE:
<221> NAME/KEY: promoter
<222> LOCATION: (124)..(1406)
<223> OTHER INFORMATION: mTubb3

<400> SEQUENCE: 53

```
ccattgacgt caataatgac gtatgttccc atagtaacgc caatagggac tttccattga      60
cgtcaatggg tggagtattt acggtaaact gcccacttgg cagtacatca agtgtatcat     120
atgctggaac cacagaaagc cacatcatgg acacattgtg ggggagggggc atctcttgag    180 aacaaaagac ccatttctaa actcggctaa cttggatgct taccctcaga gaaagttgta     240
tgcgcagccg ctctatccag cgtgcacccg tgcgtgcaaa ctggacgaag gcatctgcag     300 gtgttttttaa gcttttttagc ggctcttgtg aaatgaatgt ttgtggacca ttgaagtgtg    360
gtactattgt ctcagattct tcccgaagaa tttttctgtca ctgaaatatc aaatagtcct    420
cataaggtgt cactggtcct agatgaatat taaatcagtg ttgtctgtga atttgcatgc     480
cctcctgatt ctgcttccca atgggccccc tccacacaca gtctccttac ctaggtagct     540
ccagctcacc tcgtgccccc tcttcaccct cacttgtacc agaagcacaa gggtaccaat     600 gacatcagge atggctcaga caaaaaaaga ctgttcgaca tgctccactg agtgggttgt     660
atatccttag aatttttcac agagatttttc atggagcagg ggtacttgcc agatactgtg    720
tgtgcatcct cacaccccag gtacatttgc accctcggcg cagccctttg tggagccgcg    780
gactggtagc cctctcttct ccagaaaata gtgacctcag agttcggagc tataatccgc     840
caccgtcctg actagcgtcc ccaggtctgc acagaggtct caagaagggt ttcgcttccc     900
ctgcctctcc cacctcaagc gactcggcgg actcagagaa tatgggtctt gattcttaag     960
cacttgagag aaagaaagac cctcttcaca aagctgcagg gtggggatgg ggcagggaca   1020
```

```
aaatgggag gcagctactg gggtggggca ctaagggggcc tgggttctat tgtccccaga      1080
gcggattgcc caccggtggc ccctcctccg aaggcgcggc cagacttgct ccgcattgtg      1140
cgggcggatc tcggtgccgg tgctgatgct gcagagcctg ccgcattgtg cggcgctcca      1200
gcattggccc gcagcgctta catcagccag cgagggcggg gcagcctctt ataagagggc      1260
gcggcggagg ctgccgatcc tccgcagcct gctgtccgcc tgccttttcg tctctagccg      1320
cgtgaagtca gcatgaggga gatcgtgcac atccaggccg gccagtgcgg caaccagata      1380
ggggccaagg tgaggctgag ccgtcc                                           1406

<210> SEQ ID NO 54
<211> LENGTH: 624
<212> TYPE: DNA
<213> ORGANISM: Artificial sequence
<220> FEATURE:
<223> OTHER INFORMATION: synthetic sequence
<220> FEATURE:
<221> NAME/KEY: promoter
<222> LOCATION: (124)..(624)
<223> OTHER INFORMATION: mPGK promoter

<400> SEQUENCE: 54
ccattgacgt caataatgac gtatgttccc atagtaacgc caatagggac tttccattga       60
cgtcaatggg tggagtattt acggtaaact gcccacttgg cagtacatca agtgtatcat      120 atgagggggag gcgcttttcc caaggcagtc tggagcatgc gctttagcag ccccgctggg      180
cacttggcgc tacacaagtg gcctctggcc tcgcacacat tccacatcca ccggtaggcg      240
ccaaccggct ccgttctttg gtggcccctt cgcgccacct tctactcctc ccctagtcag      300
gaagttcccc cccgccccgc agctcgcgtc gtgcaggacg tgacaaatgg aagtagcacg      360
tctcactagt ctcgtgcaga tggacagcac cgctgagcaa tggaagcggg taggcctttg      420
gggcagcggc caatagcagc tttgctcctt cgctttctgg gctcagaggc tgggaagggg      480
tgggtccggg ggcgggctca gggggcgggct caggggcggg gcgggcgccc gaaggtcctc      540
cggaggcccg gcattctgca cgcttcaaaa gcgcacgtct gccgcgctgt tctcctcttc      600
ctcatctccg ggccttttcga cctc                                           624

<210> SEQ ID NO 55
<211> LENGTH: 1608
<212> TYPE: DNA
<213> ORGANISM: Artificial sequence
<220> FEATURE:
<223> OTHER INFORMATION: synthetic sequence
<220> FEATURE:
<221> NAME/KEY: promoter
<222> LOCATION: (124)..(1608)
<223> OTHER INFORMATION: mGAP43 promoter

<400> SEQUENCE: 55
ccattgacgt caataatgac gtatgttccc atagtaacgc caatagggac tttccattga       60
cgtcaatggg tggagtattt acggtaaact gcccacttgg cagtacatca agtgtatcat      120
atgcgttgtc tgcccgttgt ctgttaaaaa aagttcatgt ctaggaggga taaagaacaa      180
catgagctat ttaattagat acttgtcatc agtaatgaac aataagaaat catctggaaa      240
gttctttgac gtagtcactt agaaatgtta ccaacatttc agaaaagttg tctgtaaaac      300
tacctatgtc aagagtggct ccagagtgtc ctgtgcacat tgcctcccgt cctaaaatgt      360
gttggcatga ctgacattat tatagccact ttatagatgt aaagggctct ccaaggccac      420
acaataccaa atgtctaaac tttgcacaat acagatttac aagtcatatc gccccctcc      480
```

```
cccagaata gcagaggcac tagaaggaac tgaggtggac ttcatggtat gcatctttcc      540
tcaagacaga gtttacctgt gtccattgct ctcagaatgt aagacattaa atgttagtgt      600
tacagaaatc tgtcattcac agacactaag ctaattagaa agaatcacaa ctgtcaaaga      660
agcttgtgtg cataagcaaa taacccacta tgtagtttta gatatggagt ctaattccta      720
gaccatagtt tattccacat tcaagtgctc agaatgcttg actgctgtgt gtgtgtgtgt      780
gtgtgtgtgt agcgtactga cacatttgta ggtgatatat ttgtgcatag ctaagagtat      840
catatgtgtg cagttaggtt atataaataa aatcagttag tgttgagaaa actgaacctc      900
catgattatc aactgcgcgt aaaatctaat ggcagctgta acttatgtgc acctctaggt      960
cctctttgca ttttccttct tgtggtactg ggaagagga gagttagaaa agaaacagga     1020
gcattcctcg ggccccactt ccctaaaaca tgttccatcc aatctctcca actctctgga     1080
atatcctttc tacccccacc ccatagccct cccaatgcag tgcggaaagt cagtgggtaa     1140
ttgggtccag attggaggtg tttaaatatt catgaggctg gcaggggact gggaggggt      1200 gactgtctag aaatgggggt aggggctacg ggaagtgatt agtcactgga agctagcaaa     1260
caattctgag aaagggaccc agggagaagg aagaaaaaga ttgggtgggg agtggaggaa     1320
agaggagaag gaaggaagga aaaggagaga ggaaggaaag aggaggaagg gacgagaggg     1380
agagagaggg ggagagaggg agagagagag agagagagag agagagagag agagagagag     1440
agagagagag agagagagag agagagagag agaatgtgcg tgtgcggtga gcaatagctg     1500
tggaccttac agttgctgct aactgccctg gtgtgtgtga gggagagaga gagagagagg     1560
gagagggagg gagagggagg gagggaggga gagcgcgcta gcgcgaga                  1608

<210> SEQ ID NO 56
<211> LENGTH: 2598
<212> TYPE: DNA
<213> ORGANISM: Artificial sequence
<220> FEATURE:
<223> OTHER INFORMATION: synthetic sequence
<220> FEATURE:
<221> NAME/KEY: promoter
<222> LOCATION: (124)..(2598)
<223> OTHER INFORMATION: mRBPMS promoter

<400> SEQUENCE: 56
ccattgacgt caataatgac gtatgttccc atagtaacgc caatagggac tttccattga       60
cgtcaatggg tggagtattt acggtaaact gcccacttgg cagtacatca agtgtatcat      120
atggaaccag gattcagcga ctatgttgcc ttggagttgt tggggtatc ttgtctccac       180 aacactactt tgaattgcct aaaggcaggg cccttatctt cagctccac cctctcccgc       240 ctcaccccac cccaaccgc acacaaagcg gggaaggta agaatgtgg agtagggaga        300 aagagataaa cagttaaacc aagccataaa tgagaaatcg tgattggtgc ggcatgccag      360
acgaacttcc tcagagagac aggcaccatc cgctgaatcg tgggttttaa atgtctgtcc      420
aaactagtca aaagtctagg agcttacagg atctattgtt ggaaaagttc tctaggacca      480
ggaaaatgga aacttcctta ataataatgc tagcttccgc ctattgtaaa ccacaattgt      540
gcaagtatgg gtgttaggaa cctgaggctc gccccaccta taatctctaa aaccctggga      600
tatatatata tattcataca tacatacata tatgcacaca cacatataat gattgtaata      660
tatatgtgtg tgtgtatata tataatcagt gaaatgggag aatatgtatg tgtgtgtata      720
tatgtatgaa atatttattc attttataga tgaggaagtg gaagctatgc ggtcatccgg      780
```

```
tgttgggtaa ttgctttgat tctctagaga taaatgtctt gacctttgag gggcagtgag    840
ggatatttag tcaacaagta catatggagg gcctactacg ctccgggact acgctccagg    900
tagcctactt aagttatggc agagataaac aggacgtagt cctgtattcc aggaaggggc    960
tccccgtaga gtgatgtaaa cagacccgat tccagaacag tctggtgccg gctgtgcgag   1020
tctgaacagg ggcggccgga agcctagaga gcgatagcgg ccgaagtggg gggggcgggg   1080
ggaggctggg aggtttcgct gtactcgggc acccgcaatg gggtggcaag cggtgtcctg   1140
caaaagcggg gctcggtggt gggctgtccc gcgtgcccgt cacctttctg cccgggaaga   1200
accgagtctc ggcgggtatt gccacggagg gtgggtttgg gtgcacaccc gtcgtgaaaa   1260
gcaagcaaac aaaagtagcg cgctccagtc catgtgcccc ccaccctac cccgaaaggc    1320 ttgtcctcgg ctctgagccc cctctccaag cccaccgccg ctggcccgcc cagacgccta   1380
ggtccacggg gttggagaaa gaaggggcgg cccgaccttc cgcccgcggt cccgcggcc   1440 tcgtgaccc ggtgccgacc cccctcccc caagcccaac ccagcccagc ccagcccagc    1500
cctgggttcg accgctccgc cccgcgcccc tcctctcgcg gggggcttcg ctgtcccgat   1560
ccgcgtctct ctgggctgcg tccggccgcg cacgtccagg gagggcggag ggaggagagg   1620
agggagggga ggagaggagg gaggggagga gaggagggag gggaggaggg aggaaggcga   1680
gagaaagcgc gctgcgtgcg gccccgctgc ccagagcctg ccagcagcgc gtcctcggcg   1740
gctccggtcc caaccgcgcc cgccgcctcg cctcctcggt ctcggccgcg tcccgactcc   1800
ggggctcgcc cggcctctcg gaggtccccg cccgccggtc cgtctcggct ctccgctgcg   1860
ccgcccggct ccagccccgc agcccgcccc gggggaaggt agcagcgggc gagcgcgccc   1920
tcgccctcgc ctccaaccc gcgcccagt cccgcgcggc gacgaaggac cgggaagatg   1980
aacggcggcg gcaaagccga gaaggagaac accccgagcg aggccaacct tcaggaggag   2040
gaggtactga gggggactgg ctgggggcg cggggcgcac gggccggggc tgggggagt    2100 agcacgggac gcgggcgtcc ggagggcgcg ggactgggtc cacgcgcgtc cgcctgcctc   2160
tggttattgc ataagttttg aggactttcc cgagactttt gtaagtagaa tgctcagctt   2220
tgtctactcg ggatgttgaa agcggaatcg agagctgact cccgggtgac ctcagatgat   2280
tgggaccagg gagggtcagg acttgggttc ttgcgtcttg cagctggaaa ttggagggag   2340
ggaggtatgg cgaagggaga aactctggga aagttctcag taaagatac ttccgacccc    2400 agctcccctc cctctcttac tccctccctc cctttcggtg ttaaaagttc tgggtgaaat   2460
atcttcttag ctgagacatt ttggattaat agataactca taggacgcat tcttctccga   2520
tgagtcggag accccgccg aacctgggag aggtcgaatg tggggtggg ggcgtagagt    2580 aacaagggct aaaagctt                                                2598
```

<210> SEQ ID NO 57
<211> LENGTH: 1472
<212> TYPE: DNA
<213> ORGANISM: Artificial sequence
<220> FEATURE:
<223> OTHER INFORMATION: synthetic sequence
<220> FEATURE:
<221> NAME/KEY: promoter
<222> LOCATION: (124)..(1472)
<223> OTHER INFORMATION: hSncg promoter

<400> SEQUENCE: 57

```
ccattgacgt caataatgac gtatgttccc atagtaacgc caatagggac tttccattga     60
cgtcaatggg tggagtattt acggtaaact gcccacttgg cagtacatca agtgtatcat    120
```

```
atgccaaggt ccaggccctc ttaccgtcct acggggtcct tgccggtgtc ctcagcctct      180
gccttccaga ccccaggtgt cctggagctc tgcagatcag agaggctagt actggaagcc      240
tgggcccatg cccccagcag ccccagccc aggggcccc caaggctgaa cagcaagctc       300
aggatcatct tggtggtggg gcaggctcag ctcacactca gccttggcaa gtagctccag      360
aaactgctag tgacgttgtc ttcaagttaa atctcaggag gaaagaaaaa tacgaggaca      420
acaaagagag gaagtggcct gggccggcct accggtggg tcttgtcctg cccccaact       480 accctggctg ccccacagg ggccgccaac cacacaagcc agttcctgtc cctgaggact       540
tggctcaggg actctgggaa tgtggtagac atggggtggc cccaccaaat gcatccttat      600
gggaacctgc tccctgggag ccatgaaaag agcgtggact tcgaggtggg gccacaggaa      660
gtggtcaggt ccatctcagg ggacctgctg cccatccaca ctgctggcca ggaaatgggg      720
ggcaattcat gcctcctcag caccttcagc actgggcggc tcaaagaagg aagggacta      780 ttctggggtc acacagcatg cagccagagg ccaaggcatg aggaagtcct tcatttcccc      840 accccaccc acctcagatc tcccaaccgg tttcatggca gcccagggtc cagcggcatc      900
caggatgctg gtgggtagct gcacagccca ggccgcggga ggttggctgc tctcacctaa      960
caggcctatg tggccctgac ccctacctag gaagctgggg acaatggcca aggcgcctcc     1020
cctctctgtg cctgtctgtc caggtgcagc atagacacag cacccctggg gccaagagca     1080
cccagccagg gctgccccca tgggtgggca gggcagtaaa tgaatgaggg acaggttggg     1140
aggtggccag cccctccag cccatggagg cacggggca ggagagctgg gctgagccag       1200
caggagccca gggagcctgg tctctgcctt cctatcctgg aggaaggtga ggctgaacct     1260
ccttccctcc ctccctccct ccccgccccc actgcacgca gggctggctg ggctccagct     1320
ggcctccgca tcaatatttc atcggcgtca ataggaggca tcggggacag ccgctgcggc     1380
agcactcgag ccagctcaag cccgcagctc gcagggagat ccagctccgt cctgcctgca     1440
gcagcacaac cctgcacacc caccatggat gt                                   1472
```

<210> SEQ ID NO 58
<211> LENGTH: 2930
<212> TYPE: DNA
<213> ORGANISM: Artificial sequence
<220> FEATURE:
<223> OTHER INFORMATION: synthetic sequence
<220> FEATURE:
<221> NAME/KEY: promoter
<222> LOCATION: (124)..(2930)
<223> OTHER INFORMATION: hThy1 promoter

<400> SEQUENCE: 58

```
ccattgacgt caataatgac gtatgttccc atagtaacgc caatagggac tttccattga       60
cgtcaatggg tggagtattt acggtaaact gcccacttgg cagtacatca agtgtatcat      120
atgactcagt cctttttgtg ctgtctcctc ctctttccca gagttcctct ctctcttctc      180
ccactaggca gggatgagca agaggaatgg ctcacccttg agagctgggg tccatagccc      240
aggtcagttc tccagctctc ccacttacca gccaagacag gaggtgagga ttgagatggg      300
atgaacccag caggcggcca tgggttaaag gtcgccatga atgtaatgtg cccagcacag      360
tgcctgctaa aaggcaacac tcccttcctg gtctgaagac caaacaagca gactgtactc      420
aggaaagcca gaagaacctt ccagctgtct ggaccagaag gtgccagccc aggggctgaa      480
gaagacgtaa tgcccagagc aaaaagcgcc tgcagccccc tgaagggctg ggtgctctgg      540
```

-continued

```
aatagatgag ggggcgaaat ggggctgggg accagggacg acagggtgg gtccagcacc    600 tgcctcgctt ccgaagggct gctccaacac tgaaaaacac ccaaccagct tcctttcaga    660
aagactggaa tattccaaaa cttctcactg gaggctccgg aggaggtggg ctccagctga    720
aaaggaaatg tggaggcgtg ggcgctcccg gcctgcatcc tgcacctctt acactttggt    780
tttcccacag actcctgaag aataggtcag aagaaagggt taaagcctta aaggggaac     840 aaccattgcg gggctcaggg aggaggataa tgttctttgg gctgccgcac cctgatcccc    900
ggggtcccga accctcccgt ccctggccag gcctgccagc cacagggtga gggccccctt    960
ccgccgcaac ctgccactct cacaccaatg cgggaccgcc ttctcttcct tccccacccc   1020
ccaccccacc ctgccgtcct ttctccccca atctccgcct ctgattggct gagccccgg    1080 ctccccgctc cccctctcct ccatcccggg tgaaaactgc gggctccgag ctgggtgcag   1140
caaccggagg cggcggcgcg tctggaggag gctgcagcag cggaagaccc cagtccaggt   1200
gggaactgga gccggtggga cctggggctc ggggaccgcc gtcaggcgcc catgcaagac   1260
ttcccaacac taggcttcgg gccacggtcc gagggcgccc agggaagaag ggcgcagagc   1320
ttagggaggg gcctgctttc caggcagggg cgggaggggg atgcttctgc agggcagggg   1380
ccgcgtggca ccctgatgtc tttcggggaa ggcgctcccg ggctttcgcc cgctggggga   1440
ctggtgtctg gggctgggc gctggagaac agggaggaag ggcaccaagg acagcctgtg    1500
ggtctacatt ccacccagac gtccccaaac ccagctcgca gaggcgggga ggaggacgga   1560
tgaaactgcg gggagaggat ggaggatggc gagctagagg gaatctgccg ggtgacctcg   1620
cggcgggctg gtgcgggc accggaggag aaggaagccg cagtgccgca ggcggggact    1680
gggtggaagg cgggcggacg ggggaggga gagctggaaa aggatgagag aggggaagg    1740 gggactcatt tgggaaagga gaggattgga atacggaaat ggattaagga tgaggcccgc   1800
cgggggcttg agagggagga agagcagacc ttctctgggt ctggagccgc ctgaggacac   1860
agaccagagg aaatgaatac agactgcacc tccccagccg ctctccaccc ctcccctggc   1920
tcttctaccc tctccagccc cagacccatt tcttccctt cttgctctgg ccattgctcc    1980
cccttcccct cctagatccc aagcccgcac aacatctcaa acaagagtcc tcgattcaaa   2040
agccagatgc cgaccccct tcctcctgga tctggctcag ggcagcagct ccaccccggg    2100
acagagagag cattgattgt agctgcagcc gccgcgggat cctagcctca cccgtcaagg   2160
ggctgagcgc cagggaccct gaactcgtct agtggtgcgc cctgcgcacc cgggcgcact   2220
caaccgaggc aatgccctgc gcgctctcgc gggtgcacgc cccttctgtg gcctctcctg   2280
ggcgagcact gctctgcaga taggctagac taccggctcc gcgtcgcctc gccaagggtt   2340
ggttcagcca aggctgcaaa aaacaaaaaa agaccaggca gacagcctat ccagggtggc   2400
tattgaaact gggctggaaa actgcagtcc caggaactcc agagagctgg acattgggaa   2460
gcatccttgg ctcacataca atcggagatc actatgtctt tctctcctcc aggaacacga   2520
ttagcttgtg tccatccag ataggaatag atgctccta tctgggagca tccttagcta    2580
tggtgaatgg tatctagcca tccactgggg atggcgagtg acttagggat tgtgtctca    2640 cgtatatgaa gcagtcatcg ccagatgttg gttgttttc ttaaccccca tcataacccg    2700
gtgggtatgt aagattcaga gagattcatt cattcattca caataaatat ctttggagtg   2760
tatgctatat gccagtaatc tgcaaacgga aacggtttg agcattgggg attttcttct    2820
gaacaggaaa tgggaagtcc ctaaatgggg agtctttgtt taacagatac agagttttac   2880
tttgaaagac aaaaagagtt ccggagatgg gctgcatagc aacgtgaatg             2930
```

<210> SEQ ID NO 59
<211> LENGTH: 1508
<212> TYPE: DNA
<213> ORGANISM: Artificial sequence
<220> FEATURE:
<223> OTHER INFORMATION: synthetic sequence
<220> FEATURE:
<221> NAME/KEY: promoter
<222> LOCATION: (124)..(1508)
<223> OTHER INFORMATION: hIsl2 promoter

<400> SEQUENCE: 59

```
ccattgacgt caataatgac gtatgttccc atagtaacgc caatagggac tttccattga      60
cgtcaatggg tggagtattt acggtaaact gcccacttgg cagtacatca agtgtatcat     120
atgcaggcgc acaccaagtt cttggtactc cttttaatgg gaaaacaaga acagacacca     180
tggttggata aatgttattt ataattcatg gccggtcctt tgaaccctttt caaacaaaac     240
ccacagcgat ttctttgaaa gaatgcctgg actgtgctca gagctctcag attttctcag     300
gaccaacgag ccgccgcctc gcagatacca ctgtaaatta cccagcgcct tacgttcgtt     360
tctgattatt tgcattgcag tgggtttgtt aatgaaggac aagagtttag aaaaatcttt     420
tattttggaa gttggacacg caatcgaccc cagcagtgtt cctaaaagga gctatgccat     480
ttggatgggg gaaaaatgag ggggcgggga agtccatgtt acatttaaaa caacaacagc     540
aacaaattaa aagcaaaaca aaacaacaaa aaaaggaag tggagcagga ggaggaggtg     600
gtggtggagg agagggagga ggggcagcag cagcggcagc agcagcaagg atggagtcag     660
gacccgtccc agtcccgggt gagcgctttt ggatctgggt tctggctcaa cccacgtaat     720
gccccaatct aaagttttct acgtgtgtgt ggataggaaa gtctaaatag agtttatcag     780
aacccaggtg gtcattctct acactctctc tagcttggac ccgaagaaca aaggcacatg     840
agaggagaaa ggtgaccagc tggacgatga cggtcacgtc caaacggatc ccccttgtcc     900
tcggctctct cgtcctgaga gtgggtttaa ttttttttttt tttaatttat ataagaaggg     960
agctcttaaa ggagagccat ctccaccctc aggtatccat cacccagctc cagcgcgcct    1020
gggaaaaccg ccccgaaagt ccaagaggaa gctcagagtt gtaacggccg cggagccagc    1080
tcggcggtga cgcaaggtcc agtccagatt gccaggcccg gggcatgaga gaggatcctt    1140
gtaggtttcg gaggtggggg ggctgcactc cattgttcac tccgggccaa tcagggttgg    1200
cccacttcct cccagccaat ctcccttcac ccccagcctc caacccaacc caccccgccc    1260
atcagccct ggatccccat cacctccccc gcatccccgg cagttctggg gaagcttcgt    1320
gacgccacag gtcccgcccc cagctccggc ccggggctag tgcgtgttga cgtcatgctg    1380
cgtgcgggcc ggtgcggaat cgctccttca actccgcggg gcagtaggag ttagttagca    1440
aagagccgag gccgggcgcg cgaccctcgt ccttctgccc ctggccgcac actttgcgca    1500
catctctt                                                             1508
```

<210> SEQ ID NO 60
<211> LENGTH: 693
<212> TYPE: DNA
<213> ORGANISM: Artificial sequence
<220> FEATURE:
<223> OTHER INFORMATION: synthetic sequence
<220> FEATURE:
<221> NAME/KEY: promoter
<222> LOCATION: (124)..(693)
<223> OTHER INFORMATION: hSynI promoter

```
<400> SEQUENCE: 60
ccattgacgt caataatgac gtatgttccc atagtaacgc caatagggac tttccattga      60
cgtcaatggg tggagtattt acggtaaact gcccacttgg cagtacatca agtgtatcat     120
atggcctgtg tggatgtggg agactaatct ccccgcgggc actgcgtgtg acctcacccc     180
cctctgtgag ggggttattt ctctactttc gtgtctctga gtgtgcttcc agtgcccccc     240 tcccccaaa aaatgccttc tgagttgaat atcaacacta caaaccgagt atctgcagag      300
ggccctgcgt atgagtgcaa gtgggtttta ggaccaggat gaggcggggt gggggtgcct     360
acctgacgac cgaccccgac ccactggaca agcacccaac ccccattccc caaattgcgc     420 atccccctatc agagagggggg aggggaaaca ggatgcggcg aggcgcgtgc gcactgccag    480
cttcagcacc gcggacagtg ccttcgcccc gcctggcgg cgcgcgccac cgccgcctca     540
gcactgaagg cgcgctgacg tcactcgccg gtcccccgca aactcccctt cccggccacc    600
ttggtcgcgt ccgcgccgcc gccggcccag ccggaccgca ccacgcgagg cgcgagatag    660
gggggcacgg gcgcgaccat ctgcgctgcg gcg                                 693

<210> SEQ ID NO 61
<211> LENGTH: 33
<212> TYPE: DNA
<213> ORGANISM: Artificial sequence
<220> FEATURE:
<223> OTHER INFORMATION: synthetic sequence

<400> SEQUENCE: 61
catgaattca gagatgtgag caaagcttgc ggc                                  33

<210> SEQ ID NO 62
<211> LENGTH: 36
<212> TYPE: DNA
<213> ORGANISM: Artificial sequence
<220> FEATURE:
<223> OTHER INFORMATION: synthetic sequence

<400> SEQUENCE: 62
ggaattccat atggagcaga tctccagcca agaggc                               36

<210> SEQ ID NO 63
<211> LENGTH: 271
<212> TYPE: DNA
<213> ORGANISM: Artificial sequence
<220> FEATURE:
<223> OTHER INFORMATION: synthetic sequence

<400> SEQUENCE: 63
ccattgacgt caataatgac gtatgttccc atagtaacgc caatagggac tttccattga      60
cgtcaatggg tggagtcata tgctctggcc cgccctccct gccccacccc tggcccgggc    120
tggctgggct ccagccagca gccacagcat caatatttca tctgcgtcaa taagaggcag    180
tagcagcaga gacagcggct gcggcagcac tccagtccat agcttgcagc agccaggttc    240
catccttgca aacaccatgg acgtcttcaa g                                   271
```

NEUROPROTECTION OF NEURONAL SOMA AND AXON BY MODULATING ER STRESS/UPR MOLECULES

CROSS REFERENCE

This application claims benefit of U.S. Provisional Patent Application No. 62/812,038, filed Feb. 28, 2019, which applications are incorporated herein by reference in their entirety.

GOVERNMENT RIGHTS

This invention was made with Government support under contract EY023295 awarded by the National Institutes of Health. The Government has certain rights in the invention.

INTRODUCTION

Optic neuropathies are a group of optic nerve (ON) diseases characterized by the progressive death of retinal ganglion cells (RGCs) and ON degeneration, which are the leading causes of irreversible blindness (Ghaffarieh and Levin, 2012; Benowitz et al., 2017; Carelli et al., 2017; DeBusk and Moster, 2018). RGCs relay visual information from retina to brain through the ON, which is formed by projection axons of RGCs. The ON is highly vulnerable to injury and insult by trauma, inflammation, ischemia, toxicity, hereditary deficits, glaucoma and high intraocular pressure, any of which can cause retrograde RGC death and ON degeneration. Optic neuropathy can also be associated with other central nervous system (CNS) neurodegenerative diseases (Carelli et al., 2017), including multiple sclerosis (Talman et al., 2010; Toosy et al., 2014; Balcer et al., 2015), Alzheimer's disease (McKinnon, 2003; Chiasseu et al., 2016) and amyotrophic lateral sclerosis (Minegishi et al., 2016; Wiggs and Pasquale, 2017). Lack of effective neuroprotective or regenerative therapy for RGCs and ON significantly impedes preservation of vision in patients with optic neuropathies.

Optic neuropathy is the most common clinical cause of irreversible blindness, and until now, with the present disclosure, there was no effective neuroprotective treatment to prevent RGC/ON degeneration. An increasing number of genes involved in RGC intrinsic signaling and are believed to play important roles in RGC/ON survival and regeneration. These genes are promising neural repair targets that could potentially be modulated directly by gene therapy, if RGC specific gene targeting could be achieved. Novel treatments are desperately needed. The instant disclosure provides novel compositions and methods of treatment for optic neuropathies.

SUMMARY

As described in the present disclosure, adeno associated virus (AAV)-mediated gene transfer was used to perform a low throughput in vivo screening with neuronal promoters, and the mouse γ-synuclein (mSncg) promoter identified herein (1446 base pairs (bp) in length) was found to provide specific, potent and sustained transgene expression in RGCs. The full length mSncg promoter was truncated into several smaller but functional variants of the promoter (1025 bp, 657 bp, and 265 bp in length) allowing SpCas9 to be incorporated into the AAV vector. AAV-mSncg promoter (using the 265 bp fragment) mediated CRISPR/Cas9 knockdown of pro-degenerative genes, C/EBP homologous protein (CHOP) and Sterile alpha and TIR motif-containing protein 1 (SARM1), in mouse RGCs increased survival of RGC somata and axons and promoted functional recovery. These results, therefore, successfully demonstrate that gene therapy employing an RGC-specific promoter with CRISPR/Cas9 gene editing can provide effective neuroprotection in optic neuropathies.

The present disclosure provides compositions and methods for treating a mammalian subject for an optic nerve (ON) neuropathy and/or reducing or ameliorating degeneration of axons and/or soma of RGCs. Aspects of the composition include a mammalian viral vector, comprising a murine γ-synuclein promoter, or functional fragment thereof, that promotes expression of a transgene specifically in retinal ganglion cells (RGCs), said promoter in operable linkage with an expression cassette encoding the transgene, wherein the expressed transgene inhibits activity of an expression product of an endogenous pro-neurodegenerative gene involved in an ER stress and/or UPR pathway that leads to axon or soma degeneration in the RGCs. Aspects of the methods include intravitreally administering the composition to treat the subject for the ON neuropathy. A variety of ON neuropathies may be treated by practicing the methods, including retinal ganglion cell degeneration, glaucoma, optic neuritis, ON traumatic injury and other ON-related diseases.

In some embodiments a promoter is provided for the selective expression of an operably linked gene in retinal ganglion cells (RGCs). In some embodiments the promoter comprises or consists of an mSncg promoter, optionally selected from the sequence set forth in SEQ ID NO:45, 46, 47, 48 or 63, or a sequence having at least 95% sequence identity to a sequence on SEQ ID NO:45, 46, 47, 48 or 63. In some embodiments the promoter sequence is provided in the context of a vector for expression, including without limitation a viral vector, e.g. an AAV vector. Cells of interest for expression include, without limitation, cells in the eye and progenitors thereof, e.g. retinal cells, particularly retinal ganglion cells, and their progenitors.

The promoter may further be operably linked to an expressible sequence, e.g. reporter genes, genes encoding a polypeptide of interest, regulatory RNA sequences such as miRNA, siRNA, anti-sense RNA, etc., and the like. Reporter gene sequences include, for example luciferase, beta-galactosidase, green fluorescent protein, enhanced green fluorescent protein, and the like as known in the art. The expressible sequence may encode a protein of interest, for example a therapeutic protein, receptor, antibody, growth factor, and the like. The expressible sequence may encode an RNA interference molecule. The expressible sequence is typically heterologous to the promoter, i.e. a gene not linked to the promoter in a native state.

BRIEF DESCRIPTION OF THE FIGURES

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

FIG. 1A a diagram of AAV vectors containing the various promoters; FIG. 1B confocal images of retinal cross sections in which EGFP expression is driven by various promoters in an AAV2 vector.

FIG. 2A confocal images of retinal wholemounts showing EGFP expression at varying intensity levels driven by diverse promoters in RGCs; FIG. 2B Low magnification epi-fluorescence images of wholemount optic nerve (ON) showing EGFP expression in RGC axons.

FIG. 3A Co-labeling AAV-mSncg-EGFP infected cells in mouse retina with RGC markers, RBPMS or Dil. FIG. 3B Quantification of EGFP/RBPMS double positive cells in retina. FIG. 3C Confocal images of wholemount retina showing EGFP+ and Dil+ RGCs. FIG. 3D Quantification of EGFP/Dil double positive cells in retina.

FIG. 4A Live scanning laser ophthalmoscopy (SLO) retina fundus images showing EGFP expression in RGCs at different time points after AAV intravitreal injection. FIG. 4B Quantification of EGFP fluorescence intensities at different time points after AAV intravitreal injection. FIG. 4C Confocal images of retina and ON wholemounts showing EGFP+ RGC somata and axons.

FIG. 5A Schematic illustration of the mouse Sncg gene and its promoters. The Sncg gene is located on chromosome 14 (34370274-34374669) adjacent to multimerine 2 gene (Mmrn2). The 1.45 kb mSncg includes partial sequence of the first intron and the whole first exon of Mmrn2, the non-transcription regions between Mmrn2 and mSncg genes, and the non-translated region of the first exon of mSncg. The green "boxes" represent non-translated regions. FIG. 5B Epi-fluorescence low magnification images of ON wholemounts showing EGFP expression in RGC axons. FIG. 5C Confocal images of wholemount retinas showing EGFP positive RGCs. FIG. 5D Confocal images of cross sections of retinas showing EGFP signals in different retina layers.

FIG. 6A-6C shows CHOP and SARM1 knock down by AAV-mSncg-CRISPR/Cas9 in mouse RGCs. FIG. 6A Confocal images of wholemount retinas showing AAV-mSncg-HA-SpCas9 expression in retina (upper panel) and the expression of C/S gRNAs in RGCs (GFP positive cells) and CHOP-mCherry inhibition. FIG. 6B Confocal images of wholemount retinas showing AAV-mSncg-Cre-mediated Flag-SpCas9 expression in retinas of LSL-Flag-SpCas9 mice, and SARM1-mCherry inhibition by C/S gRNAs-GFP. FIG. 6C Confocal images of cross sections of retinas showing CHOP and SARM1 mRNA levels in GCL by ISH.

FIG. 7A Representative OCT images of mouse retina. GCC: ganglion cell complex, including RNFL, GCL and IPL layers. FIG. 7B Quantification of GCC thickness, represented as percentage of GCC thickness in the injured eyes, compared to the intact contralateral eye. FIG. 7C Representative waveforms of PERG in the contralateral naïve (CL, red) and crush injured (black) eyes. P1: the first positive peak after the pattern stimulus; N2: the second negative peak after the pattern stimulus. FIG. 7D Quantification of P1-N2 amplitude, represented as percentage of P1-N2 amplitude in the injured eye, compared to the intact contralateral eye.

FIG. 8A-8D shows AAV-mSncg-CRISPR/Cas9 mediated CHOP/SARM1 inhibition promotes significant RGC soma and axon survival after ON crush injury. FIG. 8A Confocal images of wholemount retinas showing surviving EGFP positive (gRNA expressed cells) and RBPMS positive (red) RGCs. AAVs were injected intravitreally 2 weeks before ON crush and mice were sacrificed 14 days post crush (14 dpc). FIG. 8C Light microscope images of semi-thin transverse sections of ON with PPD staining. FIGS. 8B and 8D Quantification of surviving RGC somata and axons, represented as percentage of crush injured eyes compared to the sham contralateral control eyes.

FIG. 9A Epi-fluorescence images of human primary RGCs infected with AAV-mSncg-EGFP or AAV-hSncg-EGFP at the same ratio. FIG. 9B Epi-fluorescence images of human stem cell-derived RGCs infected with AAV-mSncg-EGFP or AAV-hSncg-EGFP at different ratio.

FIG. 10A-10C shows in vitro assays to select effective CHOP and SARM1 gRNAs. FIG. 10A Schematic illustration of AAV vectors for U6 promoter driven gRNA expression. The C/S gRNAs include 4 U6 promoters that drive 2 CHOP and SARM1 gRNAs individually. FIG. 10B Sequences of 4 CHOP gRNAs and SARM1 gRNAs tested in vitro. The red coded sequences are selected to make C/S gRNAs. (Control identified as SEQ ID NO: 5; C1 identified as SEQ ID NO: 6; C2 identified as SEQ ID NO: 7; C3 identified as SEQ ID NO: 8; C4 identified as SEQ ID NO: 9; S1 identified as SEQ ID NO: 10; S2 identified as SEQ ID NO: 11; S3 identified as SEQ ID NO: 12; S4 identified as SEQ ID NO: 13). FIG. 10C Co-transfection of SpCas9, gRNAs and reporters (CHOP-mCherry or SARM1-mCherry) in HEK293T cells to determine knock down effects.

FIG. 11A Live SLO fundus images of mouse retinas showing EGFP expression in RGCs and confocal images of retina cross sections showing EGFP expression in RGCs. FIG. 11B Confocal images of ON longitudinal sections showing regenerating fibers labeled with CTB-Alexa 488 at 14 dpc. (* denotes crush site).

DEFINITIONS

Figures 1A, 1B:
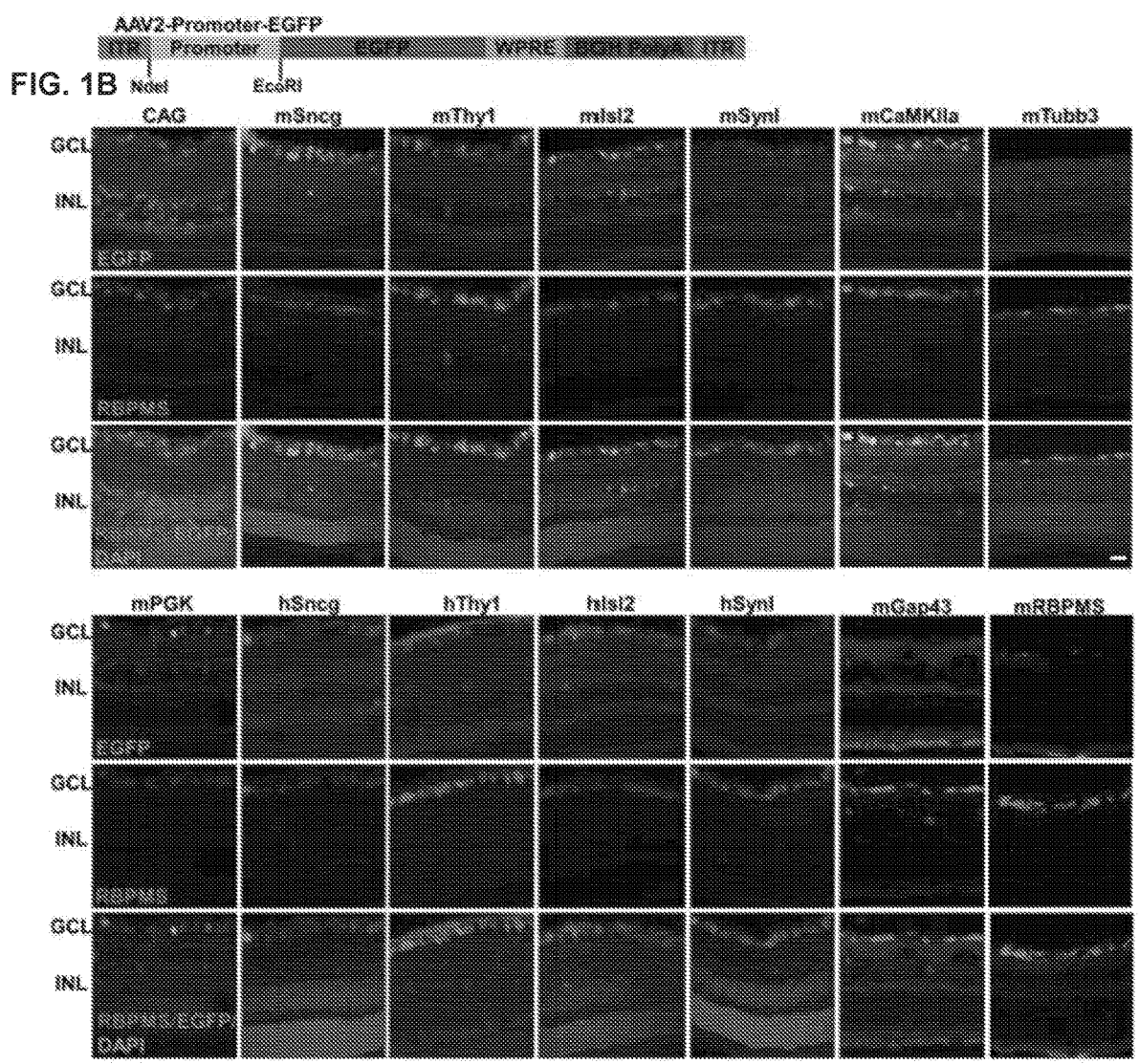
FIG. 1A-1B.

The terms "treatment," "treating," "treat" and the like are used herein to generally refer to obtaining a desired pharmacologic and/or physiologic effect. The effect can be prophylactic in terms of completely or partially preventing a disease or symptom(s) thereof and/or may be therapeutic in terms of a partial or complete stabilization or cure for a disease and/or adverse effect attributable to the disease. The term "treatment" encompasses any treatment of a disease in a mammal, particularly a human, and includes: (a) preventing the disease and/or symptom(s) from occurring in a subject who may be predisposed to the disease or symptom(s) but has not yet been diagnosed as having it; (b) inhibiting the disease and/or symptom(s), i.e., arresting development of a disease and/or the associated symptoms; or (c) relieving the disease and the associated symptom(s), i.e., causing regression of the disease and/or symptom(s). Those in need of treatment can include those already inflicted (e.g., those with cancer, e.g. those having tumors) as well as those in which prevention is desired (e.g., those with increased susceptibility to cancer; those with cancer; those suspected of having cancer; etc.).

The terms "recipient," "individual," "subject," "host," and "patient" are used interchangeably herein and refer to any mammalian subject for whom diagnosis, treatment, or therapy is desired, particularly humans. "Mammal" for purposes of treatment refers to any animal classified as a mammal, including humans, domestic and farm animals, and zoo, sports, or pet animals, such as dogs, horses, cats, cows, sheep, goats, pigs, camels, etc. In some embodiments, the mammal is human.

The terms "specific binding," "specifically binds," and the like, refer to non-covalent or covalent preferential binding to a molecule relative to other molecules or moieties in a solution or reaction mixture (e.g., an antibody specifically binds to a particular polypeptide or epitope relative to other available polypeptides). In some embodiments, the affinity of one molecule for another molecule to which it specifically binds is characterized by a $K_D$ (dissociation constant) of $10^{-5}$ M or less (e.g., $10^{-6}$ M or less, $10^{-7}$ M or less, $10^{-8}$ M or less, $10^{-9}$ M or less, $10^{-10}$ M or less, $10^{-11}$ M or less, $10^{-12}$ M or less, $10^{-13}$ M or less, $10^{-14}$ M or less, $10^{-15}$ M or less, or $10^{-16}$ M or less). "Affinity" refers to the strength of binding, increased binding affinity being correlated with a lower $K_D$.

The terms "antibody" and "immunoglobulin," as used herein, are used interchangeably may generally refer to whole or intact molecules or fragments thereof and modified and/or conjugated antibodies or fragments thereof that have been modified and/or conjugated. Antibody or immunoglobulin may refer to a class of structurally related glycoproteins consisting of two pairs of polypeptide chains, one pair of light (L) low molecular weight chains and one pair of heavy (H) chains, all four inter-connected by disulfide bonds. The structure of immunoglobulins has been well characterized (see for instance *Fundamental Immunology* Ch. 7 (Paul, W., ed., 2nd ed. Raven Press, N.Y. (1989); incorporated by reference herein). Briefly, each heavy chain typically is comprised of a heavy chain variable region (abbreviated as $V_H$) and a heavy chain constant region (abbreviated as $C_H$). The heavy chain constant region typically is comprised of three domains, $C_H1$, $C_H2$, and $C_H3$. Each light chain typically is comprised of a light chain variable region (abbreviated as $V_L$) and a light chain constant region (abbreviated herein as $C_L$). The light chain constant region typically is comprised of one domain, $C_L$. The $V_H$ and $V_L$ regions may be further subdivided into regions of hypervariability (or hypervariable regions which may be hypervariable in sequence and/or form of structurally defined loops), also termed complementarity determining regions (CDRs), interspersed with regions that are more conserved, termed framework regions (FRs).

Multispecific (e.g., bispecific) antibodies, which bind multiple species of antigen, may be readily engineered by those of ordinary skill in the art and, thus, may be encompassed within the use of the term "antibody" used herein where appropriate. Also, multivalent antibody fragments may be engineered, e.g., by the linking of two monovalent antibody fragments. As such, bivalent and/or multivalent antibody fragments may be encompassed within the use of the term "antibody", where appropriate, as the ordinary skilled artisan will be readily aware of antibody fragments, e.g., those described below, which may be linked in any convenient and appropriate combination to generate multivalent monospecific or polyspecific (e.g., bispecific) antibody fragments.

In the context of the present disclosure, exemplary antibody fragments can include, but are not limited to, antigen-binding fragments (Fab or F(ab), including Fab' or F(ab'), (Fab)$_2$, F(ab')$_2$, etc.); single chain variable fragments (scFv or Fv) which are genetically engineered fragments containing the variable region of the light chain and the variable region of the heavy chain expressed as two chains; single chain antibodies ("SCA") which are genetically engineered molecules containing the variable region of the light chain, the variable region of the heavy chain, linked by a suitable polypeptide linker as a genetically fused single chain molecule (SCAs may be in the form of multimers such as diabodies, triabodies, tetrabodies, etc. which may or may not be polyspecific (see, for example, WO 94/07921 and WO 98/44001)); and "third generation" (3G) molecules, etc., including single domain (typically a variable heavy domain devoid of a light chain) and "miniaturized" antibody molecules (typically a full-sized Ab or mAb in which non-essential domains have been removed), which are capable of binding the epitopic determinant.

The terms "co-administration" and "in combination with" include the administration of two or more therapeutic agents either simultaneously, concurrently or sequentially within no specific time limits. In one embodiment, the agents are present in the cell or in the subject's body at the same time or exert their biological or therapeutic effect at the same time. In one embodiment, the therapeutic agents are in the same composition or unit dosage form. In other embodiments, the therapeutic agents are in separate compositions or unit dosage forms. In certain embodiments, a first agent can be administered prior to (e.g., minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks before), concomitantly with, or subsequent to (e.g., 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks) after the administration of a second therapeutic agent.

The term "sample" as used herein relates to a material or mixture of materials, typically, although not necessarily, in fluid, i.e., aqueous, form, containing one or more components of interest. Samples may be derived from a variety of sources such as from food stuffs, environmental materials, a biological sample or solid, such as tissue or fluid isolated from an individual, including but not limited to, for example, plasma, serum, spinal fluid, semen, lymph fluid, the external sections of the skin, respiratory, intestinal, and genitourinary tracts, tears, saliva, milk, blood cells, tumors, organs, and also samples of in vitro cell culture constituents (including but not limited to conditioned medium resulting from the growth of cells in cell culture medium, putatively virally infected cells, recombinant cells, and cell components). In certain embodiments of the method, the sample includes a cell. In some instances of the method, the cell is in vitro. In some instances of the method, the cell is in vivo.

The terms "polynucleotide" and "nucleic acid," used interchangeably herein, refer to a polymeric form of nucleotides of any length, either ribonucleotides or deoxynucleotides. Thus, this term includes, but is not limited to, single-, double-, or multi-stranded DNA or RNA, genomic DNA, cDNA, DNA-RNA hybrids, or a polymer comprising purine and pyrimidine bases or other natural, chemically or biochemically modified, non-natural, or derivatized nucleotide bases. The terms "polynucleotide" and "nucleic acid" should be understood to include, as applicable to the embodiment being described, single-stranded (such as sense or antisense) and double-stranded polynucleotides.

The terms "polypeptide," "peptide," and "protein", are used interchangeably herein, refer to a polymeric form of amino acids of any length, which can include genetically coded and non-genetically coded amino acids, chemically or biochemically modified or derivatized amino acids, and polypeptides having modified peptide backbones. The term includes fusion proteins, including, but not limited to, fusion proteins with a heterologous amino acid sequence, fusions with heterologous and homologous leader sequences, with or without N-terminal methionine residues; immunologically tagged proteins; and the like. The term "polypeptide" includes lipoproteins, glycoproteins, and the like.

A "host cell," as used herein, denotes an in vivo or in vitro eukaryotic cell, or a cell from a multicellular organism (e.g., a cell line) cultured as a unicellular entity, which eukaryotic cells can be, or have been, used as recipients for a nucleic acid (e.g., an expression vector), and include the progeny of the original cell which has been genetically modified by the nucleic acid. It is understood that the progeny of a single cell may not necessarily be completely identical in morphology or in genomic or total DNA complement as the original parent, due to natural, accidental, or deliberate mutation. A "recombinant host cell" (also referred to as a "genetically modified host cell") is a host cell into which has been introduced a heterologous nucleic acid, e.g., an expression vector, a guide RNA, a donor DNA template, and the like. For example, a subject eukaryotic host cell is a genetically modified eukaryotic host cell, by virtue of introduction into a suitable eukaryotic host cell of a heterologous nucleic acid, e.g., an exogenous nucleic acid that is foreign to the eukaryotic host cell, or a recombinant nucleic acid that is not normally found in the eukaryotic host cell.

As used herein, "CRISPER/Cas9 system" typically includes a polynucleotide sequence (which may, together, be referred to as an expression cassette, or one or more sgRNAs may be separately encoded and referred to as a cassette), wherein the polynucleotide sequence encodes the Cas9 nuclease alone, or also encodes one or more single guide RNAs (sgRNAs) as well as the Cas9 nuclease. In some instances, the expression cassette encoding the CRISPER/Cas9 system is referred to as a "transgene."

In some instances, the expression cassette encodes a transgene that encodes polypeptide. In some instances, the transgene encodes an antibody or antibody fragment.

As used herein, "expression product" can refer to either a polynucleotide or polypeptide product of a gene or transgene.

DETAILED DESCRIPTION

Endoplasmic reticulum (ER) stress and its downstream unfolded protein response (UPR) pathways play a critical role in both neuronal cell body and axon degeneration. In 2012, Hu et al. first reported that ON injury induces ER stress in RGCs (Hu et al., 2012). ER stress activates a complex cascade of reactions, in general called the unfolded protein response (UPR) (Walter and Ron, 2011; Wang and Kaufman, 2016). Striking neuroprotection has been accomplished by manipulating downstream signaling molecules individually or combined of ER stress/UPR, including C/EBP homologous protein (CHOP), X-Box-Binding Protein 1 (XBP-1), eukaryotic translation initiation factor 2 alpha (elF2α), Activating Transcription Factor 6 (ATF6) and Activating Transcription Factor 4 (ATF4) (R. Sano, J. C. Reed, (2013), *Biochimica et Biophysica Acta* 1833:3460-3470). Of special interest, it was found that modulating these molecules could achieve neuroprotection in three optic neuropathy models (Hu et al., 2012; Yang et al., 2016a; Huang et al., 2017), indicating that ER stress is a common mechanism for neurodegeneration. Thus, targeting ER stress/UPR molecules have considerable therapeutic neuroprotective potential in neural injury/diseases associated neurodegeneration.

As described herein, deletion of CHOP, one of the critical UPR genes that mediates ER stress-induced apoptosis in many disease models (Zinszner et al., 1998; Oyadomari et al., 2002; Silva et al., 2005; Song et al., 2008), preserves the structure and function of both RGC somata and axons in experimental ON crush, glaucoma and experimental autoimmune encephalomyelitis (EAE)/optic neuritis (Hu et al., 2012; Yang et al., 2016a; Huang et al., 2017). Because neuronal soma and axon degenerations are active autonomous processes with distinct molecular mechanisms (Calkins and Horner, 2012; Wang et al., 2012; Howell et al., 2013; Conforti et al., 2014; Geden and Deshmukh, 2016; Gerdts et al., 2016), targeting both provides better functional recovery than targeting either alone. Sterile alpha and TIR motif-containing protein 1 (SARM1) has recently been found to be critical for axon degeneration, and its deletion reported to preserve the integrity of injured axons (Osterloh et al., 2012; Gerdts et al., 2013). Therefore, with the present disclosure CHOP and SARM1 have been shown to be viable targets for neuroprotection of injured RGCs and their ON axons.

Gene therapy utilizing a viral vehicle to deliver genetic material into cells is a promising way to directly target pathogenetic molecules (Keeler et al., 2017). The retina is an advantageous target for gene therapy due to its easy access, confined non-systemic localization, partial immune privilege, and well-established definitive functional readouts (Ratican et al., 2018). The Clustered Regularly Interspaced Short Palindromic Repeats (CRISPR) and CRISPR-associated protein (Cas) system, which bacteria use to edit foreign viral gene intrusion, has been adapted for efficient gene editing of the mammalian genome (Cong et al., 2013; Jinek et al., 2013; Mali et al., 2013). Mature retinal neurons are post-mitotic cells, in which specific gene deletion can be achieved by CRISPR/Cas9-mediated double-stranded DNA breaks and nonhomologous end joining (NEJ) (Wang et al., 2014b; Bakondi et al., 2016). The simplicity and specificity of the RNA-guided CRISPR/Cas9 endonuclease system has revolutionized gene therapy by enabling precise, efficient and even multiplex gene editing in mammalian cells (Cong et al., 2013; Jinek et al., 2013; Mali et al., 2013). Taking advantage of these powerful genetic tools to develop neuroprotective treatments for optic neuropathy is a scientifically important and clinically urgent undertaking.

The success of adeno-associated virus (AAV)-mediated gene replacement in treating inherited retinal disease (Bainbridge et al., 2008; Hauswirth et al., 2008; Maguire et al., 2008; Maguire et al., 2009; Busskamp et al., 2010; Gorbatyuk et al., 2010; Simonelli et al., 2010; Mingozzi and High, 2011; Boye et al., 2013; Smalley, 2017) makes RGC-specific CRISPR/Cas9 gene editing by AAV a promising gene therapy strategy for optic neuropathies. Because AAV is non-pathogenic and cannot reproduce itself without helper viruses, it has served as a primary vehicle for gene therapy (Bainbridge et al., 2008; Hauswirth et al., 2008; Maguire et al., 2008; Maguire et al., 2009; Busskamp et al., 2010; Gorbatyuk et al., 2010; Simonelli et al., 2010; Mingozzi and High, 2011; Boye et al., 2013). It is a single-stranded DNA virus that stably and efficiently infects a wide variety of cells in multiple tissues. AAV2, the best-characterized AAV serotype, efficiently infects RGCs in retina after intravitreal injection. RGCs are located in the innermost layer of the retina, which is directly opposed to the vitreous (Pang et al., 2008; Park et al., 2008; Hu et al., 2012; Boye et al., 2013; Yang et al., 2014; Miao et al., 2016; Yang et al., 2016a). However, other cell types, including amacrine cells, Muller glia and bipolar cells, can also be infected, although to a lesser degree (Pang et al., 2008; Nickells et al., 2017). Therefore, one critical requirement for safe clinical treatment of RGCs by AAV-mediated gene therapy is to achieve precise targeting and sustained gene expression in RGCs without unwanted gene expression in other retinal cells.

An RGC-specific promoter was hypothesized to allow precise manipulation of RGC gene expression without affecting other retinal cell types. Mouse γ-synuclein (mSncg) promoter was found to drive specific, potent and sustained transgene expression in rodent RGCs and human primary RGCs, as well as human induced Pluripotent Stem Cell (iPS) stem cell-derived RGCs. Thus, for the first time, the present disclosure demonstrates that an AAV2-mSncg promoter-driven CRISPR/Cas9 system significantly knocks down endogenous CHOP and SARM1 expression in vivo in mouse RGCs, and preserves the morphology and function of acutely injured RGC somata and axons. The present disclosure demonstrates that AAV-mediated CRISPR gene therapy using an RGC-specific promoter to directly modulate endogenous degenerative genes can be used to treat devastating optic neuropathies.

Compositions and methods for treating a mammalian subject for an optic nerve (ON) neuropathy and/or reducing or ameliorating degeneration of axons and/or soma of RGCs are provided. Aspects of the composition include a mammalian viral vector, comprising a murine γ-synuclein promoter, or functional fragment thereof, that promotes expression of a transgene specifically in retinal ganglion cells (RGCs), said promoter in operable linkage with an expression cassette encoding the transgene, wherein the expressed transgene inhibits activity of an expression product of an endogenous pro-neurodegenerative gene involved in an ER stress and/or UPR pathway that leads to axon or soma degeneration in the RGCs. Aspects of the methods include intravitreally administering the composition to treat the subject for the ON neuropathy. A variety of ON neuropathies may be treated by practicing the methods, including retinal ganglion cell degeneration, glaucoma, optic neuritis, ON traumatic injury and other ON-related diseases.

In some aspects, provided herein is a composition comprising a mammalian viral vector which comprises a murine γ-synuclein promoter, or functional fragment thereof, that promotes expression of a transgene specifically in retinal ganglion cells (RGCs), wherein the promoter is in operable linkage with an expression cassette encoding the transgene, wherein the expressed transgene inhibits activity of an expression product of an endogenous pro-neurodegenerative gene in an ER stress and/or UPR pathway, and wherein uninhibited activity of the endogenous pro-neurodegenerative gene leads to axon or soma degeneration in the RGCs.

In some embodiments of the composition, the transgene encodes a CRISPER/Cas9 system. In some embodiments, the transgene encodes a protein that binds to the expression product of the endogenous pro-neurodegenerative gene.

In some embodiments, the composition comprises an AAV vector, which comprises a murine γ-synuclein promoter in operable linkage with a nucleic acid encoding a Cas9 nuclease; and a U6 promoter in operable linkage with at least one single guide (sgRNA) 19-20 nucleotides in length, wherein each sgRNA precedes an -NGG protospacer, and wherein each sgRNA targets at least one gene selected from the group of neurodegenerative genes consisting of SARM1, CHOP, elF2 and ATF4 for elimination by the CRISPR/Cas9 system. In some embodiments of the composition, the murine γ-synuclein promoter is selected from mSncg, mSncg-1.45kb (SEQ ID NO: 45), mSncg-1.03kb (SEQ ID NO: 46), mSncg-0.66kb (SEQ ID NO: 47), and mSncg-0.27kb (SEQ ID NO: 48). In some embodiments, the mSncg promoter is used to drive express of XBP1 and/or ATF6 neuroprotective genes.

In some embodiments, a first transgene encoding an sgRNA targeting the CHOP neurodegenerative gene or transcript, and a second transgene (contiguous with the first transgene, or in a second cassette, non-contiguous with the first transgene) overexpressing the XBP1 and/or ATF6 neuroprotective gene product or protein, for example, to achieve synergistic neuroprotection effects. In some embodiments, the transgene inhibits expression of one or more pro-degenerative genes selected from CHOP, elF2, ATF4 and SARM1, or their gene products, e.g., polynucleotide transcripts, polypeptides and proteins, or fragments thereof. In some embodiments, the murine γ-synuclein promoter (mSncg, mSncg-1.45kb, mSncg-1.03kb, mSncg-0.66kb, or mSncg-0.27kb) is used to drive express of XBP1 and/or ATF6 neuroprotective genes.

In some aspects, provided herein is a method of treating an optic nerve (ON) neuropathy in a mammalian subject in need thereof, comprising intravitreally administering the composition into the subject, thereby treating the ON neuropathy.

In some aspects, provided herein is a method of reducing or ameliorating degeneration of axons and/or soma of RGCs, comprising intravitreally administering the composition into a mammalian subject experiencing or at imminent risk of an ON neuropathy.

In some aspects, provided herein is a method of inducing neuroprotection/increasing survival/promoting functional recovery of RGC somata and axons, comprising intravitreally administering the composition into a mammalian subject experiencing or at imminent risk of an ON neuropathy. In some embodiments of the method, the ON neuropathy is retinal ganglion cell degeneration, including glaucoma, optic neuritis, ON traumatic injury and other ON-related diseases.

In some aspects, provided herein is a kit comprising an AAV vector, wherein the vector comprises a murine γ-synuclein promoter that promotes expression of a transgene specifically in RGCs, wherein the murine γ-synuclein promoter is in operable linkage with an expression cassette that expresses Cas9 and a sgRNA, wherein the sgRNA targets at least one endogenous pro-neurodegenerative gene in an ER stress and/or UPR pathway, wherein uninhibited activity of the endogenous pro-neurodegenerative gene leads to axon or soma degeneration in the RGCs; and instructions for use.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference in their entirety, as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the compositions and methods have been or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods

As summarized above, aspects of the instant disclosure include methods of treating a subject for an optic neuropathy. A variety of neurodegenerative disorders also may be treated by practice of the methods described herein.

Examples of neurodegenerative disorders are defined as hereditary and sporadic conditions that are characterized by progressive nervous system dysfunction. These disorders are often associated with atrophy of the affected central or peripheral structures of the nervous system. Neurodegenerative disorders involving the central nervous system (CNS) include, but are not limited to e.g., diseases such as Alzheimer's Disease (AD), Huntington's disease (HD), Parkinson's disease, multiple sclerosis (MS), Amyotrophic Lateral Sclerosis (ALS or Lou Gehrig's Disease), frontotemporal dementia or other dementias, brain cancer, degenerative nerve diseases, encephalitis, epilepsy, genetic brain disorders and brain malformations, hydrocephalus, neurodegeneration related to mitochondrial dysfunction, non-syndromic genetic brain disorders, prion diseases, rare syndromic multisystem diseases with optic atrophy such as mitochondrial encephalomyopathies, stroke, traumatic brain injury (TBI) and others.

In some instances, the optic neuropathy and/or neurodegenerative disorder treated according to the methods described herein may be an optic neuropathy such as Leber's hereditary optic neuropathy (LHON), dominant optic atrophy (DOA), ON damage associated with glaucoma, or other CNS neurodegenerative disorder leading to ON degeneration. In some instances of the methods disclosed herein, the disease or disorder may involve inflammation leading to degeneration of the ON. For example, MS and its animal model experimental autoimmune encephalomyelitis (EAE) are neurodegenerative diseases with characteristic inflammatory demyelination in the CNS, including the optic nerve.

In the present disclosure, neurodegenerative disorders that may be treated by the herein disclosed methods include essentially any disorder where RGCs degenerate and/or the presence of ER stress genes or gene products and/or UPF genes or gene products are associated with the presence and/or progression of the neurodegenerative disorder.

By "treatment" it is meant that at least an amelioration of one or more symptoms associated with a neurodegenerative disorder afflicting the subject is achieved, where amelioration is used in a broad sense to refer to at least a reduction in the magnitude of a parameter, e.g., a symptom associated with the impairment being treated. As such, treatment also includes situations where a pathological condition, or at least symptoms associated therewith, are completely inhibited, e.g., prevented from happening, or stopped, e.g., terminated, such that the adult mammal no longer suffers from the impairment, or at least the symptoms that characterize the impairment. In some instances, "treatment", "treating" and the like refer to obtaining a desired pharmacologic and/or physiologic effect. The effect may be prophylactic in terms of completely or partially preventing a disease or symptom thereof and/or may be therapeutic in terms of a partial or complete cure for a disease and/or adverse effect attributable to the disease. "Treatment" may be any treatment of a disease in a mammal, and includes: (a) preventing the disease from occurring in a subject which may be predisposed to the disease but has not yet been diagnosed as having it; (b) inhibiting the disease, i.e., arresting its development; or (c) relieving the disease, i.e., causing regression of the disease. Treatment may result in a variety of different physical manifestations, e.g., modulation in gene expression, increased neurogenesis, rejuvenation of tissue or organs (e.g., the optic nerve (ON)), etc. Treatment of ongoing disease, where the treatment stabilizes or reduces the undesirable clinical symptoms of the patient, occurs in some embodiments. Such treatment may be performed prior to complete loss of function in the affected tissues. The subject therapy may be administered during the symptomatic stage of the disease, and in some cases after the symptomatic stage of the disease.

As summarized above, methods of treating a subject for an ON neuropathy may include administering to a subject in need thereof an effective amount of an agent that reduces expression of a gene or gene product in the ER stress and/or unfolded protein response (UPR) pathway(s). Without being bound by theory, the instant disclosure includes the discovery that gamma-synuclein (γ-synuclein) promoters, and in particular the murine γ-synuclein promoter, is specifically expressed in retinal ganglion cells (RGCs) and therefore is useful for targeting a transgenic expression product to RGCs.

With regard to the present disclosure, small molecules targeting ER stress molecules or adeno-associated virus (AAV)-mediated gene therapies targeting ER stress/UPR pathways can be developed based on these findings to prevent neurodegeneration, which can be translated into novel therapeutic approaches to preserve important neuronal functions. A retinal ganglion cell (RGC)-specific promoter was also identified and can be used to drive transgene expression in RGCs for gene therapy, including targeting ER stress molecules for neuroprotection against glaucoma and other optic neuropathies. An AAV vector employing this mSncg promoter was created to specifically knock down or overexpress ER stress molecules for neuroprotection of RGC and optic nerve. The instant invention provides several novel therapeutic targets for neuroprotectant development. The new RGC-specific promoter (mouse gamma-synuclein, SNCG promoter) can be used for any RGC-related gene therapy. The new AAV vector containing the mSncg promoter and new shRNA, gRNA for CRISPR/Cas9 gene editing in RGCs for neuroprotection. Small chemical modulators are being developed to target these ER stress molecules for neuroprotection. Novel AAV vectors are also being designed to genetically modulate these ER stress molecules.

Provided herein are methods of targeting expression products of an endogenous pro-neurodegenerative gene in an ER stress and/or UPR pathway, wherein uninhibited activity of the endogenous pro-neurodegenerative gene expression products leads to axon or soma degeneration in the RGCs. In some instances, methods of the present disclosure may include targeting a gene associated with an ER stress and/or UPR pathway, including positive and negative regulators of an ER stress and/or UPR pathway. For example, in some instances, a negative regulator of an ER stress and/or UPR pathway may be targeted with an agonist of the negative regulator. In some instances, a positive regulator of an ER stress and/or UPR pathway may be targeted with an antagonist of the positive regulator. In some instances, one or more ER stress and/or UPR pathway genes may be directly targeted, including e.g., where an ER stress and/or UPR pathway are knocked-out or targeted for ablation, or the expression product, such as an RNA or protein component of an ER stress and/or UPR pathway is directly or indirectly targeted. In some instances, a component of an ER stress and/or UPR pathway is directly targeted.

Various subjects may be treated in the methods of the present disclosure. In some instances, treated subjects may be mammals, including but not limited to e.g., rodents (e.g., rats, mice, etc.), non-human primates (e.g., macaques, marmosets, tamarins, spider monkeys, owl monkeys, vervet monkeys, squirrel monkeys, baboons, chimpanzees, etc.), humans, and the like. In some instances, a treated subject may be an animal model (e.g., a rodent model, a non-human primate model, etc.) of an optic neuropathy and/or neurodegenerative disorder. In some instances, a treated subject may be a human subject, including but not limited to e.g., a human subject having an optic neuropathy and/or neurodegenerative disorder, a human subject at increased risk of developing an optic neuropathy and/or neurodegenerative disorder, a human subject of advanced age (e.g., at least 60 years of age, at least 65 years of age, at least 70 years of age, at least 75 years of age, at least 80 years of age, at least 85 years of age, at least 90 years of age, etc.), or a combination thereof. Treated subjects may or may not be symptomatic, e.g., subject may or may not display or have previously displayed one or more symptoms of an optic neuropathy and/or neurodegenerative disorder, including but not limited to e.g., those optic neuropathies and/or neurodegenerative disorders described herein.

Methods of the present disclosure may include administering to a subject an agent that specifically targets RGCs and reduces RGC degeneration. Useful agents for reducing RGC degeneration include agents that modulate an ER stress and/or UPR pathway, agents that modulate a particular gene product that activates an ER stress and/or UPR pathway (e.g., including expression products such as polynucleotides or proteins activating or in an ER stress and/or UPR pathway), combinations thereof and the like. Useful agents include agonists and antagonists, including e.g., agonists of negative regulators of an ER stress and/or UPR pathway and antagonists of positive regulators of an ER stress and/or UPR pathway.

Various agents may be employed in treating the herein described optic neuropathies and neurodegenerative disorders, the progression of which are based, at least in part, on the degeneration of RGCs.

Agents that specifically target RGCs and reduce RGC degeneration include agents that directly or indirectly modulate an ER stress and/or UPR pathway. For example, agents that inhibit expression of a gene in an ER stress and/or UPR pathway are useful in methods and compositions that inhibit RGC degeneration and treat optic neuropathies. Agents that play a role in activating or repressing genes or gene products that negatively or positively influence an ER stress and/or UPR pathway are of interest in the methods and compositions herein disclosed. In some instances, a target gene may be involved in activating an ER stress and/or UPR pathway, and inhibition of the function of the target gene may be performed by administering to the subject an antagonist of the target gene such that RGC degeneration is reduced. In some instances, a target gene may be involved in negatively regulating an ER stress and/or UPR pathway, and promotion of the function of that target gene may be performed by administering to the subject an agonist of the target gene that results in increased inhibition of RGC degeneration.

As agonists, any useful inducer of the subject target gene that negatively regulates expression of an ER stress and/or UPR pathway gene and/or encoded product thereof may be employed in the subject methods. Non-limiting examples of useful inducers include but are not limited to e.g., non-peptide small molecule agonists, peptide agonists, encoding nucleic acids, and the like. In some instances, useful agonists may include mimetics. In some instances, inducers may include the protein (including recombinant and modified forms thereof), or a peptide fragment thereof (including recombinant and modified forms thereof), or a polynucleotide encoding the protein including where the protein shares 100% sequence identity or less than 100% sequence identity, including e.g., at least 99%, at least 98%, at least 97% at least 96%, at least 95%, at least 90%, at least 85%, at least 80%, etc., sequence identity, with a protein or amino acid sequence of a protein described herein. In some instances, inducers may include a polynucleotide encoding the protein, or a fragment thereof, including where the polynucleotide shares 100% sequence identity or less than 100% sequence identity, including e.g., at least 99%, at least 98%, at least 97% at least 96%, at least 95%, at least 90%, at least 85%, at least 80%, etc., sequence identity, with an encoding polynucleotide identified herein.

Accordingly, as non-limiting examples, in some instances, useful inducers may include a non-peptide small molecule agonist of a protein that is a negative regulator of an ER stress and/or UPR pathway, a peptide agonist of a protein that is a negative regulator of an ER stress and/or UPR pathway, a RNA or DNA encoding a protein (or fragment thereof) that is a negative regulator of an ER stress and/or UPR pathway, and the like. In some instances, the effectiveness of an inducer may be confirmed using an in vitro or in vivo assay, including e.g., where the effectiveness of the inducer is compared to an appropriate control or standard, e.g., a corresponding CRISPR-based gene silencing agent, a conventional therapy, etc. In some instances, useful agonists may be identified by screening candidate compounds, including but not limited to e.g., where libraries of compounds (e.g., small molecule chemical libraries) are screened in a high throughput manner.

As antagonists, any useful inhibitor of the subject target gene and/or encoded product thereof may be employed in the subject methods. Non-limiting examples of useful inhibitors include but are not limited to e.g., non-peptide small molecule antagonists, peptide antagonists, interfering RNAs (e.g., siRNA, shRNA, etc.), antibodies (e.g., neutralizing antibodies, function blocking antibodies, etc.), aptamers, and the like. In some instances, inhibitors may target, e.g., specifically bind to, specifically hybridize to, etc., a target protein or a nucleic acid encoding a target protein including where the protein shares 100% sequence identity or less than 100% sequence identity, including e.g., at least 99%, at least 98%, at least 97% at least 96%, at least 95%, at least 90%, at least 85%, at least 80%, etc., sequence identity, with a protein or amino acid sequence of a protein described herein.

Accordingly, as non-limiting examples, in some instances, useful inhibitors may include a non-peptide small molecule antagonist of a protein that is a positive regulator of an ER stress and/or UPR pathway, a peptide antagonist of a protein that is a positive regulator of an ER stress and/or UPR pathway, an interfering RNA targeting an RNA expressed from a gene that positively regulates an ER stress and/or UPR pathway, an anti-neurodegeneration-promoting-protein antibody (e.g., an antibody that specifically binds to a pro-degenerative protein that leads to RGC degeneration), an anti-neurodegeneration-promoting-protein aptamer, and the like. In some instances, the effectiveness of an inhibitor may be confirmed using an in vitro or in vivo assay, including e.g., where the effectiveness of the inhibitor is compared to an appropriate control or standard, e.g., the corresponding CRISPR-based gene silencing agent, a conventional therapy, etc. In some instances, useful antagonists may be identified by screening candidate compounds, including but not limited to e.g., where libraries of compounds (e.g., small molecule chemical libraries) are screened in a high throughput manner.

Selective Ang II type 1 (AT1) receptor antagonists such as telmisartan and olmesartan are commonly used in clinic to treat hypertension; recently, however, new effects have been discovered. Telmisartan was found to reduce ER stress and thereby attenuated both apoptosis and cardiac hypertrophy. Telmisartan significantly reduced left ventricle hypertrophy (LVH) and interstitial fibrosis, thus improving left ventricular function compared with AAC alone. ERS markers in the myocardial, such as GRP78, CHOP, caspase 12 and p-JNK, significantly increased in rats with AAC; telmisartan significantly dampened these changes. In some instances, the agent is an ER stress and/or UPR pathway antagonist. Useful ER stress and/or UPR pathway antagonists include but are not limited to e.g., Olmesartan, an AT-1R specific blocker and potential therapeutic in treating an ER stress pathway involving CHOP, and telmisartan. (Liu, et al. *Acta Pharmacol Sin.* 2016, 37(4):425-443).

Polynucleotides of interest in the present disclosure include polynucleotide sequences having 100% sequence identity, or less than 100% sequence identity, including e.g., at least 99%, at least 98%, at least 97% at least 96%, at least 95%, at least 90%, at least 85%, at least 80%, etc., sequence identity, with a γ-synuclein promoter sequence as identified herein. In some instances, the a γ-synuclein promoter is from a mammal, e.g., a human or a rodent such as a mouse or rat. In some instances, the promoter has 100% sequence identity, or less than 100% sequence identity, including e.g., at least 99%, at least 98%, at least 97% at least 96%, at least 95%, at least 90%, at least 85%, or at least 80% sequence identity to the mSncg promoter or a fragment thereof.

The compositions (e.g., those including one or more agents that inhibit gene products in the ER stress and/or UPR pathways) of this disclosure can be supplied in the form of a pharmaceutical composition. Any suitable pharmaceutical composition may be employed, described in more detail below. As such, in some instances, methods of the present disclosure may include administering one or more agents in a composition comprising an excipient (e.g., an isotonic excipient) prepared under sufficiently sterile conditions for administration to a mammal, e.g., a human.

Subjects treated according to the herein described methods may or may not include one or more mutations in a gene to which the administered agent is targeted, including genes targeted by either agonists or antagonists. For example, in some instances, a subject may be "wildtype" (i.e., not mutated) at the genetic locus (i.e., the gene) associated with the administered agent (e.g., wildtype at the CHOP locus when administered a CHOP antagonist). Correspondingly, in some instances, a subject may be "mutant" (i.e., mutated) at the genetic locus (i.e., the gene) associated with the administered agent (e.g., mutant at the CHOP locus when administered a CHOP agonist). By "mutant", as specifically used in this context, is meant that the locus is sufficiently altered such that the encoded protein is sufficiently altered to substantially affect the function of the protein. In some instances, a mutation that may be present or absent in a subject may be, but are not necessarily limited to, one or more of the mutations described herein.

As used herein, the term "wildtype locus" generally refers to a gene, or sub-portion thereof, in the subject that is not mutated, or not substantially mutated (e.g., at either allele) so as to affect the function of the gene. Accordingly, a wildtype locus may contain the common (i.e., most prevalent, normal, etc.) sequence of the gene, or essentially the common sequence of the gene, without mutation, or without substantial mutation, affecting the function of the gene. The "common sequence", as used in this context, generally refers to the gene sequence as it most frequently occurs in a natural population. In some instances, common sequences may be represented by a reference sequence, e.g., a reference sequence as it appears in a sequence database, such as but not limited to e.g., GenBank database (NCBI), UniProt database (EBI/SIB/PIR), or the like. In some instances, a wildtype locus may be identical or substantially identical to a reference sequence.

For example, in some instances, a subject treated according to the methods of the present disclosure may be wildtype at one or more loci of target genes identified herein. Correspondingly, without limitation, a subject treated according to the methods of the present disclosure may be wildtype at the CHOP locus, wildtype at the SARM1 locus, wildtype at the XBP-1 locus, wildtype at the eIF2 locus, wildtype at the ATF4 locus, wildtype at the ATF6 locus, or wildtype at a combination of loci thereof.

In some instances, a subject treated according to the methods of the present disclosure may be mutant at one or more loci of target genes identified herein. Correspondingly, without limitation, a subject treated according to the methods of the present disclosure may be mutant at the CHOP locus, mutant at the SARM1 locus, mutant at the XBP-1 locus, mutant at the eIF2 locus, mutant at the ATF4 locus, mutant at the ATF6 locus, or mutant at a combination of loci thereof.

Administration of an agent to a subject, as described herein, may be performed employing various routes of administration. The route of administration may be selected according to a variety of factors including, but not necessarily limited to, the condition to be treated, the formulation and/or device used, the patient to be treated, and the like. Routes of administration useful in the disclosed methods include but are not limited to oral and parenteral routes, such as intravenous (iv), intraperitoneal (ip), rectal, topical, ophthalmic, nasal, and transdermal. Formulations for these dosage forms are described herein.

Where the agent is a polypeptide, polynucleotide, analog or mimetic thereof, it may be introduced into tissues or host cells by any number of routes, including viral infection, microinjection, or fusion of vesicles. Jet injection may also be used for intramuscular administration, as described by Furth et al., Anal Biochem. (1992) 205:365-368. The DNA may be coated onto gold microparticles, and delivered intradermally by a particle bombardment device, or "gene gun" as described in the literature (see, for example, Tang et al., Nature (1992) 356:152-154), where gold microprojectiles are coated with the DNA, then bombarded into skin cells. For nucleic acid therapeutic agents, a number of different delivery vehicles find use, including viral and non-viral vector systems, as are known in the art.

Those of skill in the art will readily appreciate that dose levels can vary as a function of the specific compound, the nature of the delivery vehicle, and the like. Preferred dosages for a given compound are readily determinable by those of skill in the art by a variety of means.

In those embodiments where an effective amount of an active agent is administered to the subject, the amount or dosage is effective when administered for a suitable period of time, such as one week or longer, including two weeks or longer, such as 3 weeks or longer, 4 weeks or longer, 8 weeks or longer, etc., so as to evidence a reduction in the disorder, e.g., a reduction in a symptom of the disorder or in a marker of disease pathology. For example, an effective dose is the dose that, when administered for a suitable period of time, such as at least about one week, and maybe about two weeks, or more, up to a period of about 3 weeks, 4 weeks, 8 weeks, or longer, will reduce a symptom of the disorder, for example, by about 10% or more, by about 20% or more, e.g., by 30% or more, by 40% or more, or by 50% or more, in some instances by 60% or more, by 70% or more, by 80% or more, or by 90% or more, for example, and will halt progression of the disorder in the subject. In some instances, an effective amount or dose of active agent will not only slow or halt the progression of the disease condition but will also induce the reversal of the condition, i.e., will cause an improvement in the neurological health of the subject. For example, in some instances, an effective amount is the amount that when administered for a suitable period of time, for example, at least about one week, and/or about two weeks, or more, up to a period of about 3 weeks, 4 weeks, 8 weeks, or longer will improve, stabilize, or at least reduce the progression of a disorder in subject, for example 1.5-fold, 2-fold, 3-fold, 4-fold, 5-fold, in some instances 6-fold, 7-fold, 8-fold, 9-fold, or 10-fold or more relative to the subject's condition prior to administration.

In some instances, in those embodiments where an effective amount of an active agent is administered to the subject, the amount or dosage is effective when administered for a suitable period of time to result in a reduction in RGC degeneration in the subject. Such a reduction may manifest in various ways, including but not limited to e.g., an increase in the number, size or length of RGCs, or a reduction in the amount of degeneration of RGCs, or their axons or soma, or the like. In some instances, methods of the present disclosure may result in at least a 5%, e.g., at least a 10%, at least a 15%, at least a 20%, at least a 25%, at least a 30%, at least a 35%, at least a 40%, at least a 45%, at least a 50%, at least a 55%, at least a 60%, at least a 65%, at least a 70% at least a 75%, at least a 80%, e.g., reduction in RGC degeneration. In some instances, methods of the present disclosure may result in at least a 5%, e.g., at least a 10%, at least a 15%, at least a 20%, at least a 25%, at least a 30%, at least a 35%, at least a 40%, at least a 45%, at least a 50%, at least a 55%, at least a 60%, at least a 65%, at least a 70% at least a 75%, at least a 80%, e.g., increase in RGC number, size or length of RGC axons or somata. Various methods of assessing the amount of RGC degeneration or increase in number, size or length of RGC axons or somata may be employed, including invasive and non-invasive techniques, such as electrophysiology measurement for RGC neuronal function, visual acuity, OCT imaging, fundus imaging, histology studies of RGC somata and axons morphology.

A "therapeutically effective amount", a "therapeutically effective dose" or "therapeutic dose" is an amount sufficient to effect desired clinical results (i.e., achieve therapeutic efficacy, achieve a desired therapeutic response, etc.). A therapeutically effective dose can be administered in one or more administrations. For purposes of this disclosure, a therapeutically effective dose of an agent that inhibits expression of a target gene (e.g., an ER stress and/or UPR gene, and the like) and/or compositions is an amount that is sufficient, when administered to the individual, to palliate, ameliorate, stabilize, reverse, prevent, slow or delay the progression of the disease state (e.g., neurodegeneration) by, for example, inhibiting gene expression product formation, or otherwise preventing the symptoms or clinical progression of a neurodegenerative disorder present in the subject.

An effective amount of a subject compound will depend, at least, on the particular method of use, the subject being treated, the severity of the affliction, and the manner of administration of the therapeutic composition. A "therapeutically effective amount" of a composition is a quantity of a specified compound sufficient to achieve a desired effect in a subject (host) being treated.

Therapeutically effective doses of a subject compound or pharmaceutical composition can be determined by one of skill in the art, with a goal of achieving local (e.g., tissue)

concentrations that are at least as high as the IC50 of an applicable compound disclosed herein.

The specific dose level and frequency of dosage for any particular subject may be varied and will depend upon a variety of factors, including the activity of the subject compound, the metabolic stability and length of action of that compound, the age, body weight, general health, sex and diet of the subject, mode and time of administration, rate of excretion, drug combination, and severity of the condition of the host undergoing therapy.

Conversion of an animal dose to human equivalent doses (HED) may, in some instances, be performed using the conversion table and/or algorithm provided by the U.S. Department of Health and Human Services, Food and Drug Administration, Center for Drug Evaluation and Research (CDER) in, e.g., *Guidance for Industry: Estimating the Maximum Safe Starting Dose in Initial Clinical Trials for Therapeutics in Adult Healthy Volunteers* (2005) Food and Drug Administration, 5600 Fishers Lane, Rockville, MD 20857; (available at www(dot)fda(dot)gov/cder/guidance/index(dot)htm, the disclosure of which is incorporated herein by reference).

Conversion of Animal Doses to Human Equivalent Doses Based on Body Surface Area

| Species | To Convert Animal Dose in mg/kg to Dose in mg/m², Multiply by $k_m$ | To Convert Animal Dose in mg/kg to HED[a] in mg/kg, Either: | |
|---|---|---|---|
| | | Divide Animal Dose By | Multiply Animal Dose By |
| Human | 37 | — | — |
| Child (20 kg)[b] | 25 | — | — |
| Mouse | 3 | 12.3 | 0.08 |
| Hamster | 5 | 7.4 | 0.13 |
| Rat | 6 | 6.2 | 0.16 |
| Ferret | 7 | 5.3 | 0.19 |
| Guinea pig | 8 | 4.6 | 0.22 |
| Rabbit | 12 | 3.1 | 0.32 |
| Dog | 20 | 1.8 | 0.54 |
| Primates: | | | |
| Monkeys[c] | 12 | 3.1 | 0.32 |
| Marmoset | 6 | 6.2 | 0.16 |
| Squirrel monkey | 7 | 5.3 | 0.19 |
| Baboon | 20 | 1.8 | 0.54 |
| Micro-pig | 27 | 1.4 | 0.73 |
| Mini-pig | 35 | 1.1 | 0.95 |

[a]Assumes 60 kg human. For species not listed or for weights outside the standard ranges, HED can be calculated from the following formula: HED = animal dose in mg/kg × (animal weight in kg/human weight in kg)0.33.
[b]This km value is provided for reference only since healthy children will rarely be volunteers for phase 1 trials.
[c]For example, cynomolgus, rhesus, and stumptail.

Pharmaceutical Compositions

A pharmaceutical composition comprising a subject compound (i.e., an agonist or an antagonist) may be administered to a patient alone, or in combination with other supplementary active agents. The pharmaceutical compositions may be manufactured using any of a variety of processes, including, without limitation, conventional mixing, dissolving, granulating, dragee-making, levigating, emulsifying, encapsulating, entrapping, and lyophilizing. The pharmaceutical composition can take any of a variety of forms including, without limitation, a sterile solution, suspension, emulsion, lyophilisate, tablet, pill, pellet, capsule, powder, syrup, elixir or any other dosage form suitable for administration.

A subject compound may be administered to the host using any convenient means capable of resulting in the desired reduction in disease condition or symptom. Thus, a subject compound can be incorporated into a variety of formulations for therapeutic administration. More particularly, a subject compound can be formulated into pharmaceutical compositions by combination with appropriate pharmaceutically acceptable carriers or diluents, and may be formulated into preparations in solid, semi-solid, liquid or gaseous forms, such as tablets, capsules, powders, granules, ointments, solutions, suppositories, injections, inhalants and aerosols.

Formulations for pharmaceutical compositions are well known in the art. For example, Remington's Pharmaceutical Sciences, by E. W. Martin, Mack Publishing Co., Easton, Pa., 19th Edition, 1995, describes exemplary formulations (and components thereof) suitable for pharmaceutical delivery of disclosed compounds. Pharmaceutical compositions comprising at least one of the subject compounds can be formulated for use in human or veterinary medicine. Particular formulations of a disclosed pharmaceutical composition may depend, for example, on the mode of administration and/or on the location of the infection to be treated. In some embodiments, formulations include a pharmaceutically acceptable carrier in addition to at least one active ingredient, such as a subject compound. In other embodiments, other medicinal or pharmaceutical agents, for example, with similar, related or complementary effects on the affliction being treated can also be included as active ingredients in a pharmaceutical composition.

Pharmaceutically acceptable carriers useful for the disclosed methods and compositions are conventional in the art. The nature of a pharmaceutical carrier will depend on the particular mode of administration being employed. For example, parenteral formulations usually comprise injectable fluids that include pharmaceutically and physiologically acceptable fluids such as water, physiological saline, balanced salt solutions, aqueous dextrose, glycerol or the like as a vehicle. For solid compositions (e.g., powder, pill, tablet, or capsule forms), conventional non-toxic solid carriers can include, for example, pharmaceutical grades of mannitol, lactose, starch, or magnesium stearate. In addition to biologically neutral carriers, pharmaceutical compositions to be administered can optionally contain minor amounts of non-toxic auxiliary substances (e.g., excipients), such as wetting or emulsifying agents, preservatives, and pH buffering agents and the like; for example, sodium acetate or sorbitan monolaurate. Other non-limiting excipients include, nonionic solubilizers, such as cremophor, or proteins, such as human serum albumin or plasma preparations.

Some examples of materials which can serve as pharmaceutically-acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol, and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) pH buffered solutions; (21) polyesters, polycarbonates and/or polyanhydrides; and (22) other non-toxic compatible substances employed in pharmaceutical formulations.

The disclosed pharmaceutical compositions may be formulated as a pharmaceutically acceptable salt of a disclosed compound. Pharmaceutically acceptable salts are non-toxic salts of a free base form of a compound that possesses the desired pharmacological activity of the free base. These salts may be derived from inorganic or organic acids. Non-limiting examples of suitable inorganic acids are hydrochloric acid, nitric acid, hydrobromic acid, sulfuric acid, hydroiodic acid, and phosphoric acid. Non-limiting examples of suitable organic acids are acetic acid, propionic acid, glycolic acid, lactic acid, pyruvic acid, malonic acid, succinic acid, malic acid, maleic acid, fumaric acid, tartaric acid, citric acid, benzoic acid, cinnamic acid, mandelic acid, methanesulfonic acid, ethanesulfonic acid, p-toluenesulfonic acid, methyl sulfonic acid, salicylic acid, formic acid, trichloroacetic acid, trifluoroacetic acid, gluconic acid, asparagic acid, aspartic acid, benzenesulfonic acid, p-toluenesulfonic acid, naphthalenesulfonic acid, and the like. Lists of other suitable pharmaceutically acceptable salts are found in Remington's Pharmaceutical Sciences, 17th Edition, Mack Publishing Company, Easton, Pa., 1985. A pharmaceutically acceptable salt may also serve to adjust the osmotic pressure of the composition.

A subject compound can be used alone or in combination with appropriate additives to make tablets, powders, granules or capsules, for example, with conventional additives, such as lactose, mannitol, corn starch or potato starch; with binders, such as crystalline cellulose, cellulose derivatives, acacia, corn starch or gelatins; with disintegrators, such as corn starch, potato starch or sodium carboxymethylcellulose; with lubricants, such as talc or magnesium stearate; and if desired, with diluents, buffering agents, moistening agents, preservatives and flavoring agents. Such preparations can be used for oral administration.

A subject compound can be formulated into preparations for injection by dissolving, suspending or emulsifying them in an aqueous or nonaqueous solvent, such as vegetable or other similar oils, synthetic aliphatic acid glycerides, esters of higher aliphatic acids or propylene glycol; and if desired, with conventional additives such as solubilizers, isotonic agents, suspending agents, emulsifying agents, stabilizers and preservatives. The preparation may also be emulsified or the active ingredient encapsulated in liposome vehicles. Formulations suitable for injection can be administered by an intravitreal, intraocular, intramuscular, subcutaneous, sublingual, or other route of administration, e.g., injection into the gum tissue or other oral tissue. Such formulations are also suitable for topical administration.

In some embodiments, a subject compound can be delivered by a continuous delivery system. The term "continuous delivery system" is used interchangeably herein with "controlled delivery system" and encompasses continuous (e.g., controlled) delivery devices (e.g., pumps) in combination with catheters, injection devices, and the like, a wide variety of which are known in the art.

A subject compound can be utilized in aerosol formulation to be administered via inhalation. A subject compound can be formulated into pressurized acceptable propellants such as dichlorodifluoromethane, propane, nitrogen and the like.

Furthermore, a subject compound can be made into suppositories by mixing with a variety of bases such as emulsifying bases or water-soluble bases. A subject compound can be administered rectally via a suppository. The suppository can include vehicles such as cocoa butter, carbowaxes and polyethylene glycols, which melt at body temperature, yet are solidified at room temperature.

The term "unit dosage form," as used herein, refers to physically discrete units suitable as unitary dosages for human and animal subjects, each unit containing a predetermined quantity of a subject compound calculated in an amount sufficient to produce the desired effect in association with a pharmaceutically acceptable diluent, carrier or vehicle. The specifications for a subject compound depend on the particular compound employed and the effect to be achieved, and the pharmacodynamics associated with each compound in the host.

The dosage form of a disclosed pharmaceutical composition will be determined by the mode of administration chosen. For example, in addition to injectable fluids, topical or oral dosage forms may be employed. Topical preparations may include eye drops, ointments, sprays and the like. In some instances, a topical preparation of a medicament useful in the methods described herein may include, e.g., an ointment preparation that includes one or more excipients including, e.g., mineral oil, paraffin, propylene carbonate, white petrolatum, white wax and the like, in addition to one or more additional active agents.

Oral formulations may be liquid (e.g., syrups, solutions or suspensions), or solid (e.g., powders, pills, tablets, or capsules). Methods of preparing such dosage forms are known, or will be apparent, to those skilled in the art.

Certain embodiments of the pharmaceutical compositions comprising a subject compound may be formulated in unit dosage form suitable for individual administration of precise dosages. The amount of active ingredient administered will depend on the subject being treated, the severity of the affliction, and the manner of administration, and is known to those skilled in the art. Within these bounds, the formulation to be administered will contain a quantity of the extracts or compounds disclosed herein in an amount effective to achieve the desired effect in the subject being treated.

Each therapeutic compound can independently be in any dosage form, such as those described herein, and can also be administered in various ways, as described herein. For example, the compounds may be formulated together, in a single dosage unit (that is, combined together in one form such as capsule, tablet, powder, or liquid, etc.) as a combination product. Alternatively, when not formulated together in a single dosage unit, an individual subject compound may be administered at the same time as another therapeutic compound or sequentially, in any order thereof.

In some instances, methods of treating a subject as described herein may include administering to the subject an effective amount of an agent that reduces RGC degeneration in the subject, as identified in a method of screening described herein.

Methods of Screening

As summarized above, the methods of the present disclosure also include methods of identifying ER stress and/or UPR pathway associated target genes, including target genes that are positive and negative regulators of neurodegeneration of RGCs. Useful screens for identifying positive and negative regulators of an ER stress and/or UPR pathway may include, but are not limited to e.g., genetic screens, such as but not limited to e.g., genes employing silencing reagents, such as but not limited to e.g., CRISPR-based gene silencing reagents.

By "ER stress and/or UPR pathway target gene," as used herein, is meant a gene that is involved, either positively or negatively, in the ER stress and/or UPR pathway, the degeneration of RGCs, and/or the under- or over-expression of an ER stress and/or UPR pathway-associated target gene. In some instances, an ER stress and/or UPR pathway-associated target gene may be identified from a population of target genes identified in a genetic screen selecting for or against optic neuropathy and/or RGC degeneration, such as but not limited to e.g., a CRISPR-based gene silencing screen selecting for or against optic neuropathy and/or RGC degeneration.

As summarized above, in some embodiments, screens of the present disclosure may include contacting a population of RGCs with a plurality of CRISPR-based gene silencing agents targeting a plurality of target genes. Accordingly, in such an approach a variety of different genes may be silenced and analyzed in a pooled or multiplexed format as desired. Various populations of RGCs may be employed in such methods, including where such RGCs are primary cells or cultured cells. In some instances, primary cells obtained from a subject may be employed. In some instances, cultured cells of a RGC cell culture line may be employed.

By "CRISPR-based gene silencing agent" is meant one or more agents that when delivered to a cell cause the directed silencing of a target gene by CRISPER/Cas9-based nuclease activity. Accordingly, in some instances, a CRISPR-based gene silencing agent may include a guide RNA (gRNA) having sequence that specifically targets a Cas9 nuclease to a specific target gene. CRISPR/Cas9-based silencing of a target gene may include delivery of a Cas9 polypeptide or a Cas9 polypeptide encoding nucleic acid to the subject cells. For example, in some instances, a vector that includes a nucleic acid that encodes a Cas9 nuclease may be delivered to the subject cells before, during or after the cell is contacted with a CRISPR-based gene silencing agent such that the encoded Cas9 nuclease is expressed when the CRISPR-based gene silencing agent is present within the cell. In some instances, the cell may be genetically modified with a nucleic acid encoding a Cas9 nuclease such that the encoded Cas9 nuclease is expressed (e.g., conditionally expressed, constitutively expressed, etc.) when the CRISPR-based gene silencing agent is present within the cell. Accordingly, CRISPR/Cas9-based silencing of the present methods may employ a Cas9 nuclease that is stably or transiently expressed including e.g., where a nucleic acid encoding the Cas9 nuclease is transiently or stably present within the cell line. In some instances, Cas9 polypeptide may be delivered to the subject cells, i.e., without the need to express the Cas9 polypeptide within the cells. CRISPR-based gene silencing agents will vary and may include e.g., vector (e.g., virus (e.g., lentivirus), plasmid, etc.) containing and/or expressing one or more gRNAs. Methods of delivery of CRISPR-based gene silencing agents will similarly vary any may include e.g., transfection, electroporation, lipofection, etc.

CRISPR-based gene silencing agents of the present disclosure may be directed to essentially any element of a subject genome including e.g., protein-coding and non-protein coding elements of the subject genome. In some instances, e.g., where a plurality of CRISPR-based gene silencing agents is employed, the plurality of CRISPR-based gene silencing agents may collectively target all or essentially all genes of the subject genome (i.e., genome-wide targeting). In some instances, targeted non-protein coding elements may include but are not limited to e.g., promoters, enhancers, non-coding RNAs, and the like. In some instances, the targets of one or more CRISPR-based gene silencing agents may include proteins involved in RGC degeneration, ER stress and/or UPR pathways, or the like. In some instances, the function of the targeted gene may be unknown. In some instances, the targets of one or more CRISPR-based gene silencing agents may include proteins involved in processes other than RGC degeneration, ER stress and/or UPR pathways, including but not limited to e.g., protein processing/trafficking, neuronal cell differentiation, cellular homeostasis, cellular metabolism, and the like.

In some instances, a method of screening may include sequencing, including but not limited to e.g., sequencing cells selected in the screen. Any convenient and appropriate method of sequencing may be employed including but not limited to e.g., RNA-seq.

In some embodiments, a subject screen may involve genetic silencing of various target genes in a population of cells, such as neurons, and selection for the cells not experiencing ON neuropathy. Accordingly, in such a screen, non-degenerating cells may be under-represented or absent and healthy cells (i.e., cells with reduced or inhibited neurodegeneration) may be over-represented or essentially the only cells present. Correspondingly, sequencing of the remaining or selected cells will reveal over-represented and under-represented leads for the various target gene transcripts. Where RGCs having a silenced target gene are present or over-represented in the population of selected RGC-neurodegeneration-negative cells, the silenced target gene may be identified as a positive regulator of RGC degeneration, ER stress and/or UPR pathways. Where RGCs having a silenced target gene are absent or under-represented in the population of selected RGCs, the silenced target gene may be identified as a negative regulator of RGC degeneration.

As summarized above, identified RGC degeneration-associated target genes, including target genes that are positive and negative regulators of RGC degeneration, may be used in the treatment of subjects in need thereof in further methods included in the instant disclosure. Thus, the methods of the present disclosure include methods of treating a neurodegenerative disorder in a subject by administering to the subject an antagonist of a positive regulator of RGC degeneration, including a positive regulator identified in a screen as described above. Accordingly, the methods of the present disclosure also include methods of treating a neurodegenerative disorder in a subject by administering to the subject an agonist of a negative regulator of RGC degeneration, including a negative regulator identified in a screen as described above.

Reagents, Devices and Kits

Also provided are reagents, devices and kits thereof for practicing one or more of the above-described methods. The subject reagents, devices and kits thereof may vary greatly. Reagents and devices of interest include those mentioned above with respect to the methods of treating a neurodegenerative condition in a subject, including by administering to the subject an effective amount of an agent that reduces the prevalence of RGC degeneration. The subject kits may include any combination of components (e.g., reagents, cell lines, etc.) for performing the subject methods, such as e.g., methods of treating a neurodegenerative condition and/or methods of identifying a RGC degeneration-associated target gene.

In some embodiments, a subject kit may be employed in a method of identifying a target gene associated with degeneration of retinal ganglion cells. Such kits may vary and may, but need not necessarily, include one or more RGC populations. In some embodiments, a subject kit may include one or more, including a plurality of or a library of, CRISPR-based gene silencing agents. In some embodiments, the subject kits may include a nucleic acid for expressing a Cas9 polypeptide within a particular cell type, such as a retinal ganglion cell. In some instances, a cell line contained within a subject kit may be configured (e.g., genetically modified) to express a Cas9 polypeptide.

In addition to the above components, the subject kits will further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Yet another means would be a computer readable medium, e.g., diskette, CD, portable flash drive, etc., on which the information has been recorded. Yet another means that may be present is a website address which may be used via the internet to access the information at a removed site. Any convenient means may be present in the kits.

Mice. H11LSL-3xFlag-Cas9 with C57BL/6 background (Chiou et al., 2015) (#027632) and C57BL/6 WT (#000664) mice were purchased from Jackson Laboratories (Bar Harbor, Maine). Either sex was randomly used the in experiments. All experimental procedures were performed in compliance with animal protocols approved by the IACUC at Stanford University School of Medicine.

Constructs. All the promoter constructs were based on the pAM-AAV-CAG-EGFP-WPRE plasmid (FIG. 1, panel A). Genomic DNA from C57BL/6J mouse tails and human HEK 293 cells were used to PCR the nine mouse promoters (synuclein gamma "mSncg," a-calcium/calmodulin-dependent protein kinase II "mCaMKIIa" (SEQ ID NO: 52), ISL LIM Homeobox 2 "mIsl2" (SEQ ID NO: 50), thy-1 cell surface antigen "mThy1" (SEQ ID NO: 49), Class III Beta-Tubulin "mTuBB3" (SEQ ID NO: 53), synapsin I "mSyn1" (SEQ ID NO: 51), phosphoglycerate kinase 1 "mPGK" (SEQ ID NO: 54), growth associated protein 43 "mGAP43" (SEQ ID NO: 55), and RNA-binding protein with multiple splicing "mRBPMS" (SEQ ID NO: 56), and the four human promoters ("hSncg" (SEQ ID NO: 57), "hIsl2" (SEQ ID NO: 59), "hThy1" (SEQ ID NO: 58), and "hSyn1" (SEQ ID NO: 60)), respectively. The primers used for PCR with the promoters are shown in Table 1 and listed in the Sequence Listing submitted herewith, and are identified herein as follows: (mSncg forward (SEQ ID NO:14); mSncg reverse (SEQ ID NO:15); mCamk2a forward (SEQ ID NO:16); mCamk2a reverse (SEQ ID NO:17); mIsl2 forward (SEQ ID NO:18); mIsl2 reverse (SEQ ID NO:61); mThy1 forward (SEQ ID NO:62); mThy1 reverse (SEQ ID NO:19); mTUBB3 forward (SEQ ID NO:20); mTUBB3 reverse (SEQ ID NO:21); mSyn1 forward (SEQ ID NO:22); mSyn1 reverse (SEQ ID NO:23); mPGK forward (SEQ ID NO:24); mPGK reverse (SEQ ID NO:25); hSncg forward (SEQ ID NO:26); hSncg reverse (SEQ ID NO:27); hIsl2 forward (SEQ ID NO:28); hIsl2 reverse (SEQ ID NO:29); hThy1 forward (SEQ ID NO:30); hThy1 reverse (SEQ ID NO:31); hSyn1 forward (SEQ ID NO:32); hSyn1 reverse (SEQ ID NO:33); mGAP43 forward (SEQ ID NO:34); mGAP43 reverse (SEQ ID NO:35); mRBPMS forward (SEQ ID NO:36); mRBPMS reverse (SEQ ID NO:37); mSncg-1.03k forward (SEQ ID NO:38); mSncg-1.03k reverse (SEQ ID NO:39); mSncg-0.66k forward (SEQ ID NO:40); mSncg-0.66k reverse (SEQ ID NO:41); mSncg-0.27k forward (SEQ ID NO:42); mSncg-0.27k reverse (SEQ ID NO:43).

TABLE S1

| name | Promoter size | Vector size | Forward Primer | Reverse Primer | AAV titers (Vg/ml) |
|---|---|---|---|---|---|
| CAG | 953 | 3104 | / | / | 1.84E+12 |
| mSncg | 1445 | 3596 | GGAATTCcatatggtcccatgccactagtgggagc | CATgaattccttgaagacgtccatggtgtttgcaagg | 5.13E+12 |
| mCamk2a | 1290 | 3441 | GGAATTCcatatgccattatggccttaggtcacttcatctcc | CCGgaattctgctgccccagaactaggg | 8.19E+12 |
| mIsl2 | 1395 | 3546 | GGAATTCcatatggtcccatgccactagtgggagc | CATgaattcagagatgtgagcaaagcttgcggc | 5.08E+12 |
| mThy1 | 2954 | 5105 | GGAATTCcatatggagcagatctccagccaagaggc | CATgaattcaggtgccaagagttccgacttgg | 2.81E+13 |
| mTUBB3 | 1283 | 3434 | GGAATTCcatatgctggaaccacagaaagccacatcatggacaca | CATgaattcggacggctcagcctcaccttg | 9.47E+12 |
| mSyn1 | 1120 | 3271 | GGAATTCcatatgtgagccttcttattcagaccacc | CCGgaattcccgcagagcgtatggtcg | 6.12E+12 |
| mPGK | 501 | 2652 | GGAATTCcatatgaggggaggcgcttttcccaag | CCGgaattctgaggtcgaaaggcccggagatc | 1.44E+13 |
| hSncg | 1349 | 3500 | GGAATTCcatatgccaaggtccaggccctcttacc | CATgaattcacatccatggtgggtgtgcagg | 3.07E+12 |
| hIsl2 | 1385 | 3536 | GGAATTCcatatgcaggcgcacaccaagttcttgg | CATgaattcaagagatgtgcgcaaagtgtgcgg | 5.06E+12 |
| hThy1 | 2807 | 4958 | GGAATTCcatatgactcagtccttttgtgctgtctcctcctc | CATgaattccattcacgttgctatgcagcccatctcc | 0.66E+12 |
| hSyn1 | 570 | 2721 | GGAATTCcatatggcctgtgtggatgtgggagactaatc | CCGgaattctcgccgcagcgcagatggtcg | 1.11E+13 |

TABLE S1-continued

| name | Promoter size | Vector size | Forward Primer | Reverse Primer | AAV titers (Vg/ml) |
|---|---|---|---|---|---|
| mGAP43 | 1485 | 3676 | GGAATTCcatatgcgttgtctgcccgttgtctg | CCGgaattctctcgcgctagcgcgctctc | 9.59E+12 |
| mRBPMS | 2475 | 4666 | GGAATTCcatatggaaccaggattcagcgactatgttgc | CCGgaattcaagctttagccttgttactctac | 4.56E+12 |
| mSncg-1.03k | 1025 | 3176 | GGAATTCcatatgtcagccttacaagtgactctcaaatttgc | CATgaattccttgaagacgtccatggtgtttgcaagg | 8.06E+12 |
| mSncg-0.66k | 657 | 2808 | GGAATTCcatatgctatgggaactagcaggtgggtg | CATgaattccttgaagacgtccatggtgtttgcaagg | 2.33E+13 |
| mSncg-0.27k | 265 | 2416 | GGAATTCcatatgaagagtcagcagggcagaatagag | CATgaattccttgaagacgtccatggtgtttgcaagg | 2.32E+13 |

The promoters were inserted into NdeI and EcoRI sites of pAM-AAV-CAG-EGFP-WPRE plasmid to replace the original CAG promoter. The truncation of mSncg promoter was also done by PCR using the primers listed in Table 1. The mRBPMS promoter failed to amplify by PCR, and thus, a 2475 bp fragment was synthesized by IDT. All the promoters' sequences are included in the sequence listing. To make the pAM-AAV-mSncg-Cre, the EGFP in the pAM-AAV-mSncg-EGFP was replaced with Cre using XhoI and EcoRI and Gibson assembly. The Cre was amplified by forward primer: gcaaacaccatggacgtcttcaaggaattcgccaccatgcc-caagaagaagaggaaggtg (SEQ ID NO: 1), and reverse primer: ccggtcgactctagaggtaccacgcgtagatctctaatcgc-catcttccagcaggc (SEQ ID NO: 2).

The plasmid containing SpCas9 with N-terminal HA tag was purchased from Addgene (PX551, Plasmid #60957). For constructing the vector carrying SpCas9 with mSncg-0.27K promoter, the PX551 was digested with XbaI and AgeI to remove the original Mecp2 promoter. The promoter insert was amplified using the following primers: ITR-mSncg-0.27K-F (forward): cat-cactaggggttcctgcggcctctagaaagagtcagcagggcagaatagagc (SEQ ID NO: 3); Cas9-mSncg-reverse: acatcgtatgggta-catggtggcgaccggtcttgaagacgtccatggtgtttgc (SEQ ID NO: 4).

The backbone and insert were assembled together by Gibson reaction (NEB, E2611 L).

Figure 11A:
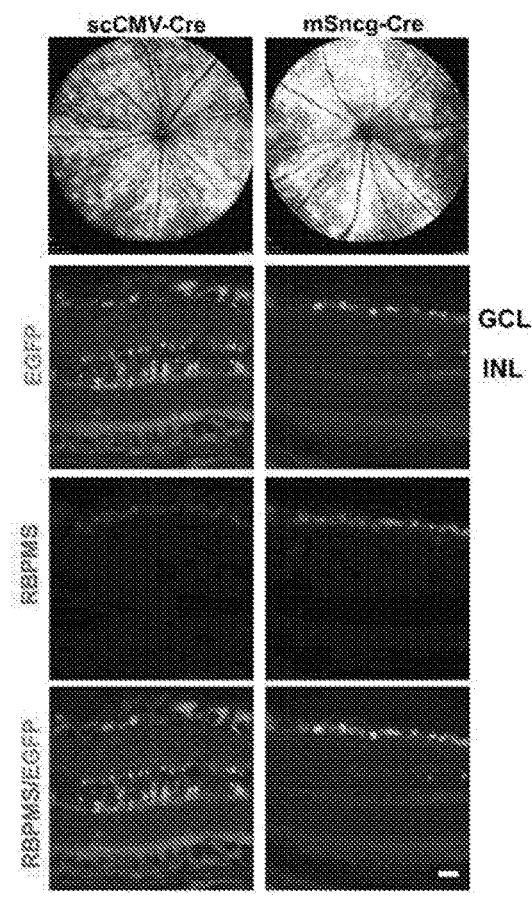
FIG. 11A-11B shows AAV-mSncg-Cre mediated reporter expression and ON regeneration.
Figure 11B:
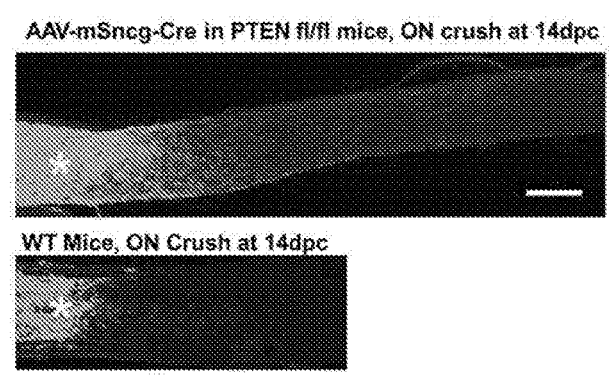

For single guide RNA (gRNA) selection and generation, the 20-nt target sequences were selected to precede a 5'-NGG protospacer-adjacent motif (PAM) sequence available online at portals.broadinstitute.org/gpp/public/analysis-tools/sgrna-design. For each gRNA, two partially complementary oligos with 4 nucleotide (nt) overhangs compatible for cloning were synthesized and annealed and ligated into SapI digested PX552 vector (Addgene, Plasmid #60958) that carries the gRNA scaffold with U6 promoter. The original PX552 plasmid was used as control (Control gRNA). For the multiplex gene targeting strategy, individual sgRNA cassettes with U6 promoter and gRNA scaffold were pasted into the region between ITR and U6 promoter until 4 sgRNA cassettes were built into one construct (FIG. 11). All obtained constructs were verified by sequencing.

AAV production. The detailed procedure has been described previously (Hu et al., 2012; Yang et al., 2014). Briefly, AAV plasmids containing the transgenes were co-transfected with pAAV2 (pACG2)-RC triple mutant (Y444, 500, 730F) (Petrs-Silva et al., 2011; Wang et al., 2014a; Zhang et al., 2014) and the pHelper plasmid (Stratagene) into HEK293T cells. 72 hours after transfection, the cells were lysed to release the viral particles, which were precipitated by 40% polyethylene glycol and purified by two rounds of cesium chloride density gradient centrifugation. The virus bands were taken out for dialysis in a MWCO 7000 Slide-A-LYZER cassette (Pierce) overnight at 4° C. The AAV titers were determined by real-time PCR (Table 1) and diluted to $1.5 \times 10^{12}$ vector genome (vg)/ml. Thus, 2 µl was used for intravitreal injection of each eye to achieve $3 \times 10^9$ vg/retina. All the AAVs titers are summarized in Table 1.

Intravitreal injection. Mice were anesthetized by xylazine and ketamine based on their body weight (0.01 mg xylazine/g+0.08 mg ketamine/g). For each AAV intravitreal injection, a micropipette was inserted into the peripheral retina of 3-week-old mice just behind the ora serrata, and advanced into the vitreous chamber so as to avoid damage to the lens. Approximately 2 µl of the vitreous was removed before injection of 2 µl AAV into the vitreous chamber.

ON crush. ON crush was performed 2 weeks following AAV injection (Yang et al., 2014; Miao et al., 2016): the ON was exposed intraorbitally while care was taken not to damage the underlying ophthalmic artery, and crushed with a jeweler's forceps (Dumont #5; Fine Science Tools, Foster City, California) for 5 seconds approximately 0.5 mm behind the eyeball. Eye ointment containing neomycin (Akorn, Somerset, New Jersey) was applied to protect the cornea after surgery.

RGC axon anterograde tracing. 2 µl of cholera toxin β subunit (CTB) conjugated with fluorescence Alexa-488 (2 µg/µl, Invitrogen) was injected into the vitreous chamber 2 days before euthanizing the animals at 14 days post crush (14 dpc) to label the regenerating axons in the optic nerve. Animals were euthanized by $CO_2$ and fixed by perfusion with 4% paraformaldehyde in cold PBS. Eyes with the nerve segment still attached were dissected out and post-fixed in the same fixative for another 2 hours at room temperature. Tissues were cryoprotected through increasing concentrations of sucrose (15%-30%) and optimal cutting temperature compound (OCT) (Tissue Tek). They were then snap-frozen in dry ice, cut into serial longitudinal cross-sections (8 µm) and stored at −80° C. until processed.

Immunohistochemistry of wholemount and cross sections of retina. After transcardiac perfusion with 4% PFA in PBS, the eyes were dissected out, post-fixed with 4% PFA for 2 hours, at room temperature, and cryoprotected in 30% sucrose overnight. For retina wholemount, retinas were dissected out and washed extensively in PBS before blocking in staining buffer (10% normal goat serum and 2% Triton X-100 in PBS) for 1 hour. RBPMS guinea pig antibody was made at ProSci, California according to publications (Kwong et al., 2010; Rodriguez et al., 2014) and used at 1:4000, rat HA (clone 3F10, 1:200, Roche) and M2 antibodies for Flag tag (1:200) were diluted in the same staining buffer. Floating retinas were incubated with primary antibodies overnight at 4° C. and washed three times for 30 minutes each with PBS. Secondary antibodies (Cy2, Cy3 or Cy5-conjugated) were then applied (1:200; Jackson ImmunoResearch) and incubated for 1 hour at room temperature. Retinas were again washed three times for 30 minutes each with PBS before a cover slip was attached with Fluoromount-G (SouthernBiotech). For cross sections of retina, the eyes were dehydrated in 30% sucrose solution overnight before embedding in OCT on dry ice. Serial cross sections (14 μm) were cut with a Leica cryostat and collected on Superfrost Plus Slides and stored at −80° C. until processed.

Counting surviving RGCs in retina and axons in ON. For RGC counting, whole-mount retinas were immunostained with the RBPMS antibody, 6-9 fields randomly sampled from peripheral regions of each retina using 40× lens with a Zeiss M2 epifluorescence microscope, and $RBPMS_+$ RGCs counted by Volocity software (Quorum Technologies). The percentage of RGC survival was calculated as the ratio of surviving RGC numbers in injured eyes compared to contralateral uninjured eyes. To count surviving axon in ON, transverse semi-thin (1 μm) sections of ON were cut on an ultramicrotome (EM UC7, Leica, Wetzlar, Germany) and collected 2 mm distal to the eye (about 1.5 mm distal to the crush site). The semi-thin sections were stained with 1% para-phenylenediamine (PPD) in methanol: isopropanol (1:1) (Smith, 2002), and imaged through a 100× lens of a Zeiss M2 epifluorescence microscope to cover the entire area of the ON without overlap. Two areas of 21.4 μm×29.1 μm were cropped from the center of each image, and the surviving axons within the designated areas were counted manually. After counting all the images taken from a single nerve, the mean of the surviving axon number was calculated for each ON. The mean of the surviving axon number in the injured ON was compared to that in the contralateral control ON to yield a percentage of axon survival value. The investigators who counted the cells or axons were blinded to the treatment of the samples.

Retrograde labeling of RGCs by injection of DiI into superior colliculus (SC). The adult WT mice were anesthetized by xylazine and ketamine based on their body weight (0.01 mg xylazine/g+0.08 mg ketamine/g) and placed on a mouse adaptor (502600, World Precision Instruments, LLC) attached to a digital stereotaxic instrument (68025, RWD Life Science). The bregma was set as the origin of anterior to posterior (AP), medial to lateral (ML) and dorsal to ventral (DV), and the lambda was at the same ML and DV as bregma. The horizontal plane of the mouse skull was calibrated before drilling by adjusting the left hemisphere point (AP: −2.00, ML: 2.50) at the same DV with the contralateral point (AP: −2.00, ML: −2.50. The SC coordinates for 4 sites and 3 depths are: AP: −3.55, ML: 0.6, DV−1.25/−1.60/−2.00, AP: −3.55, ML: −0.6, DV−1.25/−1.60/−2.00, AP: −3.92, ML: 0.8, DV−1.25/−1.60/−2.00 and AP: −3.92, ML: −0.8, DV−1.25/−1.60/−2.00. A pulled-glass micropipette fused to a 10 μL syringe (80314, Hamilton) with hot glue and filled with mineral oil was controlled by micro syringe pump (Micro4™, World Precision Instruments, LLC) at the speed of 250 nL/min for 1 minute per site. About 3 μL DiI (V22885, Invitrogen) was injected into both SC. 2 days after SC injection, the mice were sacrificed, and retinas were prepared for wholemount staining.

Live retina fundus imaging with scanning laser ophthalmoscopy (SLO). After the mice were anesthetized, pupils were dilated by applying 1% tropicamide sterile ophthalmic solution (Akorn, Somerset, New Jersey), and the customized +10D contact lens (3.0 mm diameter, 1.6 mm BC, PMMA clear, Advanced Vision Technologies) applied to the dilated pupil. The retina fundus images were captured with the Heidelberg Spectralis SLO/OCT system (Heidelberg Engineering, Germany) equipped with 488 excitation laser and $55_o$ noncontact lens. The focal point position to the optic nerve head, imaging area and mouse position were fixed for every animal for reliable comparison. The fluorescent fundus images were acquired at 70 sensitivity, high-resolution mode and 30 frames average. To determine the GFP intensity on fundus images, the fluorescence intensity to radius measurement with the center at the optic disk was performed by Image J and the Concentric Circles Plugin as described previously (Wassmer et al., 2017).

Spectral-domain optical coherence tomography (SD-OCT) imaging. The animal anesthesia, pupil dilation, contact lens application, and mouse position were the same as for SLO imaging, except that a $30_o$ lens (Heidelberg Engineering) was used. The Spectralis OCT has an 870 nm infrared wavelength light source, and the scanner has 7 μm optical axial resolution, 3.5 μm digital resolution, and 1.8 mm scan depth at 40 kHz scan rate. The mouse retina was scanned with the ring scan mode centered by the optic nerve head at 100 frames average under high-resolution mode (each B-scan consisted of 1536 A scans). The GCC includes retinal nerve fiber layer (RNFL), ganglion cell layer (GCL) and inner plexiform layer (IPL). The average thickness of GCC around the optic nerve head was measured manually with the aid of Heidelberg software. The mean of the GCC thickness in the injured retina was compared to that in the contralateral control retina to yield a percentage of GCC thickness value. The investigators who measured the thickness of GSS were blinded to the treatment of the samples.

Pattern electroretinogram (PERG) recording. Mice were anesthetized by xylazine and ketamine based on their body weight (0.01 mg xylazine/g+0.08 mg ketamine/g). PERG recording of both eyes was performed at the same time with the Miami PERG system (Intelligent Hearing Systems, Miami, FL) according to published protocol (Chou et al., 2014). Briefly, mice were placed on a feedback-controlled heating pad (TCAT-2LV, Physitemp Instruments Inc., Clifton, New Jersey) to maintain animal core temperature at 37° C. A small lubricant eye drop (Systane) was applied before recording to prevent corneal dryness. The reference electrode was placed subcutaneously on the back of the head between the two ears and the ground electrode was placed at the root of the tail. The active steel needle electrode was placed subcutaneously on the snout for the simultaneous acquisition of left and right eye responses. Two 14 cm×14 cm LED-based stimulators were placed in front so that the center of each screen was 10 cm from each eye. The pattern remained at a contrast of 85% and a luminance of 800 cd/m2, and consisted of four cycles of black-gray elements, with a spatial frequency of 0.052 c/d. Upon stimulation, the independent PERG signals were recorded from the snout and simultaneously by asynchronous binocular acquisition. With each trace recording up to 1020 ms, two consecutive recordings of 200 traces were averaged to achieve one readout. The first positive peak in the waveform was designated as P1 and the second negative peak as N2. P1 was typically around 100 ms. The amplitude was measured from P1 to N2. The mean of the P1-N2 amplitude in the injured eye was compared to that in the contralateral control eye to yield a percentage of amplitude change. The investigators who measured the amplitudes were blinded to the treatment of the samples.

Isolation of human primary RGC. RGC isolations were performed as previously shown by Barres et al. (Barres et al., 1988), with slight modifications to accommodate human tissue. Briefly, retinas were isolated from healthy donor eyes (within 24 hrs postmortem, 6-month old infant) by circumferential dissected at the limbus, and separation of the anterior and posterior segment of the globe. The vitreous and lens were then carefully dissected away from the retina, care was taken to avoid retinal tearing, and retinas were separated away from the sclera. Retinas were then digested with papain to dissociate the cells. Then RGCs were purified from other retinal cells via a series of negative selection immunepanning steps followed by a modified positive selection pan, using an antibody against human Thy1 (Bio-rad, F15-42-1) to select for human RGCs. RGCs were then plated on PDL+Laminin coated 8 well chamber slides (Lab-Tek; 155411) at 20 k per well. The AAV was added at $1 \times 10_5$ vg/cell in the culture and refreshed culture medium every other day for 5 days prior to fixation with 4% PFA in PBS and immunostaining with primary antibodies (RBPMS 1:4000) and EGFP antibody (Ayes Lab, 1:200) overnight at 4° C. and washed three times for 30 minutes each with PBS. The cells were incubated with secondary antibodies (1:200; Jackson ImmunoResearch) for 1 hour at room temperature.

Human embryonic stem cell culture and RGC differentiation. Human embryonic (A81-H7) stem cells (Sluch et al., 2015) were cultured in mTeSR1 (StemCell Technologies), incubated at 37° C. in 5% CO2. For RGC-like cell differentiation, the chemical-based protocol for neural differentiation previously described (Venugopalan et al., 2016) was used. Briefly, stem cells were cultured in 6-well plates to 80% confluence, then medium was changed to N2 medium (DMEM/F-12 (Thermo Fischer Scientific) supplemented with 1% N2 (Thermo Fisher Scientific) on Day 0. On Day 1, medium was replaced with N2 medium supplemented with Dorsomorphin (1 μM, Tocris), SB431542 (10 μM, Sigma-Aldrich) and IWP (2 μM, Sigma-Aldrich), which was named N2+Dor+SB+IWP2 (N2DSI). On Day 2, to create embryonic bodies (EBs), cells were washed with PBS (without Ca2+/Mg2+) for 5 min at 37° C. Cells were then scraped in N2DSI medium and transferred to ultra-low attachment plates (Corning). Starting from Day 3, the N2DSI medium was changed every other day, using a cell strainer to avoid the loss of EBs, until Day 9. On Day 10, EBs were dissociated with Accutase (Innovative Cell Technologies) and cultured on Matrigel coated plates using NBF medium (DMEM/F-12 supplemented with 1% PS, 0.5% N2, 1% B27 and bFGF, 20 ng ml-1). Neural rosettes formed from EBs in the next 6 days. When neural rosettes appeared, they were manually picked up with a needle, dissociated with Accutase and cultured on PDL/Laminin coated plates using NBF medium. Neural progenitor cells (NPCs) were purified after a few passages and Rock inhibitor (Y-27632, EMD Millipore, Billerica, MA) was added for sub-culturing. RGCs were then differentiated from NPCs utilizing Full Sato (FS) medium, which contained 10 μM γ-secretase inhibitor (Notch signaling inhibitor; DAPT; EMD Millipore, Billerica, MA). Half of the medium was changed every other day until harvesting.

Statistical analyses. GraphPad Prism 6 was used to generate graphs and for statistical analyses. Data are presented as means±s.e.m. Student's t-test was used for two groups comparison and One-way ANOVA with post hoc test was used for multiple comparisons.

Notwithstanding the appended claims, the disclosure is also defined by the following clauses:

1. A composition comprising:
    a mammalian viral vector, which comprises:
    a murine γ-synuclein promoter, or functional fragment thereof, that promotes expression of a transgene specifically in retinal ganglion cells (RGCs), said promoter in operable linkage with:
    an expression cassette encoding the transgene, wherein the expressed transgene inhibits activity of an expression product of an endogenous pro-neurodegenerative gene in an ER stress and/or UPR pathway, wherein uninhibited activity of the endogenous pro-neurodegenerative gene leads to axon or soma degeneration in the RGCs.
2. The composition of clause 1 wherein the transgene encodes a CRISPER/Cas9 system.
3. The composition of clause 1 wherein the transgene encodes a protein that binds to the expression product of the endogenous pro-neurodegenerative gene.
4. A composition comprising:
    an AAV vector, comprising:
    a murine γ-synuclein promoter in operable linkage with a nucleic acid encoding a Cas9 nuclease; and
    a U6 promoter in operable linkage with at least one single guide (sgRNA) 19-20 nucleotides in length, wherein each sgRNA precedes an -NGG protospacer, and wherein each sgRNA targets at least one gene selected from the group consisting of: SARM1, CHOP, elF2 and ATF4.
5. The composition of clause 1 or clause 4, wherein the murine γ-synuclein promoter is selected from mSncg, mSncg-1.45kb, mSncg-1.03kb, mSncg-0.66kb, and mSncg-0.27kb.
6. The composition of clause 1 or clause 4, wherein a first transgene encoding an sgRNA targeting the SARM1, CHOP, elF2 and/or ATF neurodegenerative gene(s) or transcript(s), and a second transgene (contiguous with the first transgene, or in a second cassette non-contiguous with the first transgene) overexpressing the XBP1 and/or ATF6 neuroprotective gene product or protein, for example, are used to achieve synergistic neuroprotection effects.
7. The composition of clause 1, wherein the murine γ-synuclein promoter selected from full-length mSncg, mSncg-1.45kb, mSncg-1.03kb, mSncg-0.66kb, and mSncg-0.27kb is used to drive express of one or both of XBP1 and/or ATF6 neuroprotective gene(s).
8. A method of treating an optic nerve (ON) neuropathy in a mammalian subject in need thereof, the method comprising:
    intravitreally administering the composition of any one of clauses 1-5 into the subject, thereby treating the ON neuropathy.
9. A method of reducing or ameliorating degeneration of axons and/or soma of RGCs, comprising:
    intravitreally administering the composition of any one of clauses 1-5 into a mammalian subject experiencing or at imminent risk of an ON neuropathy.
10. A method of inducing neuroprotection/increasing survival/promoting functional recovery of RGC somata and axons, comprising:
    intravitreally administering the composition of any one of clauses 1-5 into a mammalian subject experiencing or at imminent risk of an ON neuropathy.

11. The method of any one of clauses 8-10, wherein the ON neuropathy is retinal ganglion cell degeneration, including glaucoma, optic neuritis, ON traumatic injury and other ON-related diseases.

12. A kit comprising:
    an AAV vector, comprising:
    a murine γ-synuclein promoter that promotes expression of a transgene specifically in RGCs, wherein the murine γ-synuclein promoter is in operable linkage with:
    an expression cassette that expresses Cas9 and a sgRNA, wherein the sgRNA targets at least one endogenous pro-neurodegenerative gene in an ER stress and/or UPR pathway, wherein uninhibited activity of the endogenous pro-neurodegenerative gene leads to axon or soma degeneration in the RGCs; and
    instructions for use.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

General methods in molecular and cellular biochemistry can be found in such standard textbooks as Molecular Cloning: A Laboratory Manual, 3rd Ed. (Sambrook et al., HaRBor Laboratory Press 2001); Short Protocols in Molecular Biology, 4th Ed. (Ausubel et al. eds., John Wiley & Sons 1999); Protein Methods (Bollag et al., John Wiley & Sons 1996); Nonviral Vectors for Gene Therapy (Wagner et al. eds., Academic Press 1999); Viral Vectors (Kaplift & Loewy eds., Academic Press 1995); Immunology Methods Manual (I. Lefkovits ed., Academic Press 1997); and Cell and Tissue Culture: Laboratory Procedures in Biotechnology (Doyle & Griffiths, John Wiley & Sons 1998), the disclosures of which are incorporated herein by reference.

Example 1

Figures 2A, 2B:
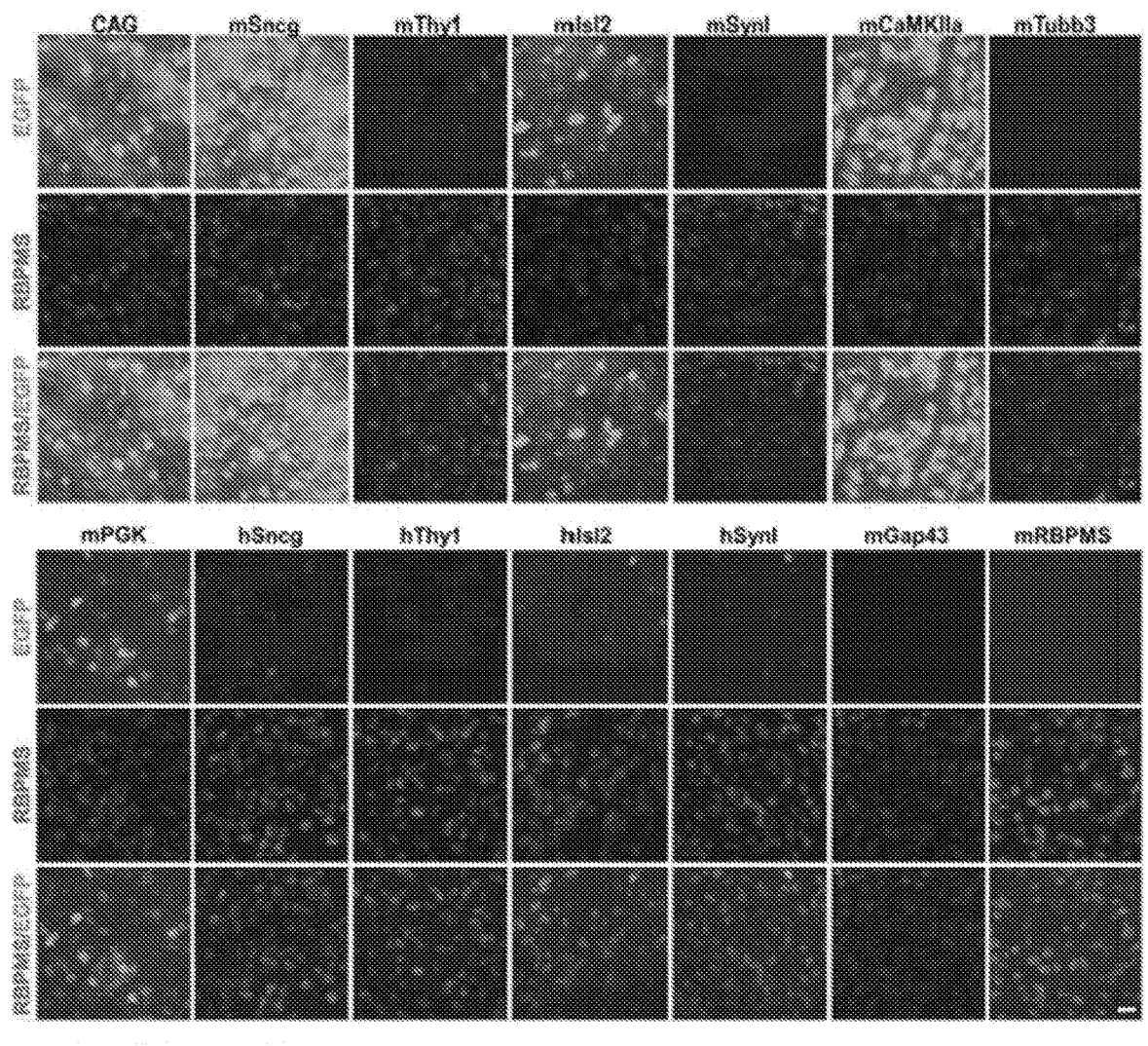
FIG. 2A-2B.
Figure 3A:
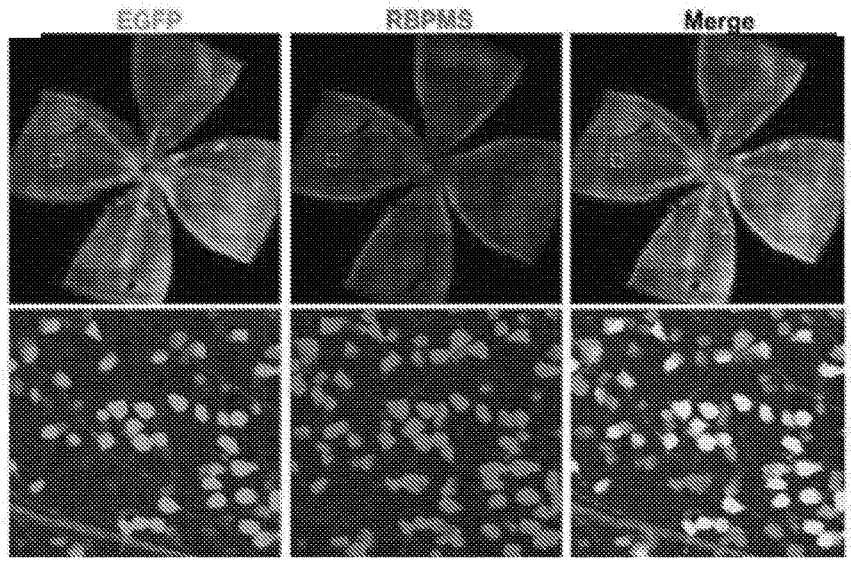
FIG. 3A-3D shows co-labeling AAV-mSncg-EGFP infected cells in mouse retina with RGC markers, RBPMS or retrograde tracing dye Dil.
Figure 3B:
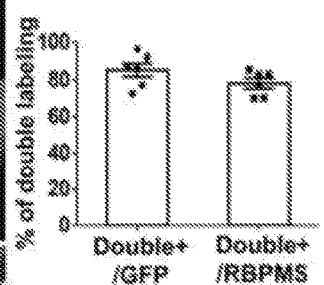
Figure 3C:
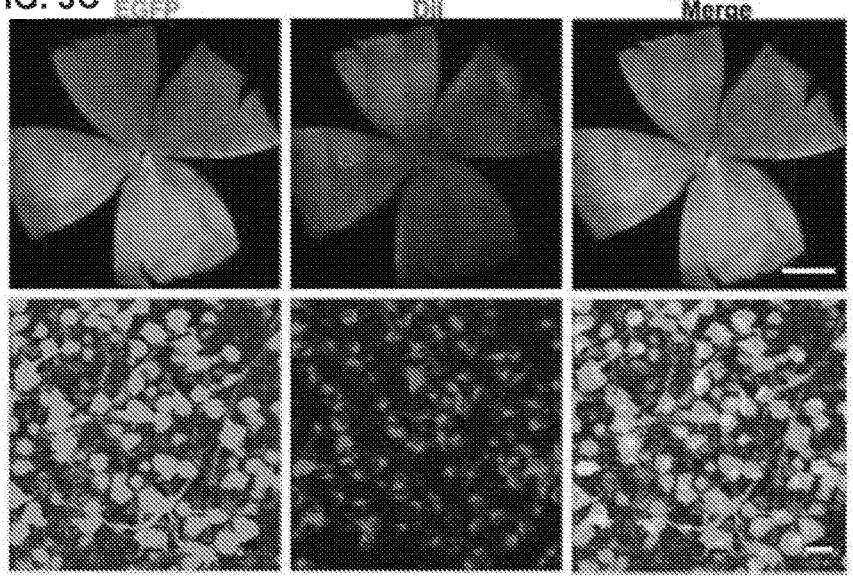
Figure 3D:
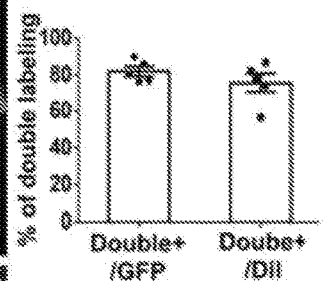
Figure 9A:
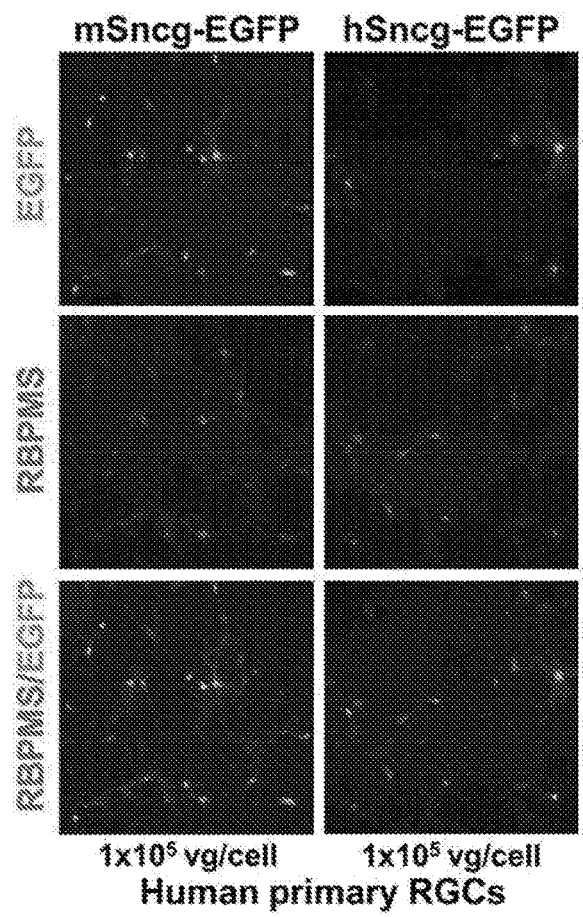
FIG. 9A-9B show that the mSncg promoter drives EGFP expression more efficiently than hSncg promoter in human RGCs.
Figure 9B:
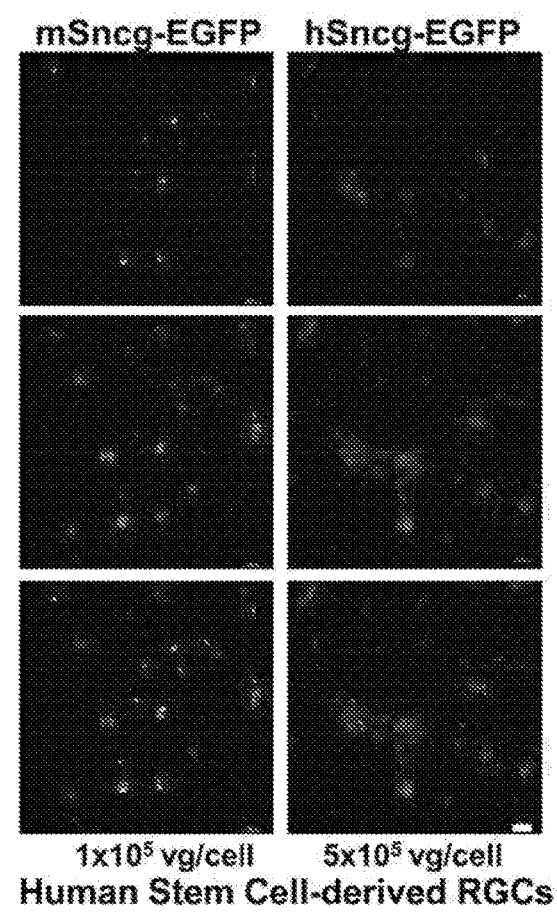

AAV-mSncg Promoter Drives Potent GFP Expression in Mouse RGCs After Intravitreal Injection To identify a RGC-specific promoter, a group of promoters commonly used in AAVs to drive gene expression in neurons were collected: (CAG, mPGK, mCaMKIIa (Mayford et al., 1996; Gerits et al., 2015), SynI (Kugler et al., 2003)), as well as promoter sequences predicted from several RGC-specific genes (Sncg (Surguchov et al., 2001; Buckingham et al., 2008; Soto et al., 2008; Surgucheva et al., 2008), Isl2 (Pak et al., 2004), Thy1 (Vidal et al., 1990; Spanopoulou et al., 1991), Tubb3 (Mellough et al., 2004), GAP43 (Meyer et al., 1994; Schaden et al., 1994) and RBPMS (Kwong et al., 2010; Rodriguez et al., 2014)). The promoters were subcloned into the same AAV2 backbone vector to drive expression of reporter gene EGFP (FIG. 1, panel A). Equal amounts of AAV vectors were injected into the vitreous (3×10⁹ vector genome (vg)/eye) and used retinal cross sections to screen the tested promoters for cell transduction in the ganglion cell layer (GCL) (FIG. 1, panel B). In dramatic contrast to the commonly used universal CAG promoter, which drives EGFP expression in both GCL and inner nucleus layer (INL), the mouse and human Sncg and Thy1 promoters demonstrated the best specificity, as evidenced by restricted EGFP in GCL. Based on EGFP intensity as a reflection of promoter strength, mSncg promoter showed much stronger activity than any of the other promoters tested, except for mCaMKIIa promoter, which drove EGFP expression as robustly as mSncg, but very broadly in retina instead of restricting expression to the GCL (FIG. 1, panel B; FIG. 2, panel A). Interestingly, mSncg promoter was much more potent than hSncg promoter, as evidenced by stronger EGFP intensity in both wholemount retina and ON (FIG. 2, panels A and B). Surprisingly, mSncg promoter was also much more robust than hSncg promoter even in human primary RGCs and human stem cell-derived RGCs (FIG. 9). Thus, subsequent experiments focused on characterizing the mSncg promoter. To determine the extent and specificity with AAV2-mSncg-EGFP targeted RGCs after intravitreal injection, RGCs were labeled with a pan-RGC marker, RBPMS (Kwong et al., 2010; Rodriguez et al., 2014). About 78% of RBPMS⁺ RGCs were double labeled with GFP and about 85% of GFP cells were double labeled with RBPMS (FIG. 3, panels A and B), indicating that AAV2-mSncg-EGFP efficiently targeted the majority of RGCs and that most of the cells transduced by AAV2-mSncg-EGFP were RGCs. Since more than 85% of mouse RGCs project their axons to superior colliculus (SC) (Ellis et al., 2016), neuronal tracing dye DiI was also injected into SC, to retrogradely label the majority of RGCs. Again, about 75% of DiI⁺ RGCs were double labeled with GFP and about 82% GFP RGCs were also labeled with DiI (FIG. 3, panels C and D). Considering that none of these confirmatory methods label all RGCs, these results increased confidence that AAV2-mSncg-EGFP effectively targeted a large majority of RGCs.

Example 2

Figure 4A:
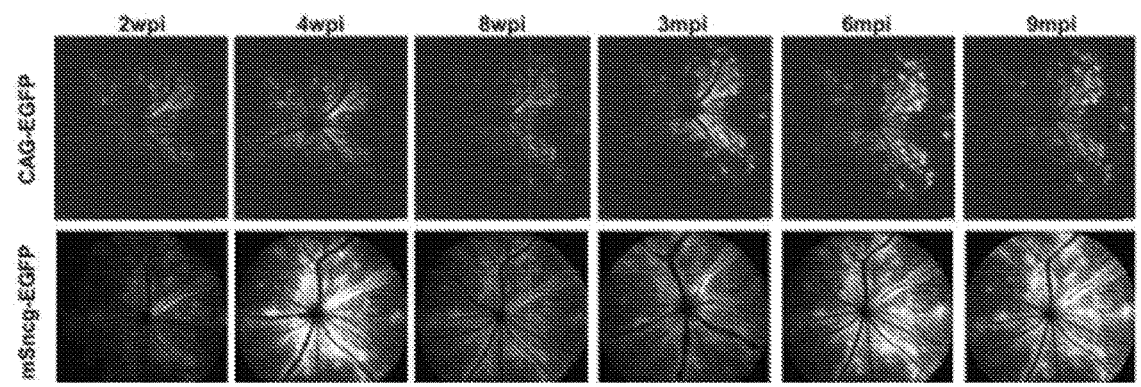
FIG. 4A-4C shows long-term EGFP expression driven by mSncg or CAG (SEQ ID NO: 44) promoters in mouse RGCs.
Figure 4B:
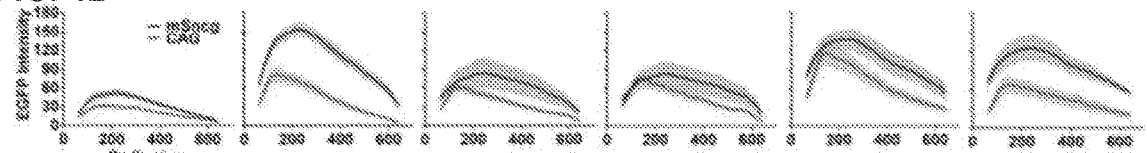
Figure 4C:
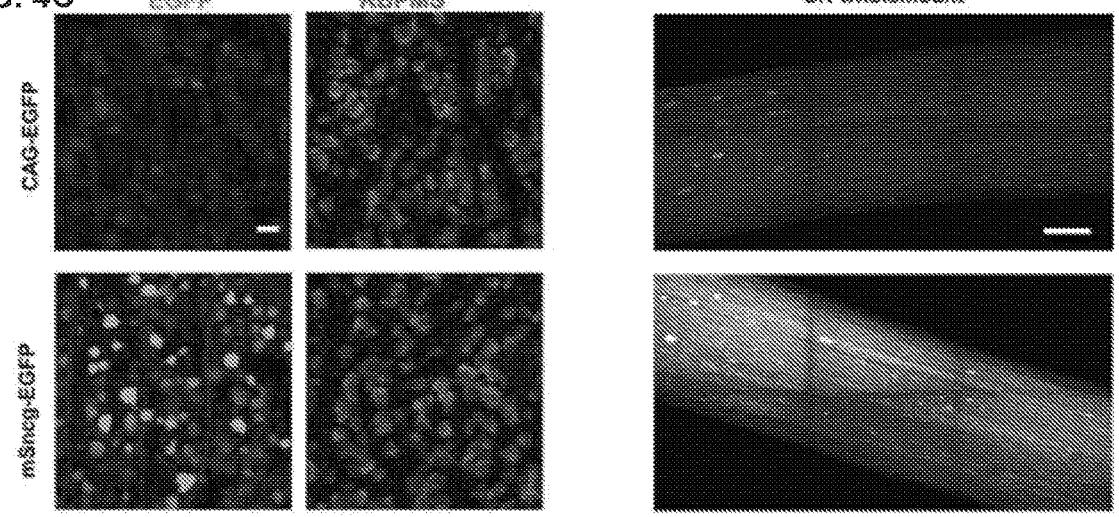
Figure 5A:
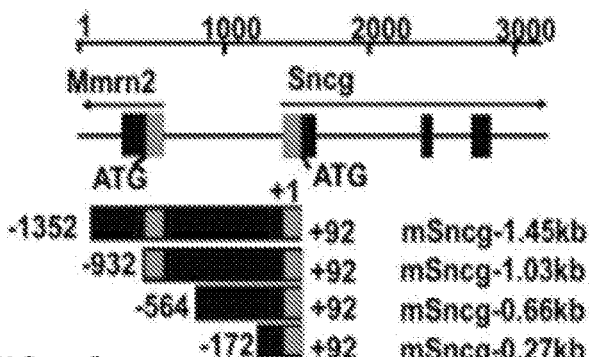
FIG. 5A-5D shows the specificity and potency of different truncated forms of mSncg promoter in mouse RGCs.
Figure 5B:
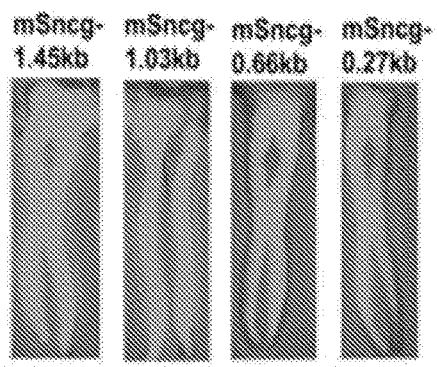
Figure 5C:
Figure 5C:
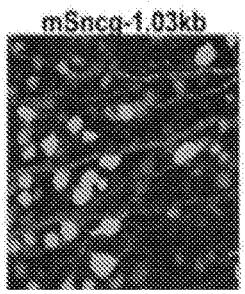
Figure 5C:
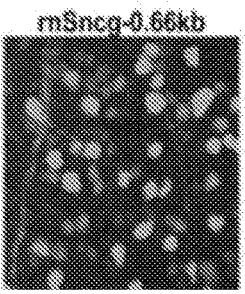
Figure 5C:
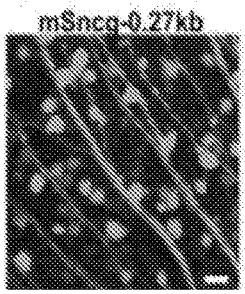
Figure 5D:
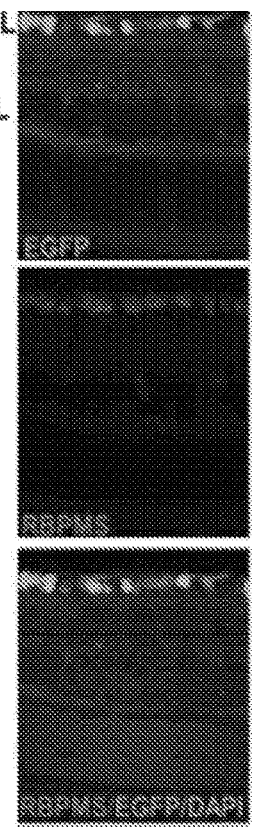
Figure 5D:
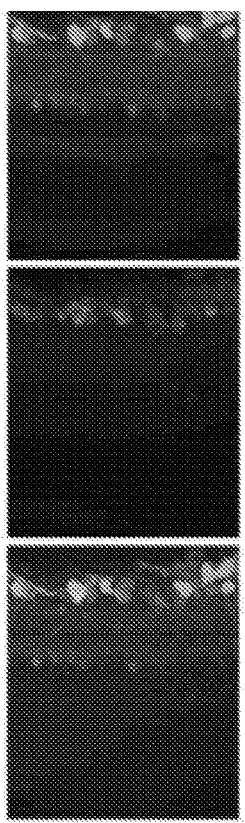
Figure 5D:
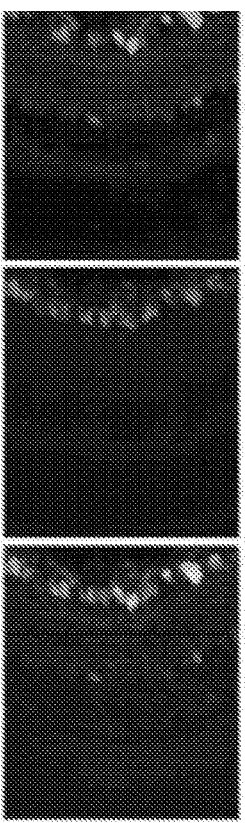
Figure 5D:
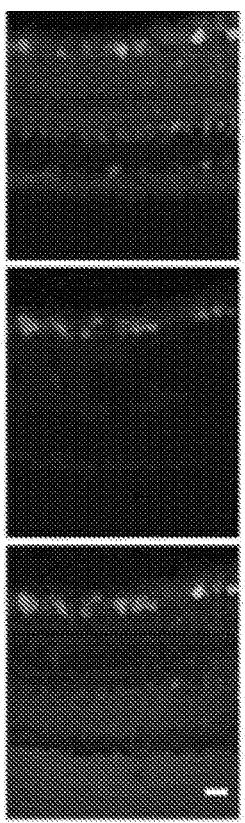
Figure 7A:
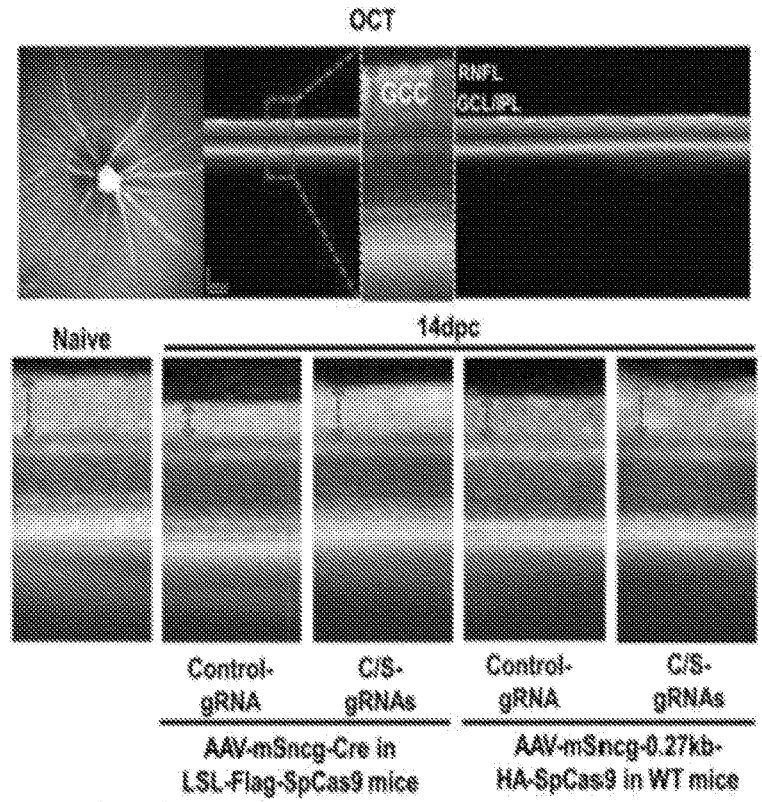
FIG. 7A-7D shows in vivo morphological and functional assays of RGCs after ON crush injury.
Figure 7B:
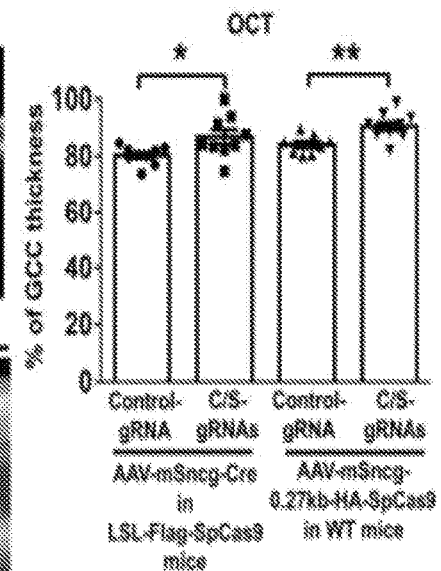
Figure 7C:
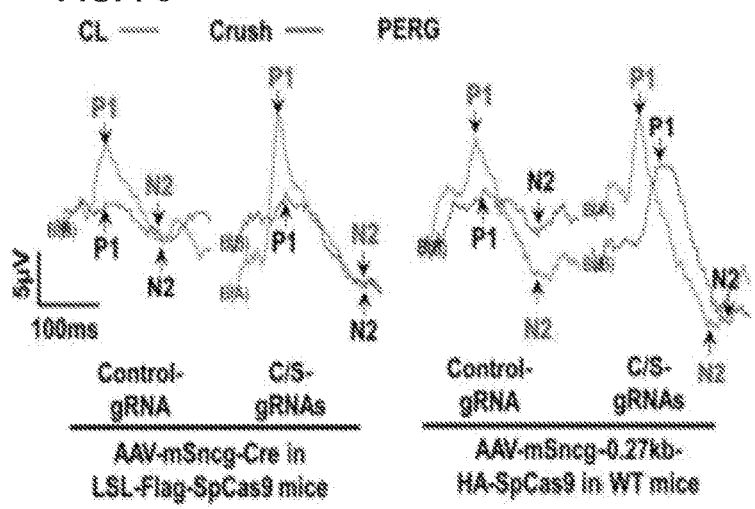
Figure 7D:
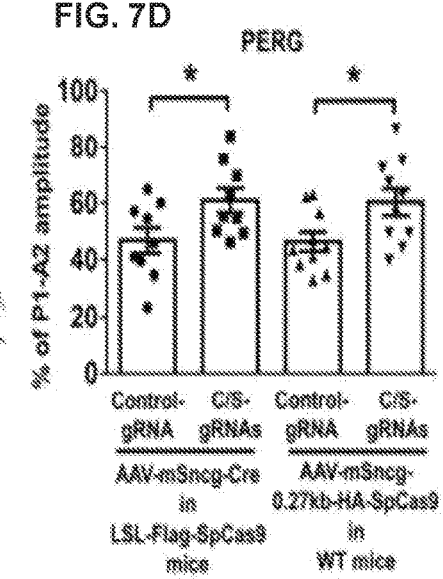

AAV2-Mediated Transgene Expression Follows a Unique Dynamic Long-Term Pattern in Mouse RGCs AAV rarely integrates into the host genome, and instead remains as episomes that express transgenes for a long period of time (Schnepp et al., 2003; Hastie and Samulski, 2015). To determine its expression pattern in RGCs, AAV2-mSncg-EGFP and AAV2-CAG-EGFP were injected intravitreally into two groups of mice and live fundus imaging with scanning laser ophthalmoscopy (SLO) was used to monitor EGFP expression in retina. Consistent with histological studies, the mSncg promoter drove transgene expression much more potently than CAG promoter at all time points after AAV injection (FIG. 4, panels A and B). However, both promoters showed similar dynamic expression patterns: expression peaked at 4 weeks post injection (4 wpi), decreased for several weeks thereafter, and then steadily recovered from 3 months post injection (3 mpi) to 9 mpi (the latest time point studied). Wholemounts of retinas and ON at 9 mpi confirmed potent long-term expression of EGFP in RGCs (FIG. 4, panel C). In summary, mSncg promoter can drive long-term transgene expression in RGCs. One hypothesis to explain the fluctuating pattern of gene expression is that the intrinsic characteristics of AAV may be responsible, rather than those of the promoter.

Example 3

Truncated Forms of mSncq Promoter Maintain Strong Promoter Activities But Decrease RGC Specificity The capacity of the AAV vector is about 4.7 kilo base pairs (kb) in between two inverted terminal repeats (ITRs); a shorter promoter allows larger transgene packaging. The 1.45kb mSncg promoter originally tested from upstream (5'-) was truncated into three different sizes, 1.03kb, 0.66kb and 0.27kb (FIG. 5, panel A). Wholemounts of ON and retinas demonstrated that all of these truncated forms of mSncg promoter drove strong EGFP expression (FIG. 5, panels B and C), and therefore that they retained the core promoter region. However, retinal cross sections revealed increasing INL cell labeling with increasing truncation, and therefore a noticeable decline in the RGC specificity (FIG. 5, panel D). These data suggest that upstream regions of the mSncg promoter contain cis-regulatory elements important for RGC specificity.

Example 4

AAV-mSncq Promoter-Mediated CRISPR/Cas9 Efficiently Knocks Down CHOP and SARM1 in Mouse RGCs Since CHOP deletion and SARM1 deletion are protective for RGC somata (Hu et al., 2012; Yang et al., 2016a; Huang et al., 2017) and axon (Osterloh et al., 2012; Gerdts et al., 2013), respectively, the effects of editing these two genes with CRISPR/Cas9 in vivo in RGCs specifically were tested. First, several CHOP and SARM1 gRNAs were tested in cultured cells and 2 gRNAs were selected for each gene that showed strong inhibition effects to make a CHOP and SARM1 (C/S) gRNAs AAV vector targeting both genes at the same time (FIG. 10). The mSncg-0.27kb promoter allowed us to package SpCas9 into AAV2 vector and test its gene editing efficiency in RGCs in vivo. The expression of HA-SpCas9 was confirmed in RGCs after AAV-mSncg-HA-SpCas9 intravitreal injection (FIG. 6, panel A, top). Co-injection of AAV-SpCas9+AAV-U6-C/S gRNAs+AAV-CHOP-mCherry in wild type (WT) mouse eyes consistently produced significantly greater downregulation of CHOP-mCherry than control-gRNA (FIG. 6, panel A, bottom). Another strategy for performing RGC-specific CRISPR/Cas9 gene editing was also tested. In a separate approach, Cre expression driven by full length mSncg promoter in mouse RGCs was tested, and more specific and potent Cre expression in a Cre-dependent reporter mouse line (LSL-EGFP) than by CMV promoter was also confirmed (FIG. 11, panel A). Additionally, AAV2-mSncg-Cre was confirmed to mediate PTEN deletion in RGCs specifically promoted potent ON regeneration (FIG. 11, panel B), consistent with previous results using CMV-Cre (Park et al., 2008; Yang et al., 2014; Miao et al., 2016). AAV-mSncg-Cre was then injected into LSL-Flag-SpCas9 mouse eyes and confirmed Flag-SpCas9 expression in RGCs (FIG. 6, panel B, top). This strategy also enabled us to detect significant inhibition of SARM1-mCherry expression after combined injection of AAV-U6-C/S gRNAs+AAV-SARM1-mCherry in RGCs (FIG. 6, panel B, bottom).

Lastly, in situ hybridization (ISH) was used to confirm that AAV-mSncg mediated CRISPR/Cas9 gene editing efficiently and specifically knocked down endogenous CHOP and SARM1 in RGCs (FIG. 6, panel C).

Because basal levels of CHOP and SARM1 are very low in RGCs, the effects of knock down effects were more obvious at 3 dpc, when crush injury has induced CHOP expression as was demonstrated previously (Hu et al., 2012).

Example 5

AAV-mSncg-CRISPR/Cas9-Mediated CHOP/SARM1 Knock Down Protects RGCs and ON and Preserves Their Tunction After Acute ON Crush Injury With these tools in hand, whether RGC-targeted, AAV-mSncg-CRISPR/Cas9 mediated gene editing can provide neuroprotective gene therapy for ON injuries was confirmed. ON that expressed control gRNA or C/S gRNAs together with SpCas9 were crushed in mice. As a biomarker for the integrity of RGCs, thickness of the ganglion cell complex (GCC, including RNFL, GCL and IPL) was measured with live optical coherence tomography (OCT) imaging (FIG. 7, panel A). At 2 weeks after ON crush, there was about 20% GCC thinning in control mouse eyes, indicating severe degeneration of RGC somata and axons (FIG. 7, panels A and B). In contrast, C/S gRNAs expression together with mSncg-mediated Cas9 expression significantly increased the thickness of GCC in LSL-Cas9 mice or WT mice (FIG. 7, panels A and B). The pattern electroretinogram (PERG), an assay of RGC function (Porciatti et al., 2007; Porciatti, 2015; Chou et al., 2016), showed the same trend: C/S gRNAs significantly increased the P1-N2 amplitudes over control gRNA in both WT mice co-injected with AAV-mSncg-SpCas9 and LSL-Cas9 mice co-injected with AAV-mSncg-Cre (FIG. 7, panels C and D). Consistent with these in vivo anatomical and functional results, histological studies also demonstrated significant neuroprotection of RGC somata and axons: there were more surviving RGCs in retina and axons in ON after AAV-mSncg-CRISPR/Cas9-mediated CHOP/SARM1 knock down than in control mice (FIG. 8). Interestingly, more RGCs survived in WT mice injected with AAV-mSncg-Cas9 than in LSL-Cas9 mice injected with AAV-mSncg-Cre, which may be because expression of Cas9 is more potent when driven by mSncg promoter, than in the LSL-Cas9 mice, where it is driven by CAG promoter (Chiou et al., 2015).

Discussion

Through a low throughput screening, the mSncg promoter was identified as a RGC-specific promoter and demonstrated its specificity and potency in driving transgene expression in RGCs. Although AAV-mediated CRISPR/Cas9 gene deletion has been successfully applied to retina neurons as described previously (Hung et al., 2016; Yu et al., 2017), the present disclosure is the first to report specific targeting and CRISPR/Cas9 gene editing of RGCs in vivo. By applying these novel tools to the ON crush in vivo axon injury model, effective CHOP and SARM1 inhibition with AAV-mSncg-mediated CRISPR/Cas9 is demonstrated and represents a translatable gene therapy strategy for RGC/ON protection.

AAV-mediated inhibition of degenerative genes and enhancement of neuroprotective genes have much broader applications to the treatment of neurodegenerative diseases than correcting the pathogenetic mutation of a single gene. Because of their universal activities, CMV and hybrid CMV early enhancer/chicken β-actin promoter (CAG) are often used for driving transgene expression in AAV vectors (Schon et al., 2015). Human trials with AAV2-ND4 (NADH dehydrogenase, subunit 4) for Leber's hereditary optic neuropathy (LHON) are currently generating promising initial data (Feuer et al., 2016; Yang et al., 2016b; Guy et al., 2017). However, some of the beneficial effects are transient, which may be because transgene expression driven by small CMV chicken β-actin promoter is short-lived. The highly specific and potent mSncg promoter may therefore be a better choice for future clinical trials delivering genetic materials to RGCs, including overexpression and knocking down specific genes to determine their RGC autonomous effects.

The synuclein proteins are chaperones in neurons, and Sncg is more highly enriched in RGCs (Farkas et al., 2004; Trimarchi et al., 2007; Buckingham et al., 2008; Soto et al., 2008). Human Sncg promoter has recently been used to drive channelrhodopsin gene expression in macaque RGCs (Chaffiol et al., 2017).

Because the data showed that the activity of mSncg promoter exceeded that of hSncg promoter in all varieties of RGCs studied herein, including mouse RGCs, human primary RGCs and human stem cell-derived RGCs, and thus, while not wishing to be bound by theory, the mSncg promoter may also be more effective than hSncg promoter in non-human primate RGCs.

The screening results also suggest that the specificity and potency of promoters from RGC-specific genes can be highly variable. This variability could be due to the particular characteristics of the promoter regions examined, or because RGCs contain additional enhancers that can affect specific promoter activity. To systematically identify additional RGC-specific genes or RGC-specific cis-regulatory elements, including promoters, enhancers and silencers, the highly efficient RGC targeting by AAV-mSncg-Cre can be combined with floxed mouse lines. Useful lines include the RiboTag mouse (Sanz et al., 2009), which can be used to isolate RGC-specific ribosomes for translatome profiling, or the SUN1-sfGFP-Myc mouse (Mo et al., 2015) to isolate RGC-specific nuclei for epigenomic studies. Either of these strategies obviate the need for disruptive and potentially confounding retinal cell dissociation. These RGC-specific genomic and epigenomic studies are anticipated to yield more RGC-specific genes/promoters/enhancers and find broad application in RGC-related basic and translational research.

CRISPR/Cas9 has been used for photoreceptor gene editing with a photoreceptor-specific promoter (Yu et al., 2017). Here, the mSncg promoter was demonstrated to drive expression of the CRISPR/Cas9 system specifically in RGCs, and this strategy can be used to efficiently knock down two genes, CHOP and SARM1. At the same time these compositions and methods can be used to provide significant neuroprotection against RGC and ON injury. This success encourages similar testing of additional neuroprotective or regenerative genetic targets for neural repair in optic neuropathies. Although the full length mSncg promoter was more specific to RGCs, the shorter one to used to accommodate a larger proposed payload, SpCas9. However, S. Aureus Cas9 (SaCas9) (Ran et al., 2015), which is about 70% of the size of SpCas9, could be incorporated more easily into AAV vector with the mSncg promoter. RNA-guided endonuclease Cas9 has been repurposed for transcriptional inhibition and activation using catalytically dead Cas9 (dCas9) (Qi et al., 2013; Gilbert et al., 2014; La Russa and Qi, 2015; Gao et al., 2016; Chen and Qi, 2017; Joung et al., 2017), but the much larger size of transcriptional activator/inhibitor-fused dCas9 currently precludes incorporating dCas9 into AAV vectors. However, it may be possible to package a split dCas9 system in two AAV vectors, an approach that is currently under development.

In summary, identification of this highly efficient RGC-specific promoter and the promising results demonstrated in the present proof-of-concept example of CRISPR/Cas9-mediated neuroprotection, advance the important goal of optic neuropathies with cell-specific gene therapy.

Promoter Sequences
mSncg-1.45kb (SEQ ID NO: 45)

ccattgacgtcaataatgacgtatgttcccatagtaacgccaatagggact ttccattgacgtcaatgggtggagtatttacggtaaactgcccacttggca gtacatcaagtgtat*catat*gggtcccatgccactagtgggagctgtgtta cctgttgcagccccacccaaagccctgctataggtcaagcaggaatcacc ctgccatcccagcctggggcctggagtaccagatccaggaaactagcatc ccttagctatagagatagccacacatcagcccattcctcagatgtgtatct ggggctcagacatcatctcccgatctccgacaagggcaggatttccttacc gtctgatgggtctctgctggtatcctcagccctagtctccagccttcag gcatgccgggcctattgagatgggagaacttggtaccggggtcctgtgccc aggaccctagcagtccccagctcaggtacaccccaaagcccagcagcagtg tcgggatcatggtgaggggctcctgtgctgatgctcagccttacaagtgac tctcaaatttgctggtgatgtggtcttcaagcgaaatgtcagaaagaaaag aaaacacgaggacaacaaagggaggaagtggcctggtccggcccacccggc aagtctcatccgccccgccccgcccttccagcctggccccttggagg cctccaaccactcaggtcaattcctgtgtcctgagggcacttgaatcaggg acacgggatttggtagacacataaaggtggcccattaaacttatttctcc aggactctgtcgtgggcctggaggagatctggtgccacccatactgttggc caggaagtggggaacgggcacatcacacctgctcggcaccttgggctatgg gaactagcaggtgggtgggaactcagagaaggaaagggactatgctagaat cacacagcgggcagcccagtctagggcatggggagcagctttgggtgtttc tggcctcagccttccaacaggtttggctagagctccaggctcaagagcatc caggatacagtggggaactggataacagggcagcctgcaggttggccattc attggattggccctgacccggcccagcctgggacactgaggcatcatcag tcaaggcacttttcttctgcatataagagccagggcacgagaccaccaggg ctttccaaggatgaatgaggtgtaatgatagattaggatatgtccagcctc caacacgctctccctccccagggccaacaagagtcagcagggcagaatag agccagtagggccccgggccctgctcgctggtatccccgtgaggcatgcct tctctctggcccgccctccctgccccacctggccgggctggctgggct ccagccagcagccacagcatcaatatttcatctgcgtcaataagaggcagt agcagcagagacagcggctgcggcagcactccagtccatagcttgcagcag ccaggttccatccttgcaaacaccatggacgtcttcaag mSncg-1.03b (SEQ ID NO: 46)

ccattgacgtcaataatgacgtatgttcccatagtaacgccaatagggact ttccattgacgtcaatgggtggagtatttacggtaaactgcccacttggca -continued

```
gtacatcaagtgtatcatatgtcagccttacaagtgactctcaaatttgct ggtgatgtggtcttcaagcgaaatgtcagaaagaaaagaaaacacgaggac aacaaagggaggaagtggcctggtccggcccacccggcaagtctcatccgc ccccgccccgccccttccagcctggcccccttggaggcctccaaccactc aggtcaattcctgtgtcctgagggcacttgaatcagggacacgggatttgg tagacacataaggtggccccattaaacttatttctccaggactctgtcgt gggcctggaggagatctggtgccacccatactgttggccaggaagtgggga acgggcacatcacacctgctcggcaccttgggctatgggaactagcaggtg ggtgggaactcagagaaggaaagggactatgctagaatcacacagcgggca gcccagtctagggcatggggagcagctttgggtgtttctggcctcagcctt ccaacaggtttggctagagctccaggctcaagagcatccaggatacagtgg ggaactggataacagggcagcctgcaggttggccattcattggattggccc tgacccggcccagcctgggacactgaggcatcatcagtcaaggcacttt cttctgcatataagagccagggcacgagaccaccagggctttccaaggatg aatgaggtgtaatgatagattaggatatgtccagcctccaacacgctctcc ctcccccagggccaacaagagtcagcagggcagaatagagccagtagggc ccgggccctgctcgctggtatccccgtgaggcatgccttctctctggcccg ccctccctgccccaccctggcccgggctggctgggctccagccagcagcc acagcatcaatatttcatctgcgtcaataagaggcagtagcagcagagaca gcggctgcggcagcactccagtccatagcttgcagcagccaggttccatcc ttgcaaacaccatggacgtcttcaag
``` mSncg-0.66kb
(SEQ ID NO: 47)
```
ccattgacgtcaataatgacgtatgttcccatagtaacgccaatagggact ttccattgacgtcaatgggtggagtatttacggtaaactgcccacttggca gtacatcaagtgtatcatatgctatgggaactagcaggtgggtgggaactc agagaaggaaagggactatgctagaatcacacagcgggcagcccagtctag ggcatggggagcagctttgggtgtttctggcctcagccttccaacaggttt ggctagagctccaggctcaagagcatccaggatacagtggggaactggata acagggcagcctgcaggttggccattcattggattggccctgaccccggcc cagcctgggacactgaggcatcatcagtcaaggcacttttcttctgcatat aagagccagggcacgagaccaccagggctttccaaggatgaatgaggtgta atgatagattaggatatgtccagcctccaacacgctctccctcccccaggg ccaacaagagtcagcagggcagaatagagccagtagggcccgggccctgc tcgctggtatccccgtgaggcatgccttctctctggcccgccctccctgcc cccacccctggcccgggctggctgggctccagccagcagccacagcatcaat atttcatctgcgtcaataagaggcagtagcagcagagacagcggctgcggc agcactccagtccatagcttgcagcagccaggttccatccttgcaaacacc atggacgtcttcaag
``` mSncg-0.27kb
(SEQ ID NO: 48)
```
ccattgacgtcaataatgacgtatgttcccatagtaacgccaatagggact ttccattgacgtcaatgggtggagtatttacggtaaactgcccacttggca gtacatcaagtgtatcatatgaagagtcagcagggcagaatagagccagta ggggcccgggccctgctcgctggtatccccgtgaggcatgccttctctctg gcccgccctccctgccccaccctggcccgggctggctgggctccagccag cagccacagcatcaatatttcatctgcgtcaataagaggcagtagcagcag agacagcggctgcggcagcactccagtccatagcttgcagcagccaggttc catccttgcaaacaccatggacgtcttcaag
``` mSncg shorter promoter (76CMVe+189mSncg)
(SEQ ID NO: 63)
```
ccattgacgtcaataatgacgtatgttcccatagtaacgccaatagggact ttccattgacgtcaatgggtggagtcatatgctctggcccgccctccctgc ccccaccctggcccgggctggctgggctccagccagcagccacagcatcaa tatttcatctgcgtcaataagaggcagtagcagcagagacagcggctgcgg cagcactccagtccatagcttgcagcagccaggttccatccttgcaaacac catggacgtcttcaag
```

REFERENCES

1. Bainbridge J W, Smith A J, Barker S S, Robbie S, Henderson R, Balaggan K, et al. Effect of gene therapy on visual function in Leber's congenital amaurosis. *N. Engl. J. Med.* 2008; 358(21):2231-9.
2. Bakondi B, Lv W, Lu B, Jones M K, Tsai Y, Kim K J, et al. In vivo CRISPR/Cas9 Gene Editing Corrects Retinal Dystrophy in the S334ter-3 Rat Model of Autosomal Dominant Retinitis Pigmentosa. *Mol. Ther.* 2016; 24(3):556-63.
3. Balcer L J, Miller D H, Reingold S C, Cohen J A. Vision and vision-related outcome measures in multiple sclerosis. *Brain* 2015; 138(Pt 1):11-27.
4. Barres B A, Silverstein B E, Corey D P, Chun L L. Immunological, morphological, and electrophysiological variation among retinal ganglion cells purified by panning. *Neuron* 1988; 1(9):791-803.
5. Benowitz L I, He Z, Goldberg J L. Reaching the brain: Advances in optic nerve regeneration. *Exp. Neurol.* 2017; 287(Pt 3):365-73.
6. Boye S E, Boye S L, Lewin A S, Hauswirth W W. A comprehensive review of retinal gene therapy. *Mol. Ther.* 2013; 21(3):509-19.
7. Buckingham B P, Inman D M, Lambert W, Oglesby E, Calkins D J, Steele M R, et al. Progressive ganglion cell degeneration precedes neuronal loss in a mouse model of glaucoma. *J. Neurosci.* 2008; 28(11):2735-44.
8. Busskamp V, Duebel J, Balya D, Fradot M, Viney T J, Siegert S, et al. Genetic reactivation of cone photoreceptors restores visual responses in retinitis pigmentosa. *Science* 2010; 329(5990):413-7.
9. Calkins D J, Horner P J. The cell and molecular biology of glaucoma: axonopathy and the brain. *Invest. Ophthalmol. Vis. Sci.* 2012; 53(5):2482-4.
10. Carelli V, La Morgia C, Ross-Cisneros F N, Sadun A A. Optic neuropathies: the tip of the neurodegeneration iceberg. *Hum. Mol. Genet.* 2017; 26(R2):R139-R50.
11. Chaffiol A, Caplette R, Jaillard C, Brazhnikova E, Desrosiers M, Dubus E, et al. A New Promoter Allows Optogenetic Vision Restoration with Enhanced Sensitivity in Macaque Retina. *Mol Ther.* 2017; 25(11):2546-60.

12. Chen M, Qi L S. Repurposing CRISPR System for Transcriptional Activation. *Adv. Exp. Med. Biol.* 2017; 983:147-57.
13. Chiasseu M, Cueva Vargas J L, Destroismaisons L, Vande Velde C, Leclerc N, Di Polo A. Tau Accumulation, Altered Phosphorylation, and Missorting Promote Neurodegeneration in Glaucoma. *J. Neurosci.* 2016; 36(21):5785-98.
14. Chiou S H, Winters I P, Wang J, Naranjo S, Dudgeon C, Tamburini F B, et al. Pancreatic cancer modeling using retrograde viral vector delivery and in vivo CRISPR/Cas9-mediated somatic genome editing. *Genes Dev.* 2015; 29(14):1576-85.
15. Chou T H, Bohorquez J, Toft-Nielsen J, Ozdamar O, Porciatti V. Robust mouse pattern electroretinograms derived simultaneously from each eye using a common snout electrode. *Invest. Ophthalmol. Vis. Sci.* 2014; 55(4):2469-75.
16. Chou T H, Feuer W J, Schwartz O, Rojas M J, Roebber J K, Porciatti V. Integrative properties of retinal ganglion cell electrical responsiveness depend on neurotrophic support and genotype in the mouse. *Experimental eye research* 2016; 145:68-74.
17. Conforti L, Gilley J, Coleman M P. Wallerian degeneration: an emerging axon death pathway linking injury and disease. *Nat. Rev. Neurosci.* 2014; 15(6):394-409.
18. Cong L, Ran F A, Cox D, Lin S, Barretto R, Habib N, et al. Multiplex genome engineering using CRISPR/Cas systems. *Science* 2013; 339(6121):819-23.
19. DeBusk A, Moster M L. Gene therapy in optic nerve disease. *Curr. Opin. Ophthalmol.* 2018; 29(3):234-8.
20. Ellis E M, Gauvain G, Sivyer B, Murphy G J. Shared and distinct retinal input to the mouse superior colliculus and dorsal lateral geniculate nucleus. *J. Neurophysiol.* 2016; 116(2):602-10.
21. Farkas R H, Qian J, Goldberg J L, Quigley H A, Zack D J. Gene expression profiling of purified rat retinal ganglion cells. *Invest. Ophthalmol. Vis. Sci.* 2004; 45(8):2503-13.
22. Feuer W J, Schiffman J C, Davis J L, Porciatti V, Gonzalez P, Koilkonda R D, et al. Gene Therapy for Leber Hereditary Optic Neuropathy: Initial Results. *Ophthalmology* 2016; 123(3):558-70.
23. Gao Y, Xiong X, Wong S, Charles E J, Lim W A, Qi L S. Complex transcriptional modulation with orthogonal and inducible dCas9 regulators. *Nature methods* 2016; 13(12):1043-9.
24. Geden M J, Deshmukh M. Axon degeneration: context defines distinct pathways. *Curr. Opin. Neurobiol.* 2016; 39:108-15.
25. Gerdts J, Summers D W, Milbrandt J, DiAntonio A. Axon Self-Destruction: New Links among SARM1, MAPKs, and NAD+ Metabolism. *Neuron* 2016; 89(3): 449-60.
26. Gerdts J, Summers D W, Sasaki Y, DiAntonio A, Milbrandt J. Sarm1-mediated axon degeneration requires both SAM and TIR interactions. *J. Neurosci.* 2013; 33(33):13569-80.
27. Gerits A, Vancraeyenest P, Vreysen S, Laramee M E, Michiels A, Gijsbers R, et al. Serotype-dependent transduction efficiencies of recombinant adeno-associated viral vectors in monkey neocortex. *Neurophotonics* 2015; 2(3):031209.
28. Ghaffarieh A, Levin L A. Optic nerve disease and axon pathophysiology. *International review of neurobiology* 2012; 105:1-17.
29. Gilbert L A, Horlbeck M A, Adamson B, Villalta J E, Chen Y, Whitehead E H, et al. Genome-Scale CRISPR-Mediated Control of Gene Repression and Activation. *Cell* 2014; 159(3):647-61.
30. Gorbatyuk M S, Knox T, LaVail M M, Gorbatyuk O S, Noorwez S M, Hauswirth W W, et al. Restoration of visual function in P23H rhodopsin transgenic rats by gene delivery of BiP/Grp78. *Proc. Natl. Acad. Sci. U.S.A.* 2010; 107(13):5961-6.
31. Guy J, Feuer W J, Davis J L, Porciatti V, Gonzalez P J, Koilkonda R D, et al. Gene Therapy for Leber Hereditary Optic Neuropathy: Low- and Medium-Dose Visual Results. *Ophthalmology* 2017; 124(11):1621-34.
32. Hastie E, Samulski R J. Adeno-associated virus at 50: a golden anniversary of discovery, research, and gene therapy success—a personal perspective. *Human gene therapy* 2015; 26(5):257-65.
33. Hauswirth W W, Aleman T S, Kaushal S, Cideciyan A V, Schwartz S B, Wang L, et al. Treatment of leber congenital amaurosis due to RPE65 mutations by ocular subretinal injection of adeno-associated virus gene vector: short-term results of a phase I trial. *Human gene therapy* 2008; 19(10):979-90.
34. Howell G R, Soto I, Libby R T, John S W. Intrinsic axonal degeneration pathways are critical for glaucomatous damage. *Exp. Neurol.* 2013; 246:54-61.
35. Hu Y, Park K K, Yang L, Wei X, Yang Q, Cho K S, et al. Differential effects of unfolded protein response pathways on axon injury-induced death of retinal ganglion cells. *Neuron* 2012; 73(3):445-52.
36. Huang H, Miao L, Liang F, Liu X, Xu L, Teng X, et al. Neuroprotection by elF2alpha-CHOP inhibition and XBP-1 activation in EAE/optic neuritis. *Cell death & disease* 2017; 8(7):e2936.
37. Hung S S, Chrysostomou V, Li F, Lim J K, Wang J H, Powell J E, et al. AAV-Mediated CRISPR/Cas Gene Editing of Retinal Cells In Vivo. *Invest. Ophthalmol. Vis. Sci.* 2016; 57(7):3470-6.
38. Jinek M, East A, Cheng A, Lin S, Ma E, Doudna J. RNA-programmed genome editing in human cells. *eLife* 2013; 2:581 e00471.
39. Joung J, Konermann S, Gootenberg J S, Abudayyeh O O, Platt R J, Brigham M D, et al. Genome-scale CRISPR-Cas9 knockout and transcriptional activation screening. *Nature protocols* 2017; 12(4):828-63.
40. Keeler A M, ElMallah M K, Flotte T R. Gene Therapy 2017: Progress and Future Directions. *Clin. Transl. Sci.* 2017; 10(4):242-8.
41. Kugler S, Lingor P, Scholl U, Zolotukhin S, Bahr M. Differential transgene expression in brain cells in vivo and in vitro from AAV-2 vectors with small transcriptional control units. *Virology* 2003; 311(1):89-95.
42. Kwong J M, Caprioli J, Piri N. RNA binding protein with multiple splicing: a new marker for retinal ganglion cells. *Invest. Ophthalmol. Vis. Sci.* 2010; 51(2): 1052-8.
43. La Russa M F, Qi L S. The New State of the Art: Cas9 for Gene Activation and Repression. *Mol. Cell. Biol.* 2015; 35(22):3800-9.
44. Maguire A M, High K A, Auricchio A, Wright J F, Pierce E A, Testa F, et al. Age-dependent effects of RPE65 gene therapy for Leber's congenital amaurosis: a phase 1 dose-escalation trial. *Lancet* 2009; 374 (9701):1597-605.
45. Maguire A M, Simonelli F, Pierce E A, Pugh E N, Jr., Mingozzi F, Bennicelli J, et al. Safety and efficacy of gene transfer for Leber's congenital amaurosis. *N. Engl. J. Med.* 2008; 358(21):2240-8.
46. Mali P, Yang L, Esvelt K M, Aach J, Guell M, DiCarlo J E, et al. RNA-guided human genome engineering via Cas9. *Science* 2013; 339(6121):823-6.
47. Mayford M, Baranes D, Podsypanina K, Kandel E R. The 3'-untranslated region of CaMKII alpha is a cis-acting signal for the localization and translation of mRNA in dendrites. *Proc. Natl. Acad. Sci. U.S.A.* 1996; 93(23):13250-5.
48. McKinnon S J. Glaucoma: ocular Alzheimer's disease? *Front. Biosci.* 2003; 8:s1140-56.
49. Mellough C B, Cui Q, Spalding K L, Symons N A, Pollett M A, Snyder E Y, et al. Fate of multipotent neural precursor cells transplanted into mouse retina selectively depleted of retinal ganglion cells. *Exp. Neurol.* 2004; 186(1):6-19.
50. Meyer R L, Miotke J A, Benowitz L I. Injury induced expression of growth-associated protein-43 in adult mouse retinal ganglion cells in vitro. *Neuroscience* 1994; 63(2):591-602.
51. Miao L, Yang L, Huang H, Liang F, Ling C, Hu Y. mTORC1 is necessary but mTORC2 and GSK3beta are inhibitory for AKT3-induced axon regeneration in the central nervous system. *eLife* 2016; 5:e14908.
52. Minegishi Y, Nakayama M, Iejima D, Kawase K, Iwata T. Significance of optineurin mutations in glaucoma and othe8 diseases. *Prog. Retin. Eye Res.* 2016; 55:149-81.
53. Mingozzi F, High K A. Therapeutic in vivo gene transfer for genetic disease using AAV: progress and challenges. *Nature reviews Genetics* 2011; 12(5):341-55.
54. Mo A, Mukamel E A, Davis F P, Luo C, Henry G L, Picard S, et al. Epigenomic Signatures of Neuronal Diversity in the Mammalian Brain. *Neuron* 2015; 86(6):1369-84.
55. Nickells R W, Schmitt H M, Maes M E, Schlamp C L. AAV2-Mediated Transduction of the Mouse Retina After Optic Nerve Injury. *Invest. Ophthalmol. Vis. Sci.* 2017; 58(14):6091-104.
56. Osterloh J M, Yang J, Rooney T M, Fox A N, Adalbert R, Powell E H, et al. dSarm/Sarm1 is required for activation of an injury-induced axon death pathway. *Science* 2012; 337(6093):481-4.
57. Oyadomari S, Koizumi A, Takeda K, Gotoh T, Akira S, Araki E, et al. Targeted disruption of the Chop gene delays endoplasmic reticulum stress-mediated diabetes. *J. Clin. Invest.* 2002; 109(4):525-32.
58. Pak W, Hindges R, Lim Y S, Pfaff S L, O'Leary D D. Magnitude of binocular vision controlled by islet-2 repression of a genetic program that specifies laterality of retinal axon pathfinding. *Cell* 2004; 119(4):567-78.
59. Pang J J, Lauramore A, Deng W T, Li Q, Doyle T J, Chiodo V, et al. Comparative analysis of in vivo and in vitro AAV vector transduction in the neonatal mouse retina: effects of serotype and site of administration. *Vision research* 2008; 48(3):377-85.
60. Park K K, Liu K, Hu Y, Smith P D, Wang C, Cai B, et al. Promoting axon regeneration in the adult CNS by modulation of the PTEN/mTOR pathway. *Science* 2008; 322(5903):963-6.
61. Petrs-Silva H, Dinculescu A, Li Q, Deng W T, Pang J J, Min S H, et al. Novel properties of tyrosine-mutant AAV2 vectors in the mouse retina. *Mol. Ther.* 2011; 19(2):293-301.
62. Porciatti V. Electrophysiological assessment of retinal ganglion cell function. *Experimental eye research* 2015; 141:164-70.
63. Porciatti V, Saleh M, Nagaraju M. The pattern electroretinogram as a tool to monitor progressive retinal ganglion cell dysfunction in the DBA/2J mouse model of glaucoma. *Invest. Ophthalmol. Vis. Sci.* 2007; 48(2):745-51.
64. Qi L S, Larson M H, Gilbert L A, Doudna J A, Weissman J S, Arkin A P, et al. Repurposing CRISPR as an RNA-guided platform for sequence-specific control of gene expression. *Cell* 2013; 152(5):1173-83.
65. Ran F A, Cong L, Yan W X, Scott D A, Gootenberg J S, Kriz A J, et al. In vivo genome editing using *Staphylococcus aureus* Cas9. *Nature* 2015; 520(7546):186-91.
66. Ratican S E, Osborne A, Martin K R. Progress in Gene Therapy to Prevent Retinal Ganglion Cell Loss in Glaucoma and Leber's Hereditary Optic Neuropathy. *Neural Plast.* 2018; 2018:7108948.
67. Rodriguez A R, de Sevilla Muller L P, Brecha N C. The RNA binding protein RBPMS is a selective marker of ganglion cell in the mammalian retina. *The Journal of comparative neurology* 2014; 522(6):1411-43.
68. Sanz E, Yang L, Su T, Morris D R, McKnight G S, Amieux P S. Cell-type-specific isolation of ribosome-associated mRNA from complex tissues. *Proc. Natl. Acad. Sci. U.S.A.* 2009; 106(33):13939-44.
69. Schaden H, Stuermer C A, Bahr M. GAP-43 immunoreactivity and axon regeneration in retinal ganglion cells of the rat. *J. Neurobiol.* 1994; 25(12):1570-8.
70. Schnepp B C, Clark K R, Klemanski D L, Pacak C A, Johnson P R. Genetic fate of recombinant adeno-associated virus vector genomes in muscle. *J. ViroL* 2003; 77(6):3495-504.
71. Schon C, Biel M, Michalakis S. Retinal gene delivery by adeno-associated virus (AAV) vectors: Strategies and applications. *Eur. J. Pharm. Biopharm.* 2015; 95(Pt B):343-52.
72. Silva R M, Ries V, Oo T F, Yarygina O, Jackson-Lewis V, Ryu E J, et al. CHOP/GADD153 is a mediator of apoptotic death in substantia nigra dopamine neurons in an in vivo neurotoxin model of parkinsonism. *J. Neurochem.* 2005; 95(4):974-86.
73. Simonelli F, Maguire A M, Testa F, Pierce E A, Mingozzi F, Bennicelli J L, et al. Gene therapy for Leber's congenital amaurosis is safe and effective through 1.5 years after vector administration. *Mol. Ther.* 2010; 18(3):643-50.
74. Sluch V M, Davis C H, Ranganathan V, Kerr J M, Krick K, Martin R, et al. Differentiation of human ESCs to retinal ganglion cells using a CRISPR engineered reporter cell line. *Scientific reports* 2015; 5:16595.
75. Smalley E. First AAV gene therapy poised for landmark approval. *Nature biotechnology* 2017; 35(11):998-9.
76. Smith R S. Systematic evaluation of the mouse eye: anatomy, pathology, and biomethods. Boca Raton: CRC Press; 2002.
77. Song B, Scheuner D, Ron D, Pennathur S, Kaufman R J. Chop deletion reduces oxidative stress, improves beta cell function, and promotes cell survival in multiple mouse models of diabetes. *J. Clin. Invest.* 2008; 118(10):3378-89.
78. Soto I, Oglesby E, Buckingham B P, Son J L, Roberson E D, Steele M R, et al. Retinal ganglion cells downregulate gene expression and lose their axons within the optic nerve head in a mouse glaucoma model. *J. Neurosci.* 2008; 28(2):548-61.

79. Spanopoulou E, Giguere V, Grosveld F. The functional domains of the murine Thy-1 gene promoter. *Mol. Cell. Biol.* 1991; 11(4):2216-28.

80. Surgucheva I, Weisman A D, Goldberg J L, Shnyra A, Surguchov A. Gamma-synuclein as a marker of retinal ganglion cells. *Mol. Vis.* 2008; 14:1540-8.

81. Surguchov A, McMahan B, Masliah E, Surgucheva I. Synucleins in ocular tissues. *Journal of neuroscience research* 2001; 65(1):68-77.

82. Talman L S, Bisker E R, Sackel D J, Long D A, Jr., Galetta K M, Ratchford J N, et al. Longitudinal study of vision and retinal nerve fiber layer thickness in multiple sclerosis. *Annals of neurology* 2010; 67(6): 749-60.

83. Toosy A T, Mason D F, Miller D H. Optic neuritis. *Lancet neurology* 2014; 13(1):83-99.

84. Trimarchi J M, Stadler M B, Roska B, Billings N, Sun B, Bartch B, et al. Molecular heterogeneity of developing retinal ganglion and amacrine cells revealed through single cell gene expression profiling. *The Journal of comparative neurology* 2007; 502(6):1047-65.

85. Venugopalan P, Wang Y, Nguyen T, Huang A, Muller K J, Goldberg J L. Transplanted neurons integrate into adult retinas and respond to light. *Nature communications* 2016; 7:10472.

86. Vidal M, Morris R, Grosveld F, Spanopoulou E. Tissue-specific control elements of the Thy-1 gene. *The EMBO journal* 1990; 9(3):833-40.

87. Walter P, Ron D. The unfolded protein response: from stress pathway to homeostatic regulation. *Science* 2011; 334(6059):1081-6.

88. Wang J T, Medress Z A, Barres B A. Axon degeneration: molecular mechanisms of a self-destruction pathway. *J. Cell Biol.* 2012; 196(1):7-18.

89. Wang L N, Wang Y, Lu Y, Yin Z F, Zhang Y H, Aslanidi G V, et al. Pristimerin enhances recombinant adeno-associated virus vector-mediated transgene expression in human cell lines in vitro and murine hepatocytes in vivo. *Journal of integrative medicine* 2014a; 12(1):20-34.

90. Wang M, Kaufman R J. Protein misfolding in the endoplasmic reticulum as a conduit to human disease. *Nature* 2016; 529(7586):326-35.

91. Wang S, Sengel C, Emerson M M, Cepko C L. A gene regulatory network controls the binary fate decision of rod and bipolar cells in the vertebrate retina. *Dev. Cell* 2014b; 30(5):513-27.

92. Wassmer S J, Carvalho L S, Gyorgy B, Vandenberghe L H, Maguire C A. Exosome-associated AAV2 vector mediates robust gene delivery into the murine retina upon intravitreal injection. *Scientific reports* 2017; 7:45329.

93. Wiggs J L, Pasquale L R. Genetics of glaucoma. *Hum. Mol. Genet.* 2017; 26(R1):R21-R7.

94. Yang L, Li S, Miao L, Huang H, Liang F, Teng X, et al. Rescue of Glaucomatous Neurodegeneration by Differentially Modulating Neuronal Endoplasmic Reticulum Stress Molecules. *J. Neurosci.* 2016a; 36(21):5891-903.

95. Yang L, Miao L, Liang F, Huang H, Teng X, Li S, et al. The mTORC1 effectors S6K1 and 4E-BP play different roles in CNS axon regeneration. *Nature communications* 2014; 5:5416.

96. Yang S, Ma S Q, Wan X, He H, Pei H, Zhao M J, et al. Long-term outcomes of gene therapy for the treatment of Leber's hereditary optic neuropathy. *EBioMedicine* 2016b; 10:258-68.

97. Yu W, Mookherjee S, Chaitankar V, Hiriyanna S, Kim J W, Brooks M, et al. Nrl knockdown by AAV-delivered CRISPR/Cas9 prevents retinal degeneration in mice. *Nature communications* 2017; 8:14716.

98. Zhang Y H, Wang Y, Yusufali A H, Ashby F, Zhang D, Yin Z F, et al. Cytotoxic genes from traditional Chinese medicine inhibit tumor growth both in vitro and in vivo. *Journal of integrative medicine* 2014; 12(6):483-94.

99. Zinszner H, Kuroda M, Wang X, Batchvarova N, Lightfoot R T, Remotti H, et al. CHOP is implicated in programmed cell death in response to impaired function of the endoplasmic reticulum. *Genes Dev.* 1998; 12(7):982-95.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A composition comprising:
an AAV vector, comprising:
a murine y-synuclein promoter in operable linkage with a nucleic acid encoding a Cas9 nuclease, wherein the murine y-synuclein promoter is selected from the sequence of SEQ ID NO: 45, 46, 47, 48 and 63; and a U6 promoter in operable linkage with at least one single guide (sgRNA), 19-20 nucleotides in length, wherein each sgRNA precedes an –NGG protospacer, and wherein said at least one sgRNA is complementary to a target domain in the Ddit3 gene.

2. A method of treating an optic nerve (ON) neuropathy in a mammalian subject in need thereof, the method comprising:
intravitreally administering the composition of claim 1 to the mammalian subject, thereby reducing or ameliorating degeneration of axons and/or somata of RGCs,
wherein said intravitreal administration promotes functional recovery of RGC somata and axons; and
wherein the ON neuropathy is retinal ganglion cell degeneration including glaucoma, optic neuritis, or ON traumatic injury.

3. A promoter for the selective expression of an operably linked gene in retinal ganglion cells (RGCs) consisting of an mSncg promoter selected from the sequence set forth in SEQ ID NO: 45, 46, 47, 48 or 63, or a sequence having at least 95% sequence identity to SEQ ID NO: 45, 46, 47, 48 or 63,
wherein the promoter is operably linked to a heterologous expressible sequence.

4. The promoter of claim 3, wherein the expressible sequence encodes a polypeptide of interest.

* * * * *